(12) United States Patent
Staniforth et al.

(10) Patent No.: US 9,599,356 B2
(45) Date of Patent: Mar. 21, 2017

(54) HUMIDIFYING APPARATUS

(71) Applicant: Dyson Technology Limited, Wiltshire (GB)

(72) Inventors: Mark Joseph Staniforth, Bristol (GB); Jude Paul Pullen, London (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 76 days.

(21) Appl. No.: 14/812,980

(22) Filed: Jul. 29, 2015

(65) Prior Publication Data

US 2016/0033150 A1 Feb. 4, 2016

(30) Foreign Application Priority Data

Jul. 29, 2014 (GB) .................................. 1413428.2

(51) Int. Cl.

| F24F 6/12 | (2006.01) |
|---|---|
| C02F 1/32 | (2006.01) |
| B01F 3/04 | (2006.01) |
| F24F 13/26 | (2006.01) |
| F24F 3/16 | (2006.01) |
| F24F 6/00 | (2006.01) |

(52) U.S. Cl.
CPC .............. *F24F 6/12* (2013.01); *B01F 3/0407* (2013.01); *C02F 1/325* (2013.01); *F24F 3/166* (2013.01); *F24F 13/26* (2013.01); *F24F 2003/1667* (2013.01); *F24F 2006/006* (2013.01)

(58) Field of Classification Search
CPC ............ F24F 6/12; C02F 1/325; B01F 3/0407
USPC ............................................ 261/30, 91, 72.1
See application file for complete search history.

(56) References Cited

U.S. PATENT DOCUMENTS

| 284,962 | A | 9/1883 | Huston |
|---|---|---|---|
| 1,357,261 | A | 11/1920 | Svoboda |
| 1,767,060 | A | 6/1930 | Ferguson |
| 1,896,869 | A | 2/1933 | Larsh |
| 2,014,185 | A | 9/1935 | Martin |
| 2,035,733 | A | 3/1936 | Wall |

(Continued)

FOREIGN PATENT DOCUMENTS

| BE | 560119 | 8/1957 |
|---|---|---|
| CA | 1055344 | 5/1979 |

(Continued)

OTHER PUBLICATIONS

Search Report dated Feb. 6, 2015, directed to GB Application No. 1413428.2; 1 page.

(Continued)

*Primary Examiner* — Robert A Hopkins
(74) *Attorney, Agent, or Firm* — Morrison & Foerster LLP

(57) ABSTRACT

A humidifying apparatus includes a base, a water tank removably mounted on the base for supplying water to a chamber of the base, and a motor-driven impeller for generating an air flow over water stored in the chamber. An ultraviolet radiation emitting lamp irradiates water stored in the chamber. The air flow is humidified with water from the chamber, and conveyed by an outlet duct towards an air outlet for emission from the apparatus. A detachable section of the water tank is opaque to ultraviolet radiation and is positioned over the chamber when the water tank is mounted on the base. The detachable section of the water tank includes an air inlet of the outlet duct and a flange for occluding a peripheral portion of the chamber.

18 Claims, 35 Drawing Sheets

(56) References Cited

U.S. PATENT DOCUMENTS

| | | |
|---|---|---|
| 2,071,266 A | 2/1937 | Schmidt |
| D103,476 S | 3/1937 | Weber |
| 2,115,883 A | 5/1938 | Sher |
| D115,344 S | 6/1939 | Chapman |
| 2,210,458 A | 8/1940 | Keilholtz |
| 2,258,961 A | 10/1941 | Saathoff |
| 2,295,502 A | 9/1942 | Lamb |
| 2,336,295 A | 12/1943 | Reimuller |
| 2,363,839 A | 11/1944 | Demuth |
| 2,433,795 A | 12/1947 | Stokes |
| 2,473,325 A | 6/1949 | Aufiero |
| 2,476,002 A | 7/1949 | Stalker |
| 2,488,467 A | 11/1949 | De Lisio |
| 2,510,132 A | 6/1950 | Morrison |
| 2,544,379 A | 3/1951 | Davenport |
| 2,547,448 A | 4/1951 | Demuth |
| 2,583,374 A | 1/1952 | Hoffman |
| 2,620,127 A | 12/1952 | Radcliffe |
| 2,711,682 A | 6/1955 | Drechsel |
| 2,755,106 A | 7/1956 | Brennan et al. |
| 2,765,977 A | 10/1956 | Morrison |
| 2,808,198 A | 10/1957 | Morrison |
| 2,813,673 A | 11/1957 | Smith |
| 2,830,779 A | 4/1958 | Wentling |
| 2,838,229 A | 6/1958 | Belanger |
| 2,922,277 A | 1/1960 | Bertin |
| 2,922,570 A | 1/1960 | Allen |
| 3,004,403 A | 10/1961 | Laporte |
| 3,047,208 A | 7/1962 | Coanda |
| 3,270,655 A | 9/1966 | Guirl et al. |
| D206,973 S | 2/1967 | De Lisio |
| 3,503,138 A | 3/1970 | Fuchs et al. |
| 3,518,776 A | 7/1970 | Wolff et al. |
| 3,724,092 A | 4/1973 | McCleerey |
| 3,729,934 A | 5/1973 | Denning et al. |
| 3,743,186 A | 7/1973 | Mocarski |
| 3,795,367 A | 3/1974 | Mocarski |
| 3,872,916 A | 3/1975 | Beck |
| 3,875,745 A | 4/1975 | Franklin |
| 3,885,891 A | 5/1975 | Throndson |
| 3,943,329 A | 3/1976 | Hlavac |
| 4,037,991 A | 7/1977 | Taylor |
| 4,046,492 A | 9/1977 | Inglis |
| 4,061,188 A | 12/1977 | Beck |
| 4,073,613 A | 2/1978 | Desty |
| 4,090,814 A | 5/1978 | Teodorescu et al. |
| 4,113,416 A | 9/1978 | Kataoka et al. |
| 4,136,735 A | 1/1979 | Beck et al. |
| 4,173,995 A | 11/1979 | Beck |
| 4,180,130 A | 12/1979 | Beck et al. |
| 4,184,417 A | 1/1980 | Chancellor |
| 4,184,541 A | 1/1980 | Beck et al. |
| 4,192,461 A | 3/1980 | Arborg |
| 4,264,837 A | 4/1981 | Gaboriaud |
| 4,332,529 A | 6/1982 | Alperin |
| 4,336,017 A | 6/1982 | Desty |
| 4,342,204 A | 8/1982 | Melikian et al. |
| 4,448,354 A | 5/1984 | Reznick et al. |
| 4,568,243 A | 2/1986 | Schubert et al. |
| 4,630,475 A | 12/1986 | Mizoguchi |
| 4,643,351 A | 2/1987 | Fukamachi et al. |
| 4,703,152 A | 10/1987 | Shih-Chin |
| 4,716,946 A | 1/1988 | Grigoletto |
| 4,718,870 A | 1/1988 | Watts |
| 4,732,539 A | 3/1988 | Shin-Chin |
| 4,734,017 A | 3/1988 | Levin |
| 4,790,133 A | 12/1988 | Stuart |
| 4,850,804 A | 7/1989 | Huang |
| 4,878,620 A | 11/1989 | Tarleton |
| 4,893,990 A | 1/1990 | Tomohiro et al. |
| 4,978,281 A | 12/1990 | Conger |
| 5,061,405 A | 10/1991 | Stanek et al. |
| D325,435 S | 4/1992 | Coup et al. |
| 5,110,266 A | 5/1992 | Toyoshima et al. |
| 5,168,722 A | 12/1992 | Brock |
| 5,176,856 A | 1/1993 | Takahashi et al. |
| 5,188,508 A | 2/1993 | Scott et al. |
| D343,231 S | 1/1994 | Lim |
| 5,296,769 A | 3/1994 | Havens et al. |
| D346,017 S | 4/1994 | Lim |
| 5,310,313 A | 5/1994 | Chen |
| 5,317,815 A | 6/1994 | Hwang |
| 5,338,495 A | 8/1994 | Steiner et al. |
| 5,402,938 A | 4/1995 | Sweeney |
| 5,407,324 A | 4/1995 | Starnes, Jr. et al. |
| 5,425,902 A | 6/1995 | Miller et al. |
| 5,435,489 A | 7/1995 | Jenkins et al. |
| 5,483,616 A | 1/1996 | Chiu et al. |
| 5,518,370 A | 5/1996 | Wang et al. |
| D374,712 S | 10/1996 | Jane et al. |
| 5,609,473 A | 3/1997 | Litvin |
| 5,645,769 A | 7/1997 | Tamaru et al. |
| 5,649,370 A | 7/1997 | Russo |
| D382,951 S | 8/1997 | Deines et al. |
| 5,671,321 A | 9/1997 | Bagnuolo |
| 5,677,982 A | 10/1997 | Levine et al. |
| 5,706,985 A | 1/1998 | Feer |
| 5,735,683 A | 4/1998 | Muschelknautz |
| 5,762,034 A | 6/1998 | Foss |
| 5,762,661 A | 6/1998 | Kleinberger et al. |
| 5,783,117 A | 7/1998 | Byassee et al. |
| 5,794,306 A | 8/1998 | Firdaus |
| D398,983 S | 9/1998 | Keller et al. |
| 5,841,080 A | 11/1998 | Iida et al. |
| 5,843,344 A | 12/1998 | Junket et al. |
| 5,859,952 A | 1/1999 | Levine et al. |
| 5,862,037 A | 1/1999 | Behl |
| 5,868,197 A | 2/1999 | Potier |
| 5,881,685 A | 3/1999 | Foss et al. |
| 5,922,247 A | 7/1999 | Shoham et al. |
| D415,271 S | 10/1999 | Feer |
| 6,015,274 A | 1/2000 | Bias et al. |
| D423,663 S | 4/2000 | Rossman et al. |
| 6,073,881 A | 6/2000 | Chen |
| D429,808 S | 8/2000 | Krauss et al. |
| 6,123,618 A | 9/2000 | Day |
| 6,155,782 A | 12/2000 | Hsu |
| D435,899 S | 1/2001 | Melwani |
| 6,200,155 B1 | 3/2001 | Chudkosky et al. |
| 6,254,337 B1 | 7/2001 | Arnold |
| 6,269,549 B1 | 8/2001 | Carlucci et al. |
| 6,278,248 B1 | 8/2001 | Hong et al. |
| 6,282,746 B1 | 9/2001 | Schleeter |
| 6,293,121 B1 | 9/2001 | Labrador |
| 6,321,034 B2 | 11/2001 | Jones-Lawlor et al. |
| 6,386,845 B1 | 5/2002 | Bedard |
| 6,480,672 B1 | 11/2002 | Rosenzweig et al. |
| 6,599,088 B2 | 7/2003 | Stagg |
| 6,604,694 B1 | 8/2003 | Kordas et al. |
| D483,851 S | 12/2003 | Fok |
| D485,895 S | 1/2004 | Melwani |
| D486,903 S | 2/2004 | Chiang |
| 6,715,739 B2 | 4/2004 | Mulvaney et al. |
| 6,789,787 B2 | 9/2004 | Stutts |
| 6,791,056 B2 | 9/2004 | VanOtteren et al. |
| 6,830,433 B2 | 12/2004 | Birdsell et al. |
| 6,845,971 B2 | 1/2005 | Bachert |
| D512,772 S | 12/2005 | Lee |
| D513,067 S | 12/2005 | Blateri |
| 7,059,826 B2 | 6/2006 | Lasko |
| 7,088,913 B1 | 8/2006 | Verhoorn et al. |
| 7,147,336 B1 | 12/2006 | Chou |
| D539,414 S | 3/2007 | Russak et al. |
| 7,192,258 B2 | 3/2007 | Kuo et al. |
| 7,198,473 B2 | 4/2007 | Stickland et al. |
| D544,078 S | 6/2007 | Geringer |
| 7,362,964 B2 | 4/2008 | Wang |
| 7,412,781 B2 | 8/2008 | Mattinger et al. |
| 7,478,993 B2 | 1/2009 | Hong et al. |
| 7,540,474 B1 | 6/2009 | Huang et al. |
| D595,835 S | 7/2009 | Fu |
| D598,532 S | 8/2009 | Dyson et al. |
| D602,143 S | 10/2009 | Gammack et al. |
| D602,144 S | 10/2009 | Dyson et al. |

(56) References Cited

U.S. PATENT DOCUMENTS

| | | |
|---|---|---|
| D605,748 S | 12/2009 | Gammack et al. |
| 7,660,110 B2 | 2/2010 | Vinson et al. |
| 7,664,377 B2 | 2/2010 | Liao |
| D614,280 S | 4/2010 | Dyson et al. |
| 7,731,050 B2 | 6/2010 | Parks et al. |
| 7,775,848 B1 | 8/2010 | Auerbach |
| 7,806,388 B2 | 10/2010 | Junkel et al. |
| 7,841,045 B2 | 11/2010 | Shaanan et al. |
| D633,997 S | 3/2011 | Hideharu et al. |
| D633,999 S | 3/2011 | Hideharu et al. |
| 7,931,449 B2 | 4/2011 | Fitton et al. |
| D638,114 S | 5/2011 | Li et al. |
| D643,098 S | 8/2011 | Wallace et al. |
| 8,002,520 B2 | 8/2011 | Dawson et al. |
| D644,726 S | 9/2011 | Hideharu et al. |
| D645,133 S | 9/2011 | Hideharu |
| D646,373 S | 10/2011 | Liebson et al. |
| 8,092,166 B2 | 1/2012 | Nicolas et al. |
| 8,113,490 B2 | 2/2012 | Chen |
| 8,152,495 B2 | 4/2012 | Boggess, Jr. et al. |
| 8,246,317 B2 | 8/2012 | Gammack |
| D669,164 S | 10/2012 | Hsu |
| 8,308,445 B2 | 11/2012 | Gammack et al. |
| D672,023 S | 12/2012 | Wallace et al. |
| D672,024 S | 12/2012 | Fitton et al. |
| 8,348,629 B2 | 1/2013 | Fitton et al. |
| 8,356,804 B2 | 1/2013 | Fitton et al. |
| D676,536 S | 2/2013 | Roach et al. |
| D678,993 S | 3/2013 | Kung-Hua |
| 8,403,640 B2 | 3/2013 | Gammack et al. |
| 8,408,869 B2 | 4/2013 | Hutton et al. |
| D681,793 S | 5/2013 | Li |
| D684,249 S | 6/2013 | Herbst |
| 8,454,322 B2 | 6/2013 | Gammack et al. |
| 8,469,660 B2 | 6/2013 | Dyson et al. |
| 8,529,226 B2 | 9/2013 | Li |
| 8,544,826 B2 | 10/2013 | Ediger et al. |
| D698,018 S | 1/2014 | Choi |
| D700,959 S | 3/2014 | Sickinger et al. |
| 8,684,687 B2 | 4/2014 | Dyson et al. |
| D705,415 S | 5/2014 | Lo |
| 8,721,286 B2 | 5/2014 | Gammack et al. |
| 8,721,307 B2 | 5/2014 | Li |
| 8,764,412 B2 | 7/2014 | Gammack et al. |
| 8,783,663 B2 | 7/2014 | Fitton et al. |
| 8,784,071 B2 | 7/2014 | Gammack |
| 2001/0017212 A1 | 8/2001 | Hirano |
| 2002/0104972 A1 | 8/2002 | Guzorek |
| 2002/0106547 A1 | 8/2002 | Sugawara et al. |
| 2002/0190400 A1 | 12/2002 | Bachert |
| 2003/0059307 A1 | 3/2003 | Moreno et al. |
| 2003/0064677 A1 | 4/2003 | Terrell et al. |
| 2003/0164367 A1 | 9/2003 | Bucher et al. |
| 2003/0171093 A1 | 9/2003 | Gumucio Del Pozo |
| 2003/0190183 A1 | 10/2003 | Hsing |
| 2003/0230477 A1 | 12/2003 | Fink et al. |
| 2004/0022631 A1 | 2/2004 | Birdsell et al. |
| 2004/0049842 A1 | 3/2004 | Prehodka |
| 2004/0106370 A1 | 6/2004 | Honda et al. |
| 2004/0149881 A1 | 8/2004 | Allen |
| 2005/0031448 A1 | 2/2005 | Lasko et al. |
| 2005/0053465 A1 | 3/2005 | Roach et al. |
| 2005/0069407 A1 | 3/2005 | Winkler et al. |
| 2005/0128698 A1 | 6/2005 | Huang |
| 2005/0163670 A1 | 7/2005 | Alleyne et al. |
| 2005/0173997 A1 | 8/2005 | Schmid et al. |
| 2005/0194167 A1 | 9/2005 | Kiyota et al. |
| 2005/0258554 A1 | 11/2005 | Bachert |
| 2005/0281672 A1 | 12/2005 | Parker et al. |
| 2006/0172682 A1 | 8/2006 | Orr et al. |
| 2006/0199515 A1 | 9/2006 | Lasko et al. |
| 2006/0263073 A1 | 11/2006 | Clarke et al. |
| 2006/0279927 A1 | 12/2006 | Strohm |
| 2007/0009354 A1 | 1/2007 | Zahuranec |
| 2007/0035189 A1 | 2/2007 | Matsumoto |
| 2007/0041857 A1 | 2/2007 | Fleig |
| 2007/0065280 A1 | 3/2007 | Fok |
| 2007/0166160 A1 | 7/2007 | Russak et al. |
| 2007/0176502 A1 | 8/2007 | Kasai et al. |
| 2007/0224044 A1 | 9/2007 | Hong et al. |
| 2007/0237500 A1 | 10/2007 | Wang |
| 2007/0269323 A1 | 11/2007 | Zhou et al. |
| 2008/0020698 A1 | 1/2008 | Spaggiari |
| 2008/0124060 A1 | 5/2008 | Gao |
| 2008/0152482 A1 | 6/2008 | Patel |
| 2008/0166224 A1 | 7/2008 | Giffin |
| 2008/0286130 A1 | 11/2008 | Purvines |
| 2008/0314250 A1 | 12/2008 | Cowie et al. |
| 2009/0026850 A1 | 1/2009 | Fu |
| 2009/0032130 A1 | 2/2009 | Dumas et al. |
| 2009/0039805 A1 | 2/2009 | Tang |
| 2009/0060710 A1 | 3/2009 | Gammack et al. |
| 2009/0060711 A1 | 3/2009 | Gammack et al. |
| 2009/0078120 A1 | 3/2009 | Kummer et al. |
| 2009/0120925 A1 | 5/2009 | Lasko |
| 2009/0191054 A1 | 7/2009 | Winkler |
| 2009/0214341 A1 | 8/2009 | Craig |
| 2009/0301482 A1 | 12/2009 | Burton et al. |
| 2010/0133707 A1 | 6/2010 | Huang |
| 2010/0150699 A1 | 6/2010 | Nicolas et al. |
| 2010/0162011 A1 | 6/2010 | Min |
| 2010/0171465 A1 | 7/2010 | Seal et al. |
| 2010/0225012 A1 | 9/2010 | Fitton et al. |
| 2010/0226749 A1 | 9/2010 | Gammack et al. |
| 2010/0226750 A1 | 9/2010 | Gammack |
| 2010/0226751 A1 | 9/2010 | Gammack et al. |
| 2010/0226752 A1 | 9/2010 | Gammack et al. |
| 2010/0226753 A1 | 9/2010 | Dyson et al. |
| 2010/0226754 A1 | 9/2010 | Hutton et al. |
| 2010/0226758 A1 | 9/2010 | Cookson et al. |
| 2010/0226763 A1 | 9/2010 | Gammack et al. |
| 2010/0226764 A1 | 9/2010 | Gammack et al. |
| 2010/0226769 A1 | 9/2010 | Helps |
| 2010/0226771 A1 | 9/2010 | Crawford et al. |
| 2010/0226787 A1 | 9/2010 | Gammack et al. |
| 2010/0226797 A1 | 9/2010 | Fitton et al. |
| 2010/0226801 A1 | 9/2010 | Gammack |
| 2010/0254800 A1 | 10/2010 | Fitton et al. |
| 2011/0058935 A1 | 3/2011 | Gammack et al. |
| 2011/0080724 A1 | 4/2011 | Jörgensen |
| 2011/0110805 A1 | 5/2011 | Gammack et al. |
| 2011/0164959 A1 | 7/2011 | Fitton et al. |
| 2011/0223014 A1 | 9/2011 | Crawford et al. |
| 2011/0223015 A1 | 9/2011 | Gammack et al. |
| 2011/0236228 A1 | 9/2011 | Fitton et al. |
| 2011/0248096 A1 | 10/2011 | Lin et al. |
| 2012/0031509 A1 | 2/2012 | Wallace et al. |
| 2012/0033952 A1 | 2/2012 | Wallace et al. |
| 2012/0034108 A1 | 2/2012 | Wallace et al. |
| 2012/0039705 A1 | 2/2012 | Gammack |
| 2012/0045315 A1 | 2/2012 | Gammack |
| 2012/0045316 A1 | 2/2012 | Gammack |
| 2012/0051884 A1 | 3/2012 | Junkel et al. |
| 2012/0057959 A1 | 3/2012 | Hodgson et al. |
| 2012/0082561 A1 | 4/2012 | Gammack et al. |
| 2012/0093629 A1 | 4/2012 | Fitton et al. |
| 2012/0093630 A1 | 4/2012 | Fitton et al. |
| 2012/0107096 A1 | 5/2012 | Yang et al. |
| 2012/0114513 A1 | 5/2012 | Simmonds et al. |
| 2012/0230658 A1 | 9/2012 | Fitton et al. |
| 2012/0308375 A1 | 12/2012 | Gammack |
| 2012/0318393 A1 | 12/2012 | Tsen |
| 2012/0319311 A1 | 12/2012 | Nutter et al. |
| 2013/0011252 A1 | 1/2013 | Crawford et al. |
| 2013/0026664 A1 | 1/2013 | Staniforth et al. |
| 2013/0028763 A1 | 1/2013 | Staniforth et al. |
| 2013/0028766 A1 | 1/2013 | Staniforth et al. |
| 2013/0077292 A1 | 3/2013 | Zimmerman |
| 2013/0129490 A1 | 5/2013 | Dos Reis et al. |
| 2013/0142676 A1 | 6/2013 | Zou |
| 2013/0143481 A1 | 6/2013 | Kagawa et al. |
| 2013/0161842 A1 | 6/2013 | Fitton et al. |
| 2013/0175711 A1 | 7/2013 | Nutter et al. |
| 2013/0199372 A1 | 8/2013 | Nock et al. |

(56) References Cited

U.S. PATENT DOCUMENTS

| | | | |
|---|---|---|---|
| 2013/0234346 A1 | 9/2013 | Staniforth et al. |
| 2013/0234347 A1 | 9/2013 | Staniforth et al. |
| 2013/0249122 A1 | 9/2013 | Staniforth et al. |
| 2013/0249124 A1 | 9/2013 | Staniforth et al. |
| 2013/0249126 A1 | 9/2013 | Staniforth et al. |
| 2013/0272858 A1 | 10/2013 | Stickney et al. |
| 2013/0280051 A1 | 10/2013 | Nicolas et al. |
| 2013/0280061 A1 | 10/2013 | Stickney |
| 2013/0280096 A1 | 10/2013 | Gammack et al. |
| 2013/0309065 A1 | 11/2013 | Johnson et al. |
| 2013/0309080 A1 | 11/2013 | Johnson et al. |
| 2013/0320574 A1 | 12/2013 | Sickinger et al. |
| 2013/0323100 A1 | 12/2013 | Poulton et al. |
| 2013/0336771 A1 | 12/2013 | Dyson et al. |
| 2014/0017069 A1 | 1/2014 | Peters |
| 2014/0077398 A1 | 3/2014 | Staniforth et al. |
| 2014/0079566 A1 | 3/2014 | Gammack et al. |
| 2014/0084492 A1 | 3/2014 | Staniforth et al. |
| 2014/0210114 A1 | 7/2014 | Staniforth et al. |
| 2014/0210115 A1 | 7/2014 | Staniforth et al. |
| 2014/0255173 A1 | 9/2014 | Poulton et al. |
| 2014/0255217 A1 | 9/2014 | Li |
| 2015/0084214 A1 | 3/2015 | Wilson et al. |
| 2016/0032927 A1 | 2/2016 | Johnson et al. |
| 2016/0032941 A1 | 2/2016 | Beavis et al. |
| 2016/0033148 A1 | 2/2016 | Darvill |

FOREIGN PATENT DOCUMENTS

| | | |
|---|---|---|
| CA | 2155482 | 9/1996 |
| CH | 346643 | 5/1960 |
| CN | 2085866 | 10/1991 |
| CN | 2111392 | 7/1992 |
| CN | 2549372 | 5/2003 |
| CN | 1437300 | 8/2003 |
| CN | 1446116 | 10/2003 |
| CN | 2650005 | 10/2004 |
| CN | 2713643 | 7/2005 |
| CN | 1680727 | 10/2005 |
| CN | 1724950 | 1/2006 |
| CN | 2833197 | 11/2006 |
| CN | 201011346 | 1/2008 |
| CN | 201147215 | 11/2008 |
| CN | 201180678 | 1/2009 |
| CN | 201221477 | 4/2009 |
| CN | 101424279 | 5/2009 |
| CN | 101451754 | 6/2009 |
| CN | 201281416 | 7/2009 |
| CN | 201349269 | 11/2009 |
| CN | 101684828 | 3/2010 |
| CN | 201486901 | 5/2010 |
| CN | 101726100 | 6/2010 |
| CN | 101749288 | 6/2010 |
| CN | 201502549 | 6/2010 |
| CN | 201507461 | 6/2010 |
| CN | 201518985 | 7/2010 |
| CN | 101825096 | 9/2010 |
| CN | 101825101 | 9/2010 |
| CN | 101825102 | 9/2010 |
| CN | 101825103 | 9/2010 |
| CN | 101825104 | 9/2010 |
| CN | 101825324 | 9/2010 |
| CN | 201568337 | 9/2010 |
| CN | 101858355 | 10/2010 |
| CN | 101936310 | 1/2011 |
| CN | 201696365 | 1/2011 |
| CN | 201696366 | 1/2011 |
| CN | 201739199 | 2/2011 |
| CN | 101984299 | 3/2011 |
| CN | 101985948 | 3/2011 |
| CN | 201763705 | 3/2011 |
| CN | 201763706 | 3/2011 |
| CN | 201770513 | 3/2011 |
| CN | 201771875 | 3/2011 |
| CN | 201779080 | 3/2011 |
| CN | 201786777 | 4/2011 |
| CN | 201786778 | 4/2011 |
| CN | 201802648 | 4/2011 |
| CN | 301539668 | 5/2011 |
| CN | 102095236 | 6/2011 |
| CN | 201858204 | 6/2011 |
| CN | 201874898 | 6/2011 |
| CN | 201874901 | 6/2011 |
| CN | 201917047 | 8/2011 |
| CN | 102251973 | 11/2011 |
| CN | 102287357 | 12/2011 |
| CN | 202101355 | 1/2012 |
| CN | 102367813 | 3/2012 |
| CN | 202267207 | 6/2012 |
| CN | 301949285 | 6/2012 |
| CN | 202431623 | 9/2012 |
| CN | 102900654 | 1/2013 |
| CN | 103697556 | 4/2014 |
| DE | 1 291 090 | 3/1969 |
| DE | 24 51 557 | 5/1976 |
| DE | 27 48 724 | 5/1978 |
| DE | 3644567 | 7/1988 |
| DE | 195 10 397 | 9/1996 |
| DE | 197 12 228 | 10/1998 |
| DE | 100 00 400 | 3/2001 |
| DE | 10041805 | 6/2002 |
| DE | 10 2009 039 783 | 4/2010 |
| DE | 10 2009 007 037 | 8/2010 |
| EP | 0 044 494 | 1/1982 |
| EP | 0 186 581 | 7/1986 |
| EP | 0 459 812 | 12/1991 |
| EP | 0 784 947 | 7/1997 |
| EP | 0 846 868 | 6/1998 |
| EP | 1 094 224 | 4/2001 |
| EP | 1 138 954 | 10/2001 |
| EP | 1 357 296 | 10/2003 |
| EP | 1 779 745 | 5/2007 |
| EP | 1 939 456 | 7/2008 |
| EP | 1 980 432 | 10/2008 |
| EP | 2 000 675 | 12/2008 |
| EP | 2191142 | 6/2010 |
| EP | 2 230 467 | 9/2010 |
| EP | 2 414 738 | 2/2012 |
| EP | 2 578 889 | 4/2013 |
| FR | 1033034 | 7/1953 |
| FR | 1119439 | 6/1956 |
| FR | 1387334 | 1/1965 |
| FR | 2 375 471 | 7/1978 |
| FR | 2 534 983 | 4/1984 |
| FR | 2 640 857 | 6/1990 |
| FR | 2 658 593 | 8/1991 |
| FR | 2794195 | 12/2000 |
| FR | 2 874 409 | 2/2006 |
| FR | 2 906 980 | 4/2008 |
| FR | 2928706 | 9/2009 |
| GB | 22235 | 6/1914 |
| GB | 383498 | 11/1932 |
| GB | 593828 | 10/1947 |
| GB | 601222 | 4/1948 |
| GB | 633273 | 12/1949 |
| GB | 641622 | 8/1950 |
| GB | 661747 | 11/1951 |
| GB | 861749 | 2/1961 |
| GB | 863 124 | 3/1961 |
| GB | 1067956 | 5/1967 |
| GB | 1 262 131 | 2/1972 |
| GB | 1 265 341 | 3/1972 |
| GB | 1 278 606 | 6/1972 |
| GB | 1 304 560 | 1/1973 |
| GB | 1 403 188 | 8/1975 |
| GB | 1 434 226 | 5/1976 |
| GB | 1 501 473 | 2/1978 |
| GB | 2 094 400 | 9/1982 |
| GB | 2 107 787 | 5/1983 |
| GB | 2 111 125 | 6/1983 |
| GB | 2 178 256 | 2/1987 |
| GB | 2 185 531 | 7/1987 |
| GB | 2 185 533 | 7/1987 |
| GB | 2 218 196 | 11/1989 |

(56) References Cited

FOREIGN PATENT DOCUMENTS

| | | |
|---|---|---|
| GB | 2 236 804 | 4/1991 |
| GB | 2 240 268 | 7/1991 |
| GB | 2 242 935 | 10/1991 |
| GB | 2 285 504 | 7/1995 |
| GB | 2 289 087 | 11/1995 |
| GB | 2383277 | 6/2003 |
| GB | 2 428 569 | 2/2007 |
| GB | 2 452 593 | 3/2009 |
| GB | 2452490 | 3/2009 |
| GB | 2463698 | 3/2010 |
| GB | 2464736 | 4/2010 |
| GB | 2466058 | 6/2010 |
| GB | 2468312 | 9/2010 |
| GB | 2468313 | 9/2010 |
| GB | 2468315 | 9/2010 |
| GB | 2468317 | 9/2010 |
| GB | 2468319 | 9/2010 |
| GB | 2468320 | 9/2010 |
| GB | 2468323 | 9/2010 |
| GB | 2468328 | 9/2010 |
| GB | 2468329 | 9/2010 |
| GB | 2468331 | 9/2010 |
| GB | 2468369 | 9/2010 |
| GB | 2468498 | 9/2010 |
| GB | 2473037 | 3/2011 |
| GB | 2479760 | 10/2011 |
| GB | 2482547 | 2/2012 |
| GB | 2484671 | 4/2012 |
| GB | 2484695 | 4/2012 |
| GB | 2484761 | 4/2012 |
| GB | 2493231 | 1/2013 |
| GB | 2493505 | 2/2013 |
| GB | 2493507 | 2/2013 |
| GB | 2499041 | 8/2013 |
| GB | 2500005 | 9/2013 |
| GB | 2500010 | 9/2013 |
| GB | 2500011 | 9/2013 |
| GB | 2500012 | 9/2013 |
| GB | 2504415 | 1/2014 |
| JP | 31-13055 | 8/1956 |
| JP | 35-4369 | 3/1960 |
| JP | 39-7297 | 3/1964 |
| JP | 46-7230 | 12/1971 |
| JP | 47-21718 | 10/1972 |
| JP | 49-43764 | 4/1974 |
| JP | 49-150403 | 12/1974 |
| JP | 50-92046 | 8/1975 |
| JP | 51-7258 | 1/1976 |
| JP | 52-121045 | 9/1977 |
| JP | 53-60100 | 5/1978 |
| JP | 56-167897 | 12/1981 |
| JP | 57-71000 | 5/1982 |
| JP | 57-157097 | 9/1982 |
| JP | 61-31830 | 2/1986 |
| JP | 61-116093 | 6/1986 |
| JP | 61-280787 | 12/1986 |
| JP | 62-98099 | 5/1987 |
| JP | 62-223494 | 10/1987 |
| JP | 63-36794 | 3/1988 |
| JP | 63-179198 | 7/1988 |
| JP | 63-198933 | 12/1988 |
| JP | 63-306340 | 12/1988 |
| JP | 64-21300 | 2/1989 |
| JP | 64-58955 | 3/1989 |
| JP | 64-83884 | 3/1989 |
| JP | 1-138399 | 5/1989 |
| JP | 1-224598 | 9/1989 |
| JP | 2-146294 | 6/1990 |
| JP | 2-104872 | 8/1990 |
| JP | 2-218890 | 8/1990 |
| JP | 2-248690 | 10/1990 |
| JP | 3-52515 | 5/1991 |
| JP | 3-267598 | 11/1991 |
| JP | 3-286775 | 12/1991 |
| JP | 4-43895 | 2/1992 |
| JP | 4-366330 | 12/1992 |
| JP | 5-99386 | 4/1993 |
| JP | 5-157093 | 6/1993 |
| JP | 5-164089 | 6/1993 |
| JP | 5-263786 | 10/1993 |
| JP | 6-74190 | 3/1994 |
| JP | 6-86898 | 3/1994 |
| JP | 6-147188 | 5/1994 |
| JP | 6-257591 | 9/1994 |
| JP | 6-280800 | 10/1994 |
| JP | 6-336113 | 12/1994 |
| JP | 7-111174 | 4/1995 |
| JP | 7-190443 | 7/1995 |
| JP | 8-21400 | 1/1996 |
| JP | 8-72525 | 3/1996 |
| JP | 8-313019 | 11/1996 |
| JP | 9-100800 | 4/1997 |
| JP | 9-178083 | 7/1997 |
| JP | 9-287600 | 11/1997 |
| JP | 11-83094 | 3/1999 |
| JP | 11-502586 | 3/1999 |
| JP | 11-227866 | 8/1999 |
| JP | 2000-55419 | 2/2000 |
| JP | 2000-116179 | 4/2000 |
| JP | 2000-201723 | 7/2000 |
| JP | 2001-17358 | 1/2001 |
| JP | 2002-21797 | 1/2002 |
| JP | 2002-138829 | 5/2002 |
| JP | 2002-213388 | 7/2002 |
| JP | 2003-4265 | 1/2003 |
| JP | 2003-161473 | 6/2003 |
| JP | 2003-329273 | 11/2003 |
| JP | 2004-8275 | 1/2004 |
| JP | 2004-208935 | 7/2004 |
| JP | 2004-216221 | 8/2004 |
| JP | 2005-201507 | 7/2005 |
| JP | 2005-307985 | 11/2005 |
| JP | 2006-3042 | 1/2006 |
| JP | 2006-89096 | 4/2006 |
| JP | 2006-189221 | 7/2006 |
| JP | 3124510 | 8/2006 |
| JP | 3127331 | 11/2006 |
| JP | 2007-51826 | 3/2007 |
| JP | 2007-138763 | 6/2007 |
| JP | 2007-138789 | 6/2007 |
| JP | 2008-39316 | 2/2008 |
| JP | 2008-100204 | 5/2008 |
| JP | 2008-107037 | 5/2008 |
| JP | 3144127 | 8/2008 |
| JP | 3146538 | 10/2008 |
| JP | 2008-292078 | 12/2008 |
| JP | 2008-294243 | 12/2008 |
| JP | 2009-44568 | 2/2009 |
| JP | 2009-62986 | 3/2009 |
| JP | D1371413 | 10/2009 |
| JP | 2009-275925 | 11/2009 |
| JP | D1376284 | 12/2009 |
| JP | 2010-46411 | 3/2010 |
| JP | 2010-59845 | 3/2010 |
| JP | 2010-131259 | 6/2010 |
| JP | 2010-203760 | 9/2010 |
| JP | 2010-203764 | 9/2010 |
| JP | 3168517 | 6/2011 |
| JP | 2011-183204 | 9/2011 |
| JP | 2012-31806 | 2/2012 |
| JP | 2012-149842 | 8/2012 |
| JP | 2012-154527 | 8/2012 |
| JP | 2013-508667 | 3/2013 |
| JP | 2013-185821 | 9/2013 |
| KR | 1999-002660 | 1/1999 |
| KR | 10-2005-0102317 | 10/2005 |
| KR | 10-2007-0007997 | 1/2007 |
| KR | 20-0448319 | 3/2010 |
| KR | 10-2010-0055611 | 5/2010 |
| KR | 10-0985378 | 9/2010 |
| KR | 10-2011-0096588 | 8/2011 |
| TW | 517825 | 1/2003 |
| TW | 589932 | 6/2004 |
| TW | M394383 | 12/2010 |

(56) References Cited

FOREIGN PATENT DOCUMENTS

| | | |
|---|---|---|
| TW | M399207 | 3/2011 |
| TW | M407299 | 7/2011 |
| WO | WO-90/13478 | 11/1990 |
| WO | WO-95/06822 | 3/1995 |
| WO | WO-02/073096 | 9/2002 |
| WO | WO-03/058795 | 7/2003 |
| WO | WO-03/069931 | 8/2003 |
| WO | WO-2005/050026 | 6/2005 |
| WO | WO-2005/057091 | 6/2005 |
| WO | WO-2006/008021 | 1/2006 |
| WO | WO-2006/012526 | 2/2006 |
| WO | WO-2007/024955 | 3/2007 |
| WO | WO-2007/048205 | 5/2007 |
| WO | WO-2008/014641 | 2/2008 |
| WO | WO-2008/024569 | 2/2008 |
| WO | WO-2008/139491 | 11/2008 |
| WO | WO-2009/030879 | 3/2009 |
| WO | WO-2009/030881 | 3/2009 |
| WO | WO-2010/100449 | 9/2010 |
| WO | WO-2010/100451 | 9/2010 |
| WO | WO-2010/100452 | 9/2010 |
| WO | WO-2010/100453 | 9/2010 |
| WO | WO-2010/100462 | 9/2010 |
| WO | WO-2011/050041 | 4/2011 |
| WO | WO-2011/147318 | 12/2011 |
| WO | WO-2012/006882 | 1/2012 |
| WO | WO-2012/033517 | 3/2012 |
| WO | WO-2012/052737 | 4/2012 |
| WO | WO-2013/014419 | 1/2013 |
| WO | WO-2013/132218 | 9/2013 |
| WO | WO-2013/132222 | 9/2013 |

OTHER PUBLICATIONS

International Search Report and Written Opinion mailed Nov. 5, 2015, directed to International Application No. PCT/GB2015/052134; 8 pages.
Reba, I. (1966). "Applications of the Coanda Effect," *Scientific American* 214: 84-92.
Third Party Submission Under 37 CFR 1.99 filed Jun. 2, 2011, directed to U.S. Appl. No. 12/203,698; 3 pages.
Staniforth et al., U.S. Office Action mailed Mar. 17, 2015, directed to U.S. Appl. No. 13/785,787; 18 pages.
Staniforth et al., U.S. Office Action mailed Sep. 11, 2015, directed to U.S. Appl. No. 13/785,787; 16 pages.
Staniforth et al., U.S. Office Action mailed Feb. 27, 2015, directed to U.S. Appl. No. 13/786,014; 7 pages.
Staniforth et al., U.S. Office Action mailed Sep. 30, 2015, directed to U.S. Appl. No. 13/786,014; 8 pages.
Staniforth et al., U.S. Office Action mailed Oct. 15, 2015, directed to U.S. Appl. No. 13/786,313; 18 pages.
Staniforth et al., U.S. Office Action mailed Jun. 4, 2015, directed to U.S. Appl. No. 13/784,430; 17 pages.
Staniforth et al., U.S. Office Action mailed Feb. 2, 2016, directed to U.S. Appl. No. 13/784,430; 19 pages.
Staniforth et al., U.S. Office Action mailed Sep. 21, 2015, directed to U.S. Appl. No. 13/785,954; 16 pages.
Staniforth et al., U.S. Office Action mailed Mar. 11, 2016, directed to U.S. Appl. No. 13/785,954; 16 pages.
Staniforth et al., U.S. Office Action mailed Sep. 25, 2015, directed to U.S. Appl. No. 13/786,226; 20 pages.
Staniforth et al., U.S. Office Action mailed Mar. 1, 2016, directed to U.S. Appl. No. 13/786,226; 19 pages.
Staniforth et al., U.S. Office Action mailed Aug. 27, 2015, directed to U.S. Appl. No. 13/786,082; 20 pages.
Staniforth et al., U.S. Office Action mailed Mar. 1, 2016, directed to U.S. Appl. No. 13/786,082; 19 pages.
Dyson et al., U.S. Office Action mailed May 28, 2015, directed to U.S. Appl. No. 29/460,993; 9 pages.
Dyson et al., U.S. Office Action mailed Apr. 27, 2015, directed to U.S. Appl. No. 29/460,994; 6 pages.
Dyson et al., U.S. Office Action mailed Apr. 24, 2015, directed to U.S. Appl. No. 29/460,990; 6 pages.
Dyson et al., U.S. Office Action mailed Apr. 10, 2015, directed to U.S. Appl. No. 29/460,989; 7 pages.
Staniforth et al., U.S. Office Action mailed May 2, 2016, directed to U.S. Appl. No. 14/166,152; 18 pages.
Staniforth et al., U.S. Office Action mailed Mar. 30, 2016, directed to U.S. Appl. No. 14/166,472; 47 pages.
Gammack et al., U.S. Office Action mailed Dec. 9, 2010, directed to U.S. Appl. No. 12/203,698; 10 pages.
Gammack et al., U.S. Office Action mailed Jun. 21, 2011, directed to U.S. Appl. No. 12/203,698; 11 pages.
Gammack et al., U.S. Office Action mailed Sep. 17, 2012, directed to U.S. Appl. No. 13/114,707; 12 pages.
Gammack et al., U.S. Office Action mailed Dec. 10, 2010, directed to U.S. Appl. No. 12/230,613; 12 pages.
Gammack et al., U.S. Office Action mailed May 13, 2011, directed to U.S. Appl. No. 12/230,613; 13 pages.
Gammack et al., U.S. Office Action mailed Sep. 7, 2011, directed to U.S. Appl. No. 12/230,613; 15 pages.
Gammack et al., U.S. Office Action mailed Jun. 8, 2012, directed to U.S. Appl. No. 12/230,613; 15 pages.
Gammack et al., U.S. Office Action mailed Aug. 20, 2012, directed to U.S. Appl. No. 12/945,558; 15 pages.
Gammack et al., U.S. Office Action mailed Feb. 28, 2013, directed to U.S. Appl. No. 12/945,558; 16 pages.
Gammack et al., U.S. Office Action mailed Jun. 12, 2013, directed to U.S. Appl. No. 12/945,558; 20 pages.
Fitton et al., U.S. Office Action mailed Nov. 30, 2010 directed to U.S. Appl. No. 12/560,232; 9 pages.
Nicolas et al., U.S. Office Action mailed Mar. 7, 2011, directed to U.S. Appl. No. 12/622,844; 10 pages.
Nicolas et al., U.S. Office Action mailed Sep. 8, 2011, directed to U.S. Appl. No. 12/622,844; 11 pages.
Helps et al., U.S. Office Action mailed Feb. 15, 2013, directed to U.S. Appl. No. 12/716,694; 12 pages.
Gammack et al., U.S. Office Action mailed Dec. 9, 2010, directed to U.S. Appl. No. 12/716,781; 17 pages.
Gammack et al., U.S. Office Action mailed Jun. 24, 2011, directed to U.S. Appl. No. 12/716,781; 19 pages.
Gammack et al., U.S. Office Action mailed May 29, 2013, directed to U.S. Appl. No. 13/588,666; 11 pages.
Gammack et al., U.S. Office Action mailed Sep. 27, 2013, directed to U.S. Appl. No. 13/588,666; 10 pages.
Gammack et al., U.S. Office Action mailed Mar. 14, 2013, directed to U.S. Appl. No. 12/716,740; 15 pages.
Gammack et al., U.S. Office Action mailed Sep. 6, 2013, directed to U.S. Appl. No. 12/716,740; 15 pages.
Gammack et al., U.S. Office Action mailed Apr. 24, 2014, directed to U.S. Appl. No. 12/716,740; 16 pages.
Li et al., U.S. Office Action mailed Oct. 25, 2013, directed to U.S. Appl. No. 13/686,480; 17 pages.
Fitton et al., U.S. Office Action mailed Jun. 13, 2014, directed to U.S. Appl. No. 13/274,998; 11 pages.
Fitton et al., U.S. Office Action mailed Jun. 13, 2014, directed to U.S. Appl. No. 13/275,034; 10 pages.
Gammack et al., U.S. Office Action mailed Feb. 14, 2013, directed to U.S. Appl. No. 12/716,515; 21 pages.
Gammack et al., U.S. Office Action mailed Aug. 19, 2013, directed to U.S. Appl. No. 12/716,515; 20 pages.
Gammack et al., U.S. Office Action mailed Feb. 10, 2014, directed to U.S. Appl. No. 12/716,515; 21 pages.
Fitton et al., U.S. Office Action mailed Mar. 30, 2012, directed to U.S. Appl. No. 12/716,707; 7 pages.
Fitton et al., U.S. Office Action mailed Dec. 31, 2013, directed to U.S. Appl. No. 13/718,693; 8 pages.
Staniforth et al., U.S. Office Action mailed Sep. 18, 2014, directed to U.S. Appl. No. 13/559,142; 18 pages.
Gammack et al. U.S. Office Action mailed Oct. 18, 2012, directed to U.S. Appl. No. 12/917,247; 11 pages.
Gammack et al., U.S. Office Action mailed Sep. 3, 2014, directed to U.S. Appl. No. 13/861,891; 7 pages.

(56) References Cited

OTHER PUBLICATIONS

Wallace et al., U.S. Office Action mailed Jun. 7, 2013, directed to U.S. Appl. No. 13/192,223; 30 pages.
Wallace et al., U.S. Office Action mailed Oct. 23, 2013, directed to U.S. Appl. No. 13/192,223; 18 pages.
Gammack et al., U.S. Office Action mailed Apr. 12, 2011, directed to U.S. Appl. No. 12/716,749; 8 pages.
Gammack et al., U.S. Office Action mailed Sep. 1, 2011, directed to U.S. Appl. No. 12/716,749; 9 pages.
Gammack et al., U.S. Office Action mailed Jun. 25, 2012, directed to U.S. Appl. No. 12/716,749; 11 pages.
Gammack et al., U.S. Office Action mailed May 24, 2011, directed to U.S. Appl. No. 12/716,613; 9 pages.
Fitton et al., U.S. Office Action mailed Mar. 8, 2011, directed to U.S. Appl. No. 12/716,780; 12 pages.
Fitton et al., U.S. Office Action mailed Sep. 6, 2011, directed to U.S. Appl. No. 12/716,780; 16 pages.
Dos Reis et al., U.S. Office Action mailed Sep. 23, 2014, directed to U.S. Appl. No. 29/466,240; 9 pages.
Dos Reis et al., U.S. Office Action mailed Sep. 24, 2014, directed to U.S. Appl. No. 29/466,229; 9 pages.
Dos Reis et al., U.S. Office Action mailed Sep. 19, 2014, directed to U.S. Appl. No. 29/466,190; 9 pages.
Mcpherson et al., U.S. Office Action mailed Sep. 19, 2014, directed to U.S. Appl. No. 29/466,094; 8 pages.
Mcpherson et al., U.S. Office Action mailed Sep. 19, 2014, directed to U.S. Appl. No. 29/466,241; 8 pages.
Mcpherson et al., U.S. Office Action mailed Sep. 19, 2014, directed to U.S. Appl. No. 29/466,253; 7 pages.
Dyson et al., U.S. Office Action mailed Sep. 12, 2014, directed to U.S. Appl. No. 29/480,896; 10 pages.
Dyson et al., U.S. Office Action mailed Sep. 12, 2014, directed to U.S. Appl. No. 29/480,915; 9 pages.
Poulton et al., U.S. Office Action mailed Sep. 12, 2014, directed to U.S. Appl. No. 29/480,919; 10 pages.
Deniss. (Sep. 9, 2010) "iFan, The Chinese Clone of the Dyson Air Multiplier," located at <http://chinitech.com/en/chinese-clones/ifan-le-clone-chinois-du-dyson-air-multiplier> visited on Aug. 29, 2014. (6 pages).
Amee. (Mar. 29, 2012) "Breeze Right Bladeless Fan Up to 41% Off," located at <http://madamedeals.com/breeze-right-bladeless-fan-up-to-41-off/> visited on Sep. 3, 2014. (2 pages).
Questel. (Jun. 11, 2014) "Designs-Questel" located at <http://sobjprd.questel.fr/export/QPTUJ214/pdf2/19f053ea-a60f-4c58-9232-c458147a9adf-224304.pdf/> visited on Sep. 4, 2014. (67 pages).
Amazon. "Pisenic Bladeless Fan 16 Inches with Remote Control, Bladeless Fan Air Conditioner 110v, Air Multiplier Table Fans, Green," located at <http://www.amazon.com/Pisenic-Bladeless-Fan-16-Conditioner/dp/B007VC178M%3FSubscriptionid%3DAKIAJYLII7AAJMX7ETAA%26tag%3Dtk78-20%26linkCode%3Dxm2%26camp%3D2025%26creative%3D165953%26creativeASIN%3DB007VC178M#cm_cr_dpwidget> visited on Sep. 2, 2014. (4 pages).
Steiner, L., (May 14, 2013) "Dyson Fan Heater Review: Cozy Up to Dyson Fan Heater," located at <http://www.vissbiz.com/dyson-fan-heater-review/cozy-up-to-dyson-fan-heater/> visited on Sep. 3, 2014. (3 pages).
Staniforth et al., U.S. Office Action mailed May 25, 2016, directed to U.S. Appl. No. 13/786,313; 19 pages.
Staniforth et al., U.S. Office Action mailed Jun. 28, 2016, directed to U.S. Appl. No. 13/785,787; 16 pages.
Staniforth et al., U.S. Office Action mailed Aug. 19, 2016, directed to U.S. Appl. No. 13/784,430; 20 pages.

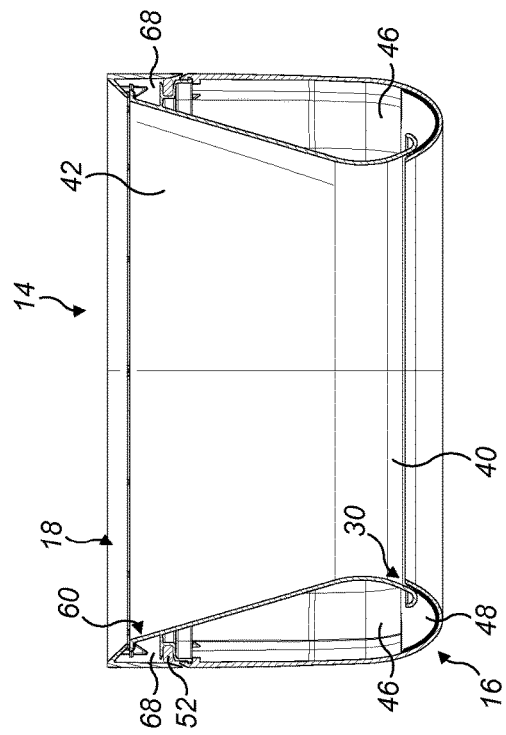
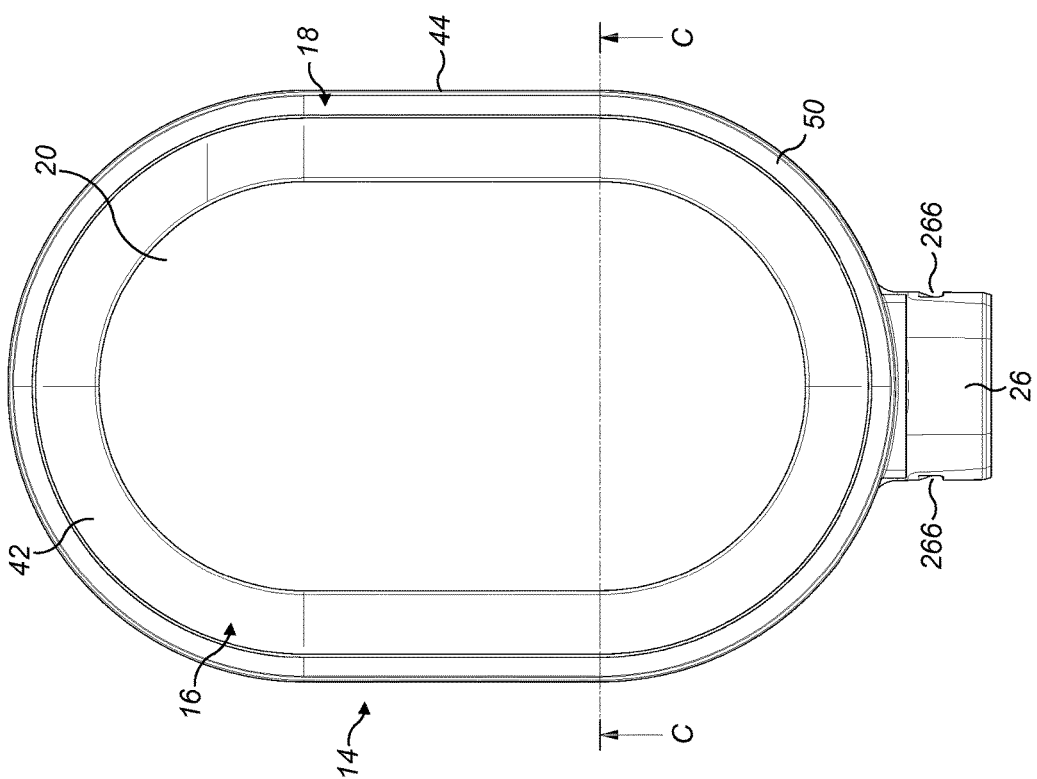
FIG. 5(b)
FIG. 5(a)

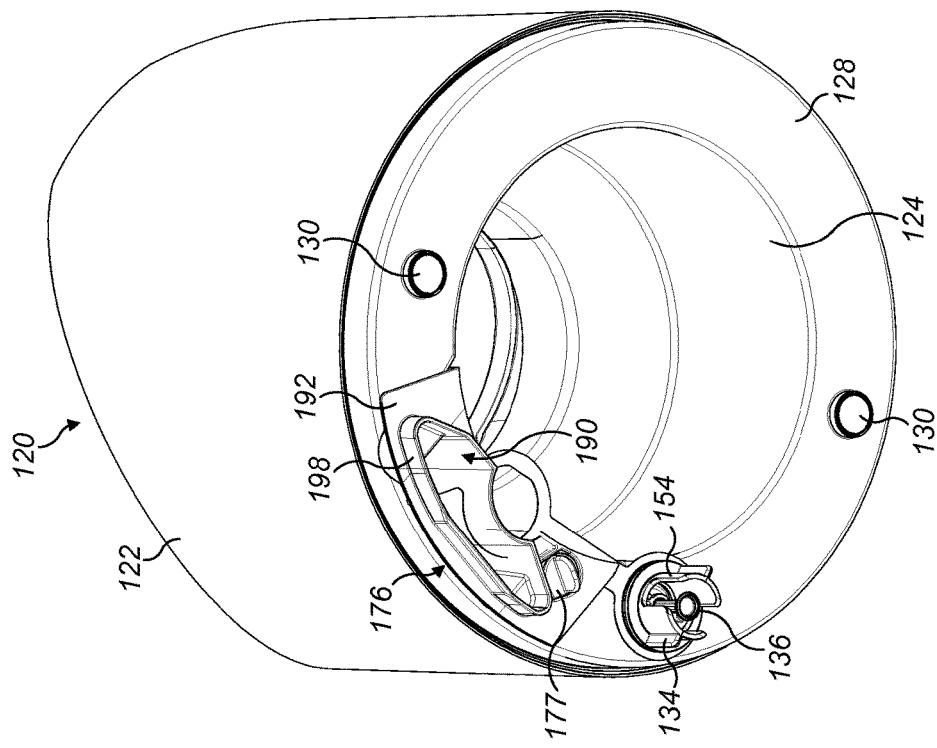
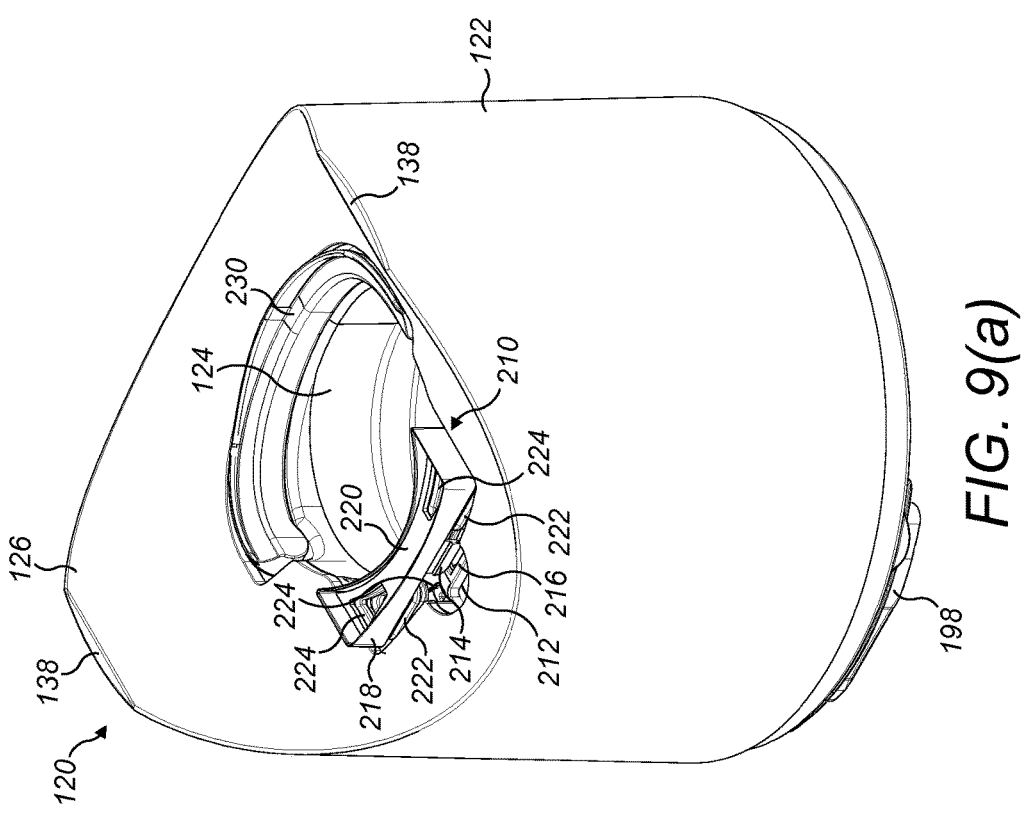
FIG. 9(b)
FIG. 9(a)

HUMIDIFYING APPARATUS

REFERENCE TO RELATED APPLICATIONS

This application claims the priority of United Kingdom Application No. 1413428.2, filed Jul. 29, 2014, the entire contents of which are incorporated herein by reference.

FIELD OF THE INVENTION

The present invention relates to a humidifying apparatus. In a preferred embodiment, the present invention provides a humidifying apparatus for generating a flow of moist air and a flow of air for dispersing the moist air within a domestic environment, such as a room, office or the like.

BACKGROUND OF THE INVENTION

Domestic humidifying apparatus is generally in the form of a portable appliance having a casing comprising a water tank for storing a volume of water, and a fan for creating a flow of air through an air duct of the casing. The stored water is conveyed, usually under gravity, to an atomizing device for producing water droplets from the received water. This device may be in the form of a heater or a high frequency vibrating device, such as a transducer. The water droplets enter the flow of air passing through the air duct, resulting in the emission of a mist into the environment. The appliance may include a sensor for detecting the relative humidity of the air in the environment. The sensor outputs a signal indicative of the detected relative humidity to a drive circuit, which controls the transducer to maintain the relative humidity of the air in the environment around a desired level. Typically, the actuation of the transducer is stopped when the detected relative humidity is around 5% higher than the desired level, and is restarted when the detected relative humidity is around 5% lower than the desired level.

It is known to provide an ultraviolet radiation (UV) emitting lamp or other UV generator to sterilize water that is conveyed to the atomizing device. For example, U.S. Pat. No. 5,859,952 describes a humidifier in which the water supplied from a tank is conveyed through a sterilizing chamber before being conveyed by a pipe to a chamber containing an ultrasonic atomizer. The sterilizing chamber has a UV transparent window beneath which a UV lamp is located to irradiate water as it passes through the sterilizing chamber. U.S. Pat. No. 7,540,474 describes a humidifier in which the water tank includes a UV transparent tube for conveying water to an outlet of the tank, and a main body upon which the tank is mounted includes a UV lamp which irradiates water as it passes through the tube to the outlet.

WO 2013/132222 describes a humidifier which comprises a body and an annular nozzle detachably mounted on the body. The body comprises a base and a water tank removably mounted on the base. A motor-driven impeller located within the base draws an air flow into the humidifier through air inlets located in the outer casing of the base. A first air passageway located downstream from the impeller conveys a first part of the air flow to an annular first interior passage within the nozzle. The first part of the air flow is emitted from a first air outlet of the nozzle. A second air passageway located downstream from the impeller conveys a second part of the air flow over a water reservoir which receives water from the water tank. Transducers located within the water reservoir atomize water stored in the water reservoir to humidify the second part of the air flow. An outlet duct defined by the water tank conveys the humidified air flow to an annular second interior passage of the nozzle. The humidified air flow is emitted from a second air outlet of the nozzle so that the humidified air flow becomes entrained within the air emitted from the first air outlet of the nozzle.

The base has a relatively wide cylindrical outer wall, a relatively narrow cylindrical inner wall located above and co-axial with the outer wall, and a recessed annular wall which extends between the inner wall and the outer wall. These walls of the base define the water reservoir, and so the water reservoir is exposed when the water tank is removed from the base. The water reservoir includes a UV transparent tube housing a UV lamp for irradiating water stored in the water reservoir, and baffle plates for guiding water entering the water reservoir from the water tank over the tube so that it is irradiated by the UV lamp before being atomized by the transducers. The water tank is annular in shape, and is mounted by the user on the annular wall of the base so as to surround the inner wall of the base. The base includes a proximity sensor for detecting that the water tank has been mounted on the base. A drive circuit deactivates the motor, the UV lamp and the transducers in response to signal received from the proximity sensor indicating that the water tank has been removed from the base.

SUMMARY OF THE INVENTION

In a first aspect, the present invention provides humidifying apparatus comprising a base comprising a chamber, a water tank removably mounted on the base for supplying water to the chamber, an impeller and a motor for driving the impeller to generate an air flow, an inlet duct for conveying the air flow to the chamber, humidifying means for humidifying the air flow with water from the chamber, an ultraviolet radiation generator for irradiating water stored in the chamber, and an outlet duct for conveying the humidified air flow from the chamber, wherein a detachable section of the apparatus is opaque to ultraviolet radiation and is positioned over the chamber, the detachable section comprising an air inlet of the outlet duct and a flange for occluding a peripheral portion of the chamber.

In addition to providing at least part of an outlet duct for conveying a humidified air flow away from the chamber, the detachable section of the apparatus can also provide a cover for the chamber. Forming the detachable section from material which is opaque to ultraviolet radiation can inhibit any leakage of ultraviolet radiation both through the detachable section of the apparatus and from the peripheral portion of the chamber. The flange also inhibits leakage of air from the peripheral portion of the chamber. Having these features formed in a detachable section of the apparatus can enable the chamber and the detachable section to be easily cleaned by the user when the detachable section has been detached from the apparatus.

The detachable section of the apparatus is preferably detachably connected to the water tank so that it is positioned over the chamber when the water tank is mounted on the base, but alternatively the detachable section of the apparatus may be detachably connected to the base.

Preferably, the detachable section also comprises an air outlet of the inlet duct. The air outlet of the inlet duct is preferably co-planar with the air inlet of the outlet duct, so that the air inlet of the outlet duct and the air outlet of the inlet duct are located at the same distance above the level of the water stored in the chamber. The air outlet of the inlet duct is preferably located adjacent to the air inlet of the outlet duct to minimize the length of the flow path between the air outlet of the inlet duct and the air inlet of the outlet duct.

The detachable section preferably comprises a wall depending from at least part of the flange for guiding the air flow from the air outlet of the inlet duct towards the air inlet of the outlet duct. The wall is preferably annular in shape and positioned so as to delimit, and so to extend about, a flow channel located directly beneath the air outlet of the inlet duct and the air inlet of the outlet duct.

If the ultraviolet radiation generator is omitted from the apparatus, then the detachable section of the apparatus need not be formed from material which is opaque to ultraviolet radiation, and the flange may also be omitted. In a second aspect, the present invention provides humidifying apparatus comprising a base comprising a chamber, a water tank removably mounted on the base for supplying water to the chamber, an impeller and a motor for driving the impeller to generate an air flow, an inlet duct for conveying the air flow to the chamber, humidifying means for humidifying the air flow with water from the chamber, and an outlet duct for conveying the humidified air flow from the chamber, wherein a detachable section of the apparatus is positioned over the chamber, the detachable section comprising an air outlet of the inlet duct, an air inlet of the outlet duct, the air outlet of the inlet duct being positioned adjacent to the air inlet of the outlet duct, and an annular wall for delimiting a flow channel located directly beneath the air outlet of the inlet duct and the air inlet of the outlet duct.

When the chamber is filled with water to a maximum level, the annular wall preferably extends into the water stored in the chamber, establishing an interface between the annular wall and the stored water which forms a seal for inhibiting the leakage of air from the flow channel.

The detachable section may comprise an air inlet of the inlet duct, with the base comprising an air passageway for conveying the air flow from the impeller to the air inlet of the inlet duct. The air inlet of the inlet duct is preferably arranged on a side wall of the detachable section which faces the base, the base comprising an air flow port for emitting the air flow towards the air inlet of the inlet duct.

The humidifying means preferably comprises a transducer for atomizing water stored in the chamber. The air inlet of the outlet duct is preferably located directly above the transducer.

The water tank is preferably annular in shape, and is mounted on the base so as to surround at least part of the base. For example, the base preferably comprises a cylindrical or tubular wall which surrounds the motor and the impeller, and the water tank is preferably mounted on the base so as to surround this tubular wall. The water tank preferably comprises an annular inner wall which is opaque to ultraviolet radiation and an annular outer wall which is transparent to visible light to allow a user to see the amount of water remaining in the tank. The detachable section is preferably detachably connected to the annular inner wall of the water tank, for example by a releasable catch.

The outlet duct may comprise a plurality of sections which extend between the air inlet of the outlet duct and at least one air outlet of the outlet duct. The outlet duct preferably comprises an inlet section and an outlet section, and wherein the detachable section of the apparatus defines the inlet section of the outlet duct, and the detachable section of the apparatus and the annular inner wall of the water tank together define the outlet section of the outlet duct. The detachable section preferably includes a seal for engaging the annular inner wall of the water tank to inhibit leakage of the humidified air flow from between these two components.

In a preferred embodiment, the outlet duct comprises a plurality of air outlets. For example, the outlet duct may be bifurcated into a pair of duct branches, with each of the branches comprising a respective air outlet of the outlet duct. The outlet duct may be bifurcated to allow the duct to convey the humidified air flow about or around part of the apparatus, allowing the apparatus to maintain a compact appearance. For example, the apparatus may comprise an air outlet detachably mounted on the base, and releasing means for releasing the air outlet for removal from the base, the releasing means comprising a user operable button mounted on the base. The outlet duct may be bifurcated into a pair of duct branches between which the button is positioned.

As mentioned above, the detachable section preferably forms part of, or is connected to, the water tank, and so the humidified air flow is preferably emitted from part of the water tank into the air outlet. The water tank preferably comprises a seal for engaging the air outlet and a support for supporting the seal, the detachable section being detachably connected to the support. The support and the seal preferably comprise at least one aperture for conveying the humidified air flow from the duct to the air outlet. The seal preferably comprises a relatively rigid frame and a relatively flexible, resilient part carried by the frame for engaging the air outlet and for urging the frame towards the air outlet. The frame is preferably connected to the support so as to allow movement of the seal relative to the support. The frame may also be detachable from the support to allow the seal to be cleaned or replaced by the user. The resilient part of the seal may comprise a first section which is surrounded by the frame for engaging the air outlet, and a second section which is located between the frame and the support for urging the frame towards the air outlet. The second section of the resilient part of the seal may have an undulating or bellows shape. The first section of the resilient part of the seal may also have an undulating or bellows shape.

In a third aspect, the present invention provides humidifying apparatus comprising, a base comprising a chamber, a water tank removably mounted on the base for supplying water to the chamber, an impeller and a motor for driving the impeller to generate an air flow, an inlet duct for conveying the air flow to the chamber, humidifying means for humidifying the air flow with water from the chamber, and an outlet duct for conveying the humidified air flow from the chamber to an air outlet of the apparatus, the outlet duct being bifurcated into a pair of duct branches, each of the branches comprising a respective air outlet of the outlet duct, wherein a detachable section of the apparatus is positioned over the chamber, the detachable section comprising an air inlet of the outlet duct and at least partially defining said duct branches, and wherein the water tank comprises a seal for engaging the air outlet of the apparatus and a support for supporting the seal, and wherein the detachable section of the apparatus is detachably connected to the support.

Features described above in connection with the first aspect of the invention are equally applicable to each of the second and third aspects of the invention, and vice versa.

BRIEF DESCRIPTION OF THE DRAWINGS

An embodiment of the present invention will now be described, by way of example only, with reference to the accompanying drawings, in which:

FIG. 5(a) is a front view of a nozzle of the humidifying apparatus, FIG. 5(b) is a bottom sectional view taken along line C-C in FIG. 5(a)

FIG. 9(a) is a front perspective view, from above, of a water tank of the humidifying apparatus, FIG. 9(b) is a front perspective view, from below, of the water tank.

DETAILED DESCRIPTION OF THE INVENTION

Figure 1:
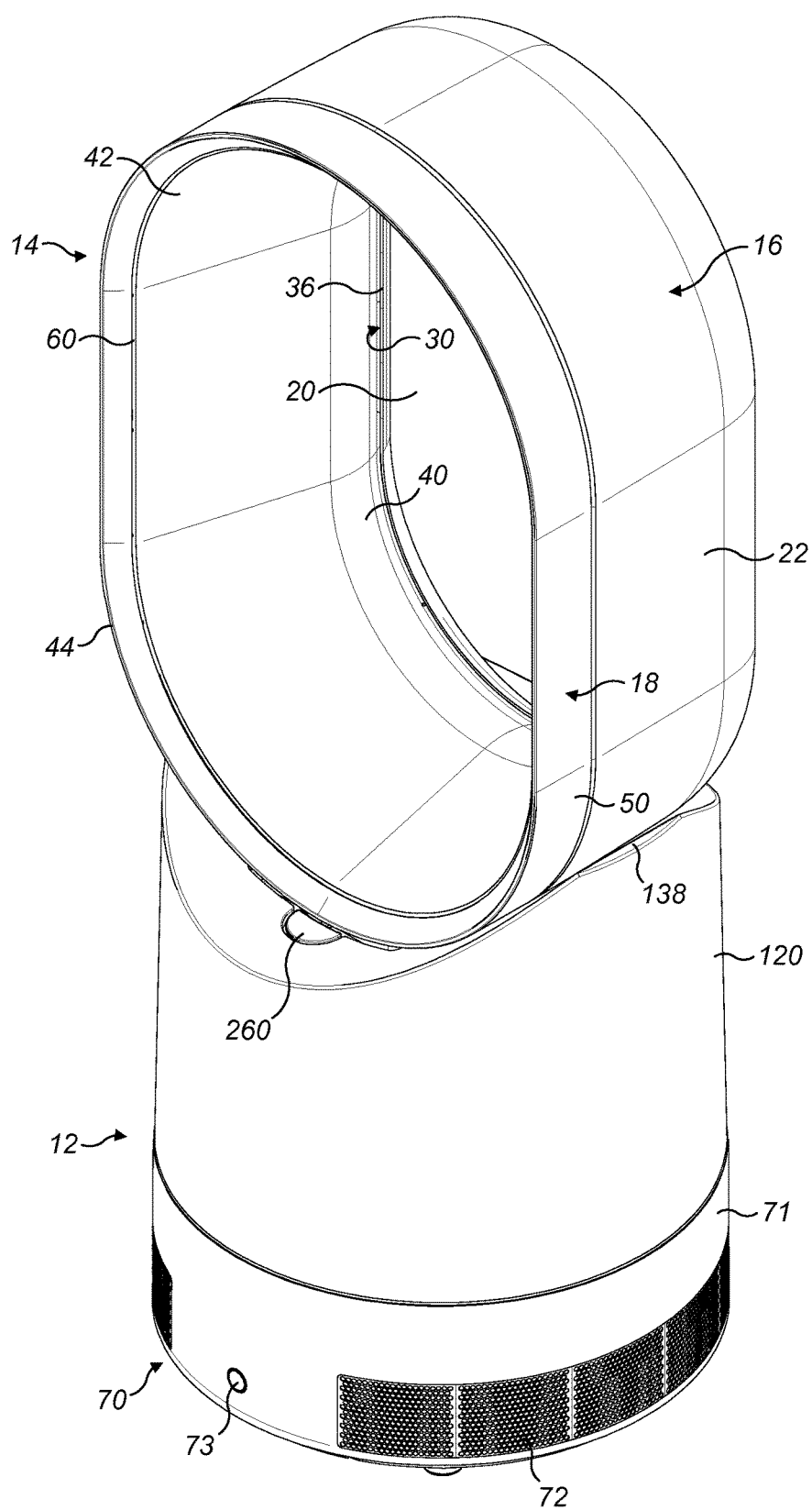
FIG. 1 is a front perspective view of a humidifying apparatus.
Figure 2:
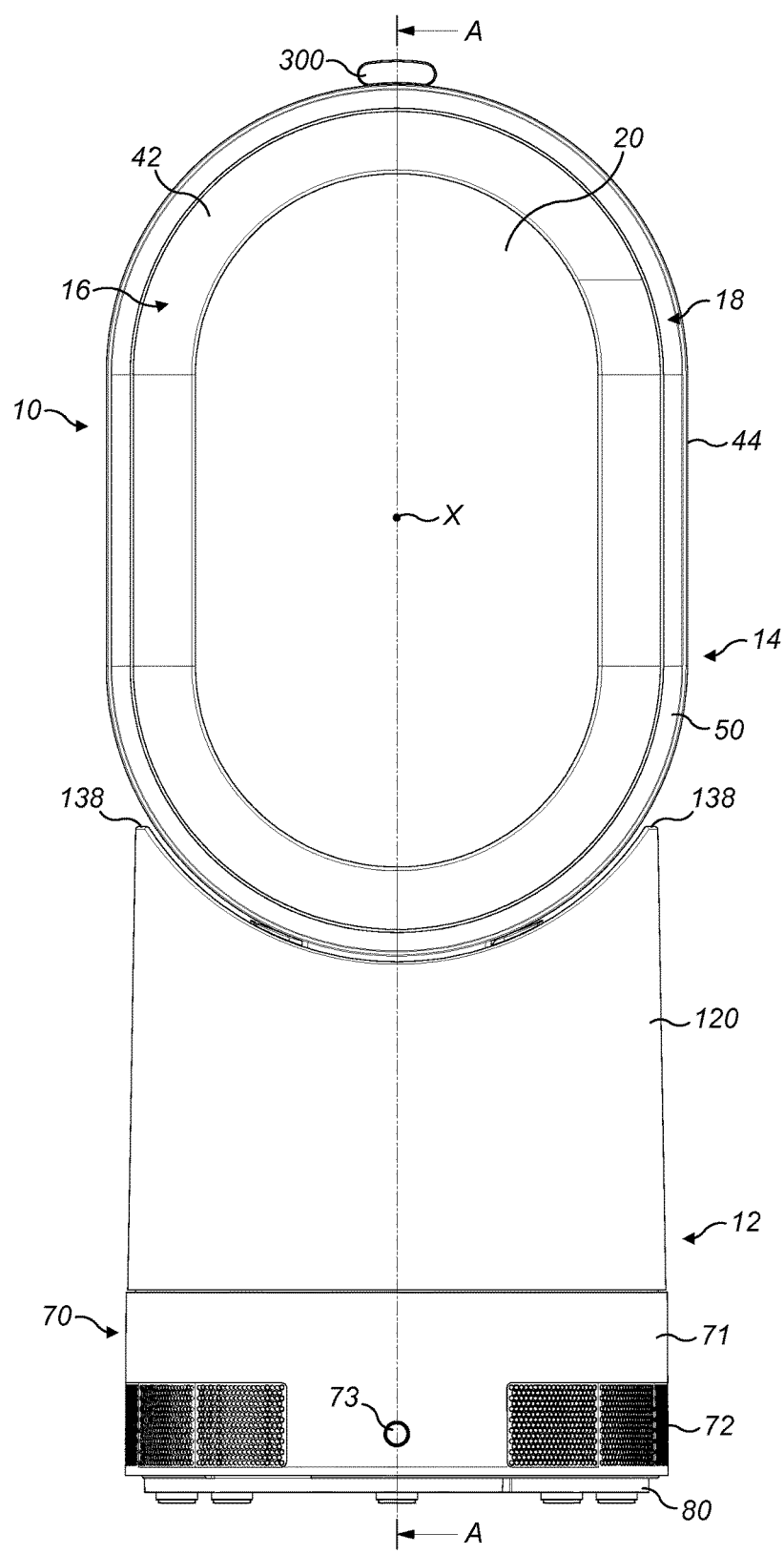
FIG. 2 is a front view of the humidifying apparatus.
Figure 3:
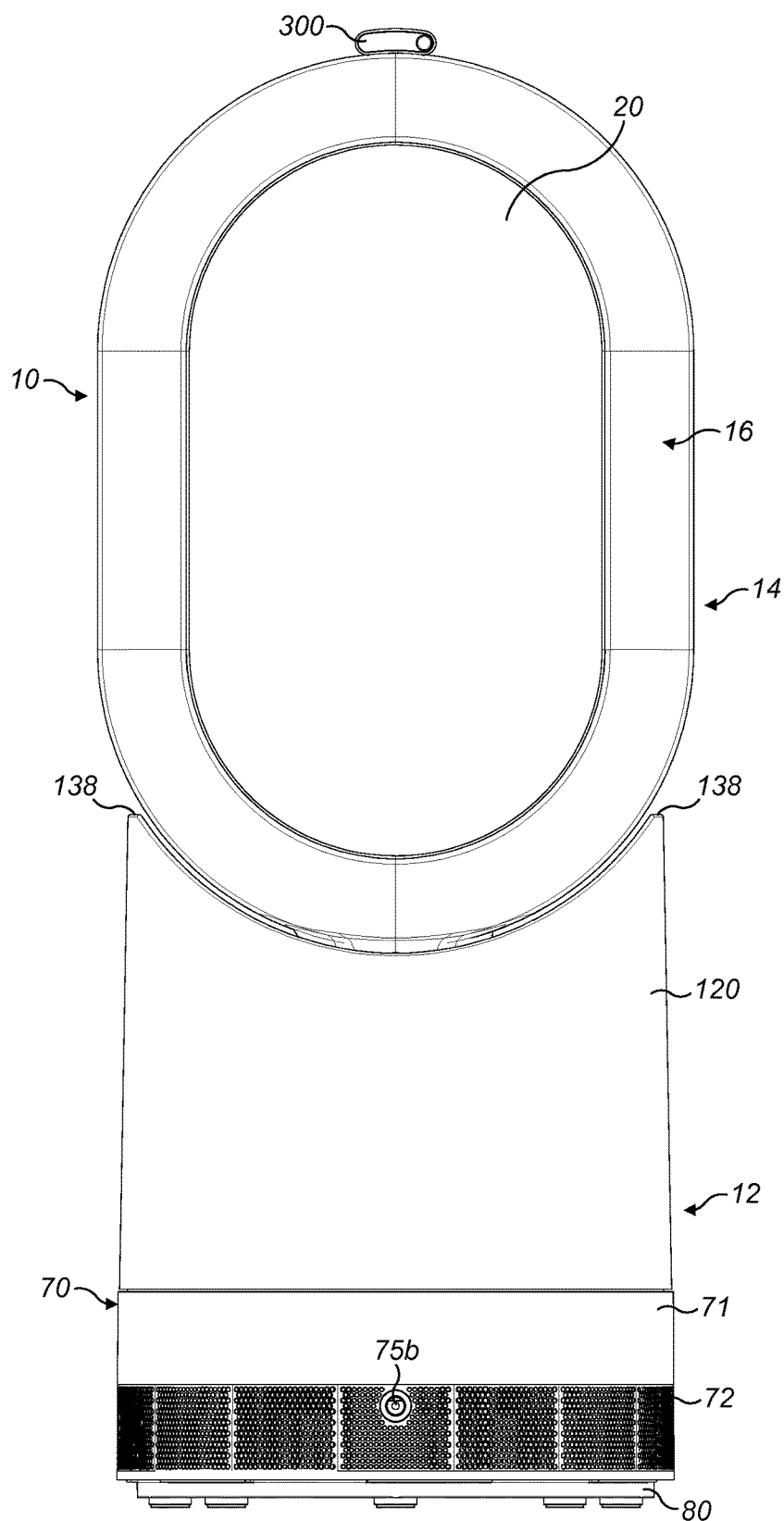
FIG. 3 is a rear view of the humidifying apparatus.

FIGS. 1 to 3 are external views of a fan assembly. In this example, the fan assembly is in the form of a humidifying apparatus 10. In overview, the humidifying apparatus 10 comprises a body 12 comprising an air inlet through which air enters the humidifying apparatus 10, and a nozzle 14 in the form of an annular casing mounted on the body 12, and which comprises a plurality of air outlets for emitting air from the humidifying apparatus 10.

The nozzle 14 is arranged to emit two different air flows. The nozzle 14 comprises a rear section 16 and a front section 18 connected to the rear section 16. Each section 16, 18 is annular in shape, and extends about a bore 20 of the nozzle 14. The bore 20 extends centrally through the nozzle 14 so that the centre of each section 16, 18 is located on the axis X of the bore 20.

In this example, each section 16, 18 has a "racetrack" shape, in that each section 16, 18 comprises two, generally straight sections located on opposite sides of the bore 20, a curved upper section joining the upper ends of the straight sections and a curved lower section joining the lower ends of the straight sections. However, the sections 16, 18 may have any desired shape; for example the sections 16, 18 may be circular or oval. In this embodiment, the height of the nozzle 14 is greater than the width of the nozzle, but the nozzle 14 may be configured so that the width of the nozzle 14 is greater than the height of the nozzle 14.

Each section 16, 18 of the nozzle 14 defines a flow path along which a respective one of the air flows passes. In this embodiment, the rear section 16 of the nozzle 14 defines a first air flow path along which a first air flow passes through the nozzle 14, and the front section 18 of the nozzle 14 defines a second air flow path along which a second air flow passes through the nozzle 14.

Figure 4A:
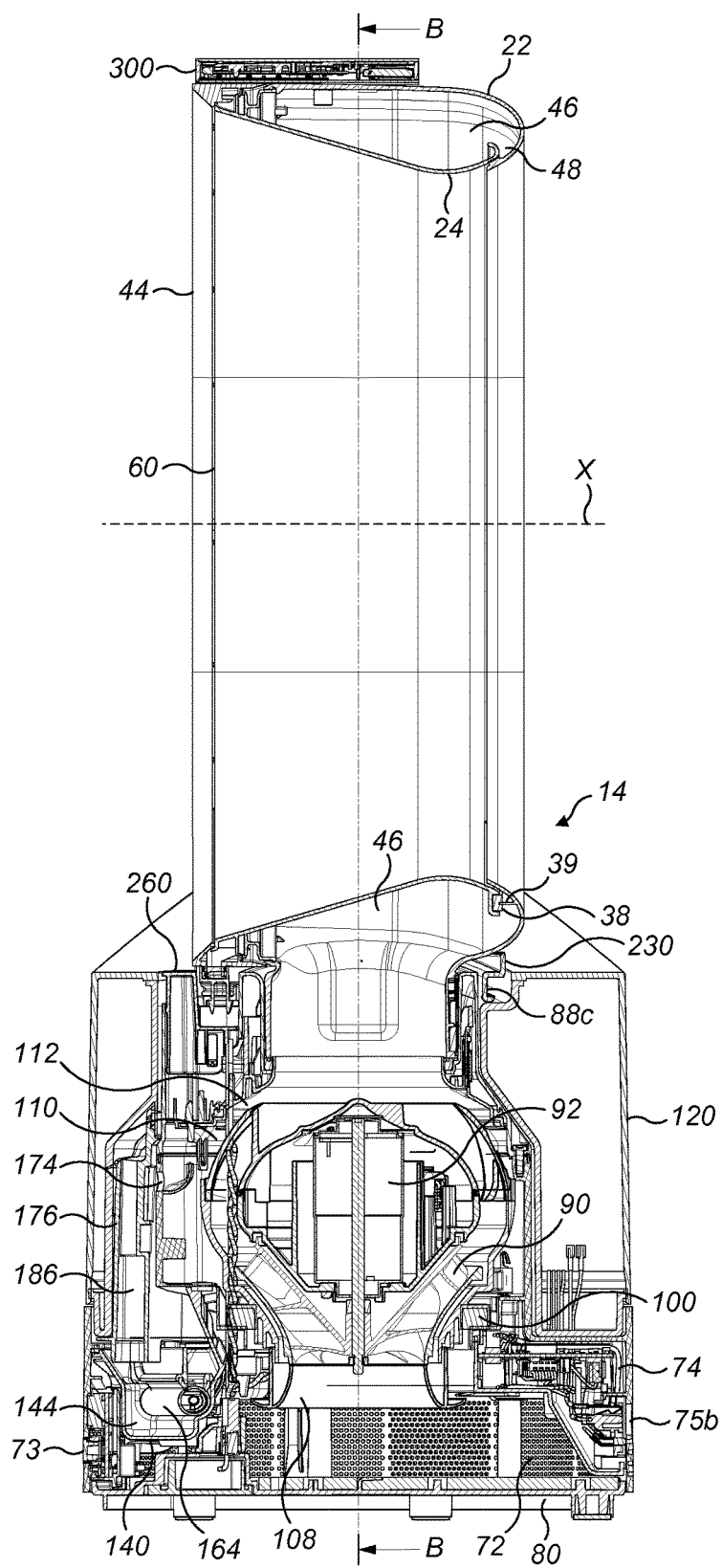
FIG. 4(a) is a side sectional view of the humidifying apparatus taken along line A-A in FIG. 2.
Figure 4B:
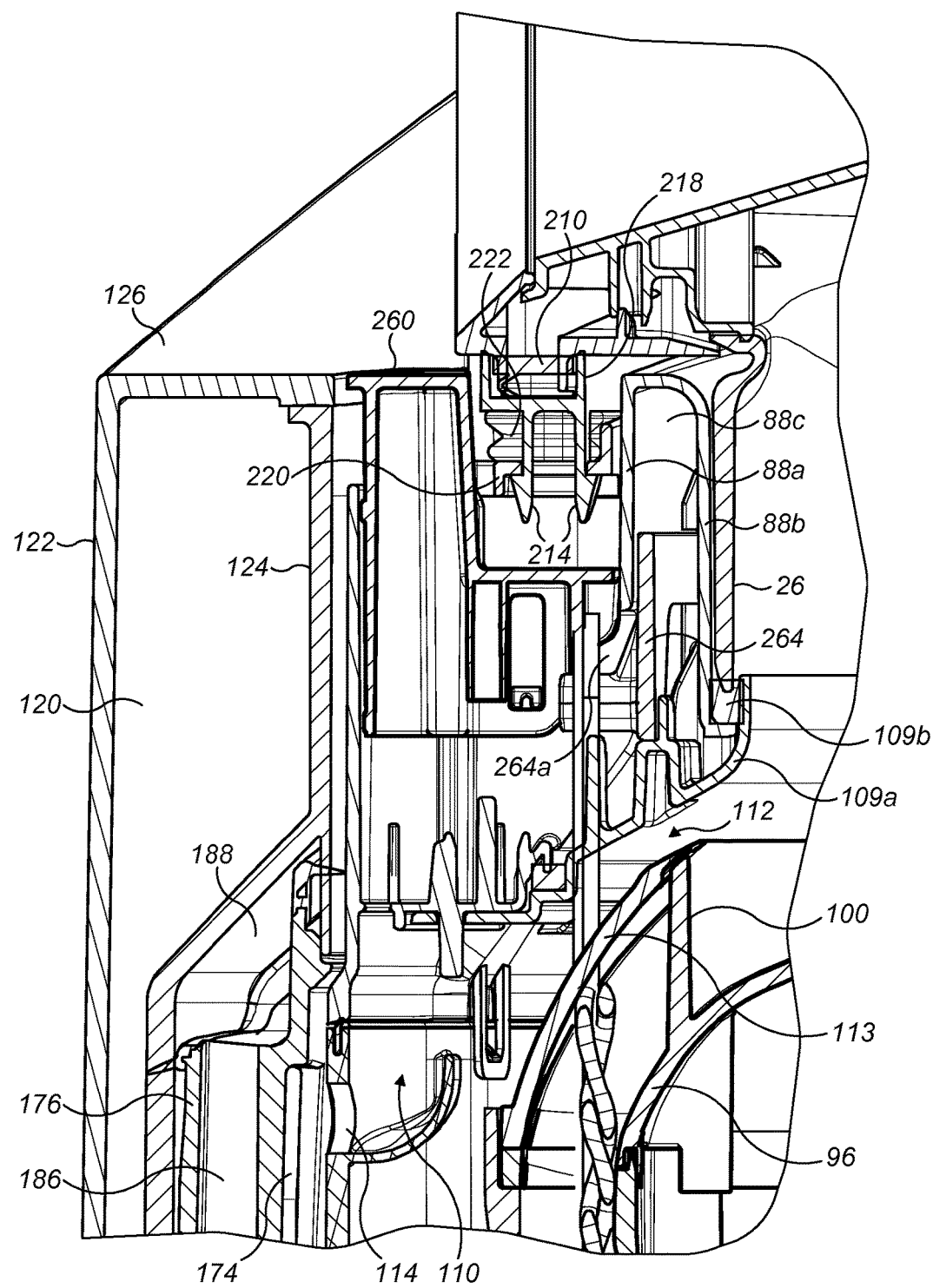
FIG. 4(b) is a close up of a first part of FIG. 4(a)
Figure 4C:
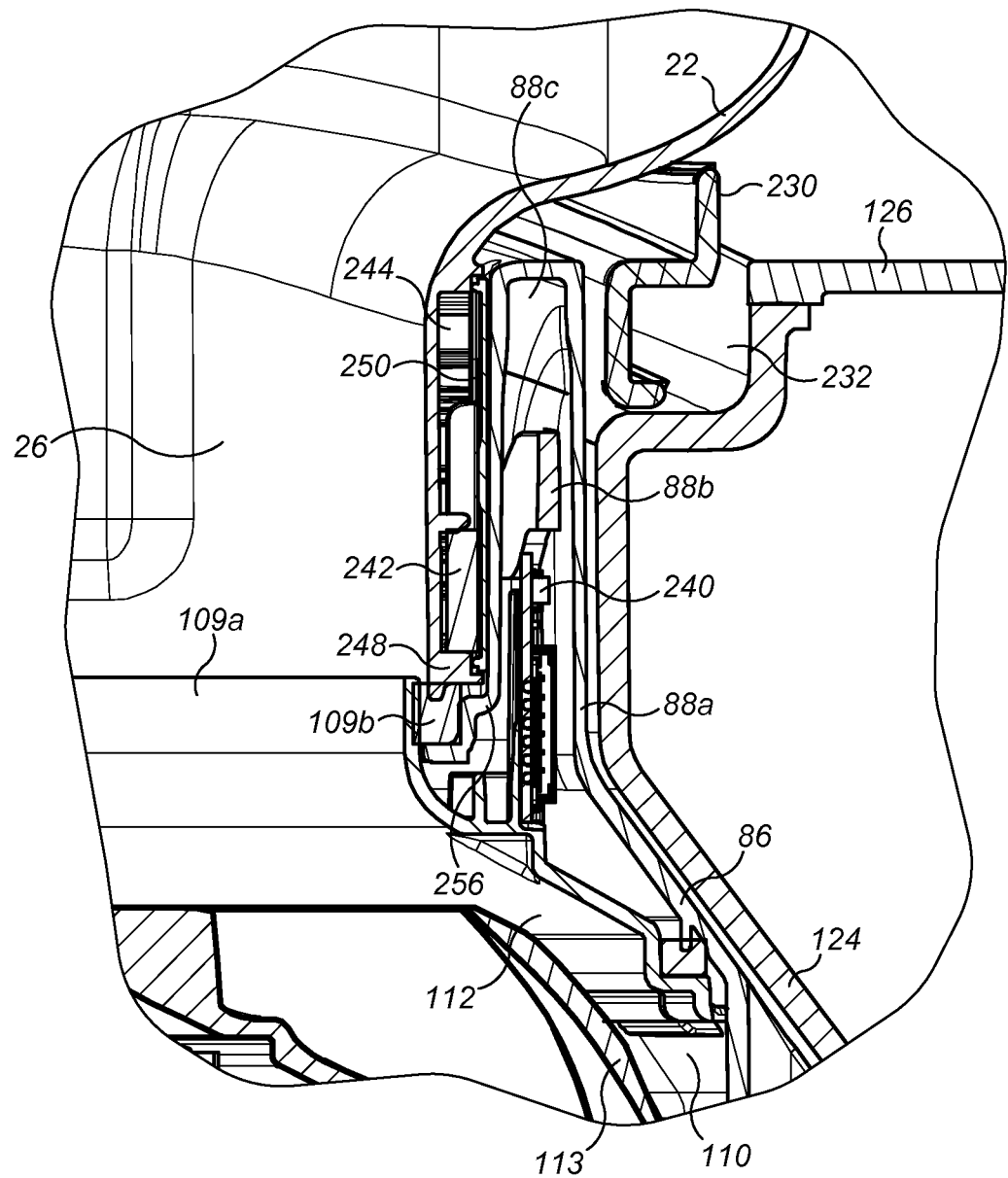
FIG. 4(c) is a close up of a second part of FIG. 4(a)
Figure 4D:
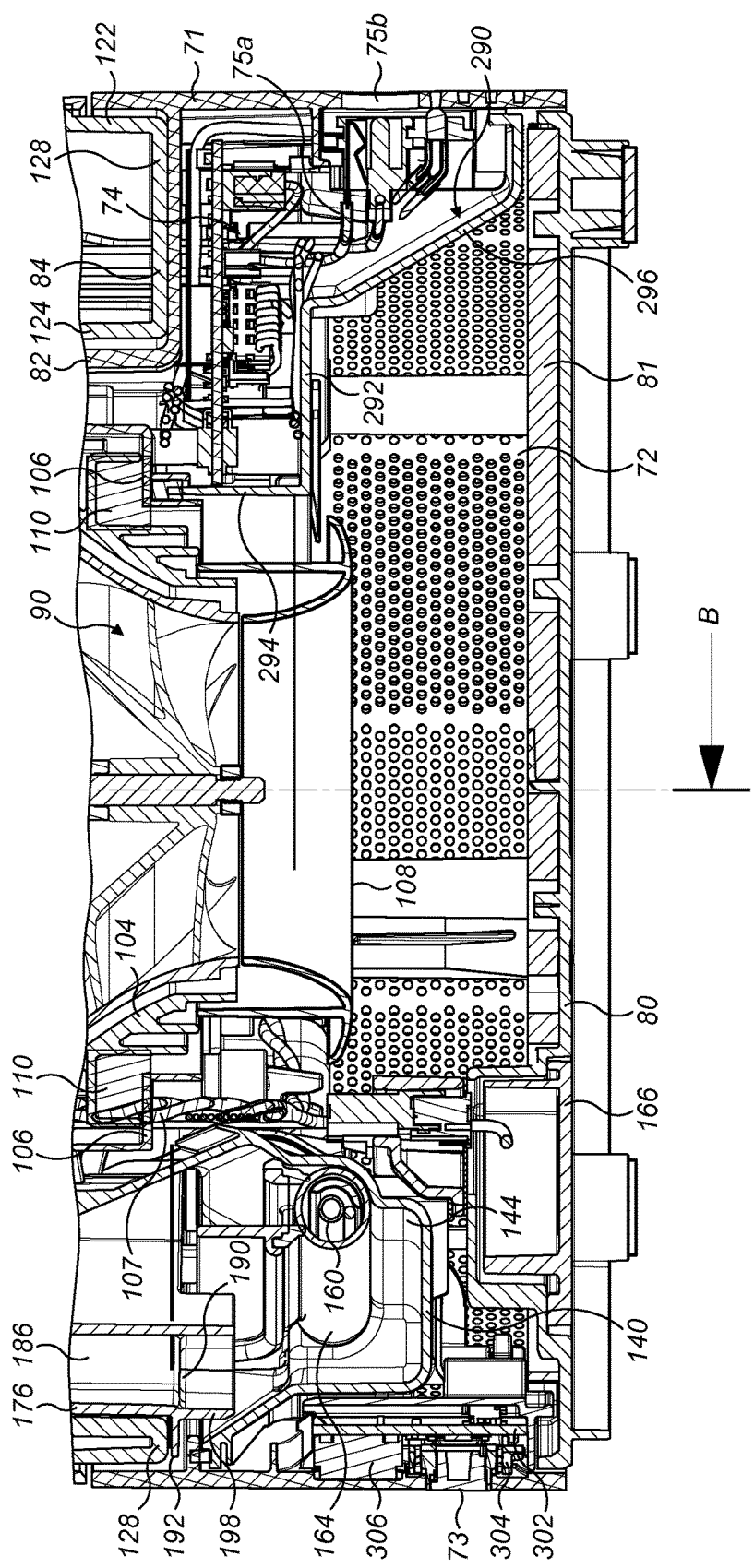
FIG. 4(d) is a close up of a third part of FIG. 4(a)
Figure 4E:
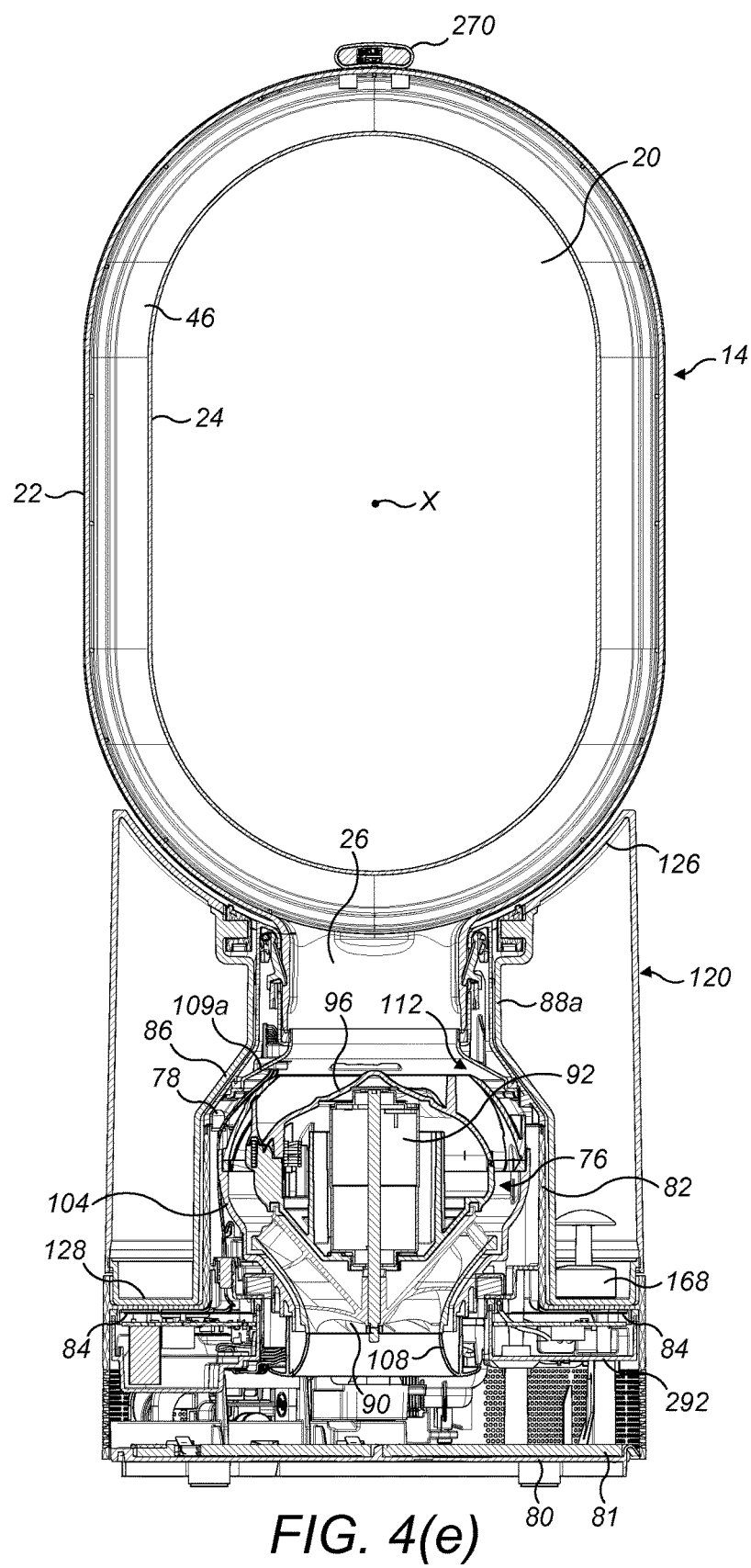
FIG. 4(e) is a front sectional view of the humidifying apparatus taken along line B-B in FIG. 4(a)
Figure 4F:
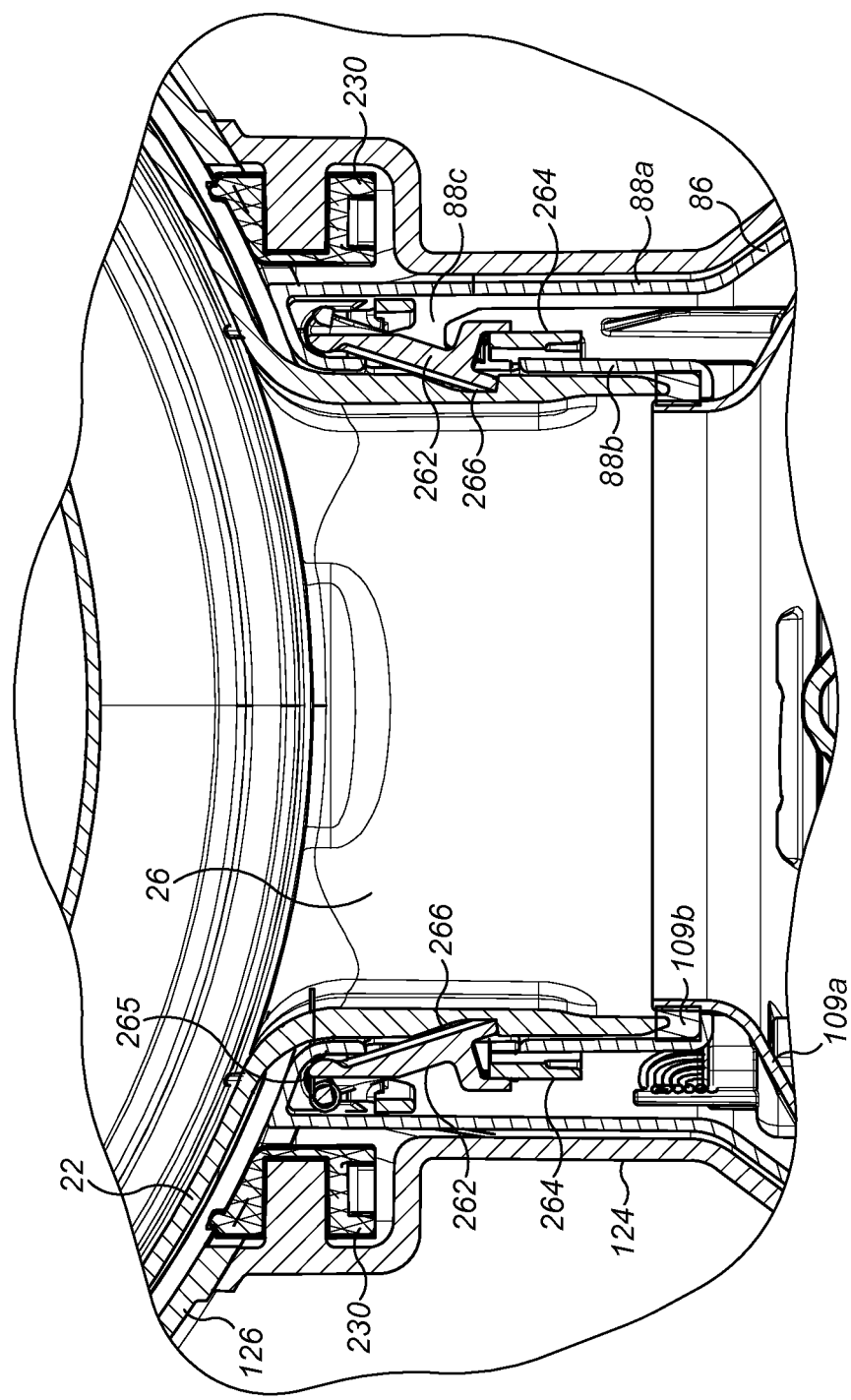
FIG. 4(f) is a close up of a part of FIG. 4(e)
Figure 5C:
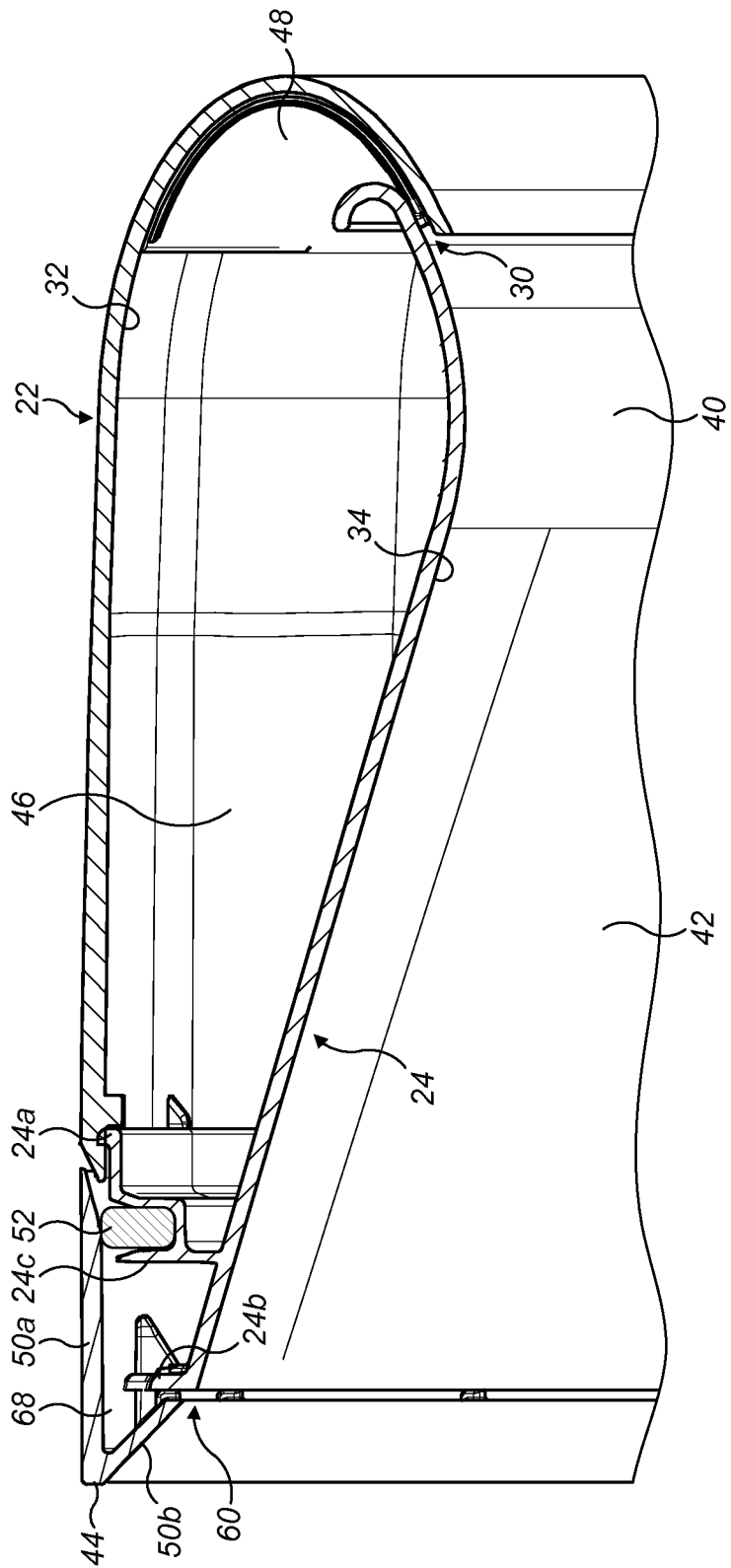
FIG. 5(c) is a close-up of part of FIG. 5(b)

With reference also to FIGS. 4(a) to 5(c), the rear section 16 of the nozzle 14 comprises an annular outer casing section 22 connected to and extending about an annular inner casing section 24. Each casing section 22, 24 extends about the bore axis X. Each casing section may be formed from a plurality of connected parts, but in this embodiment each casing section 22, 24 is formed from a respective, single moulded part. Each casing section 22, 24 is preferably formed from plastics material. As shown in FIG. 5(c), the front part of the inner casing section 24 has an annular outer wall 24a which extends generally parallel to the bore axis X, a front end wall 24b and an annular intermediary wall 24c which extends generally perpendicular to the bore axis X and which joins the outer wall 24a to the end wall 24b so that the end wall 24b is positioned forwardly of the intermediary wall 24c. During assembly, the external surface of the outer wall 24a is connected to the internal surface of the front end of the outer casing section 22, for example using an adhesive.

The outer casing section 22 comprises a tubular base 26 which defines a first air inlet 28 of the nozzle 14. The outer casing section 22 and the inner casing section 24 together define a first air outlet 30 of the nozzle 14. As described in more detail below, the first air flow enters the nozzle 14 through the first air inlet 28, and is emitted from the first air outlet 30. The first air outlet 30 is defined by overlapping, or facing, portions of the internal surface 32 of the outer casing section 22 and the external surface 34 of the inner casing section 24. The first air outlet 30 is in the form of a slot. The slot has a relatively constant width in the range from 0.5 to 5 mm. In this example the first air outlet has a width of around 1 mm Spacers 36 may be spaced about the first air outlet 30 for urging apart the overlapping portions of the outer casing section 22 and the inner casing section 24 to control the width of the first air outlet 30. These spacers may be integral with either of the casing sections 22, 24.

In this embodiment, the first air outlet 30 extends partially about the bore 20. The first air outlet 30 extends along the curved upper section and the straight sections of the nozzle 14. However, the first air outlet 30 may extend fully about the bore 20. As shown in FIG. 4(a), the nozzle 14 includes a sealing member 38 for inhibiting the emission of the first air flow from the curved lower section of the nozzle 14. In this embodiment, the sealing member 38 is generally U-shaped, and is retained by a recess formed in the rear end of the inner casing section 24 so as to lie in a plane which is substantially perpendicular to the axis X. The sealing member 38 engages a U-shaped protrusion 39 extending forwardly from the rear end of the curved lower section of the outer casing section 22 to form a seal therewith.

The first air outlet 30 is arranged to emit air through a front part of the bore 20 of the nozzle 14. The first air outlet 30 is shaped to direct air over an external surface of the nozzle 14. In this embodiment, the external surface 34 of the inner casing section 24 comprises a Coanda surface 40 over which the first air outlet 30 is arranged to direct the first air flow. The Coanda surface 40 is annular, and thus is continuous about the central axis X. The external surface 34 of the inner casing section 24 also includes a diffuser portion 42 which tapers away from the axis X in a direction extending from the first air outlet 30 to the end wall 24b of the inner casing section 24.

The casing sections 22, 24 together define an annular first interior passage 46 for conveying the first air flow from the first air inlet 28 to the first air outlet 30. The first interior passage 46 is defined by the internal surface of the outer casing section 22 and the internal surface of the inner casing section 24. A tapering, annular mouth 48 of the rear section 16 of the nozzle 14 guides the first air flow to the first air outlet 30. A first air flow path through the nozzle 14 may therefore be considered to be formed from the first air inlet 28, the first interior passage 46, the mouth 48 and the first air outlet 30.

The front section 18 of the nozzle 14 comprises an annular front casing section 50. The front casing section 50 extends about the bore axis X, and has a "racetrack" shape which is similar to that of the other casing sections 22, 24 of the nozzle 14. Similar to the casing sections 22, 24, the front casing section 50 may be formed from a plurality of connected parts, but in this embodiment the front casing section 50 is formed from a single moulded part. The front casing section 50 is preferably formed from plastics material.

The front casing section 50 comprises an annular outer wall 50a which extends generally parallel to the bore axis X, and an annular inner wall 50b connected to the outer wall 50a at the front end 44 of the nozzle 14. The inner wall 50b is angled to the outer wall 50a so that the inner wall 50b tapers towards the axis X. During assembly, the front casing section 50 is attached to the inner casing section 24, for example using a series of snap-fit connections between the outer wall 50a of the front casing section 50 and the intermediary wall 24c of the inner casing section 24. An annular sealing member 52 forms an air-tight seal between the inner casing section 24 and the front casing section 50.

Figure 6A:
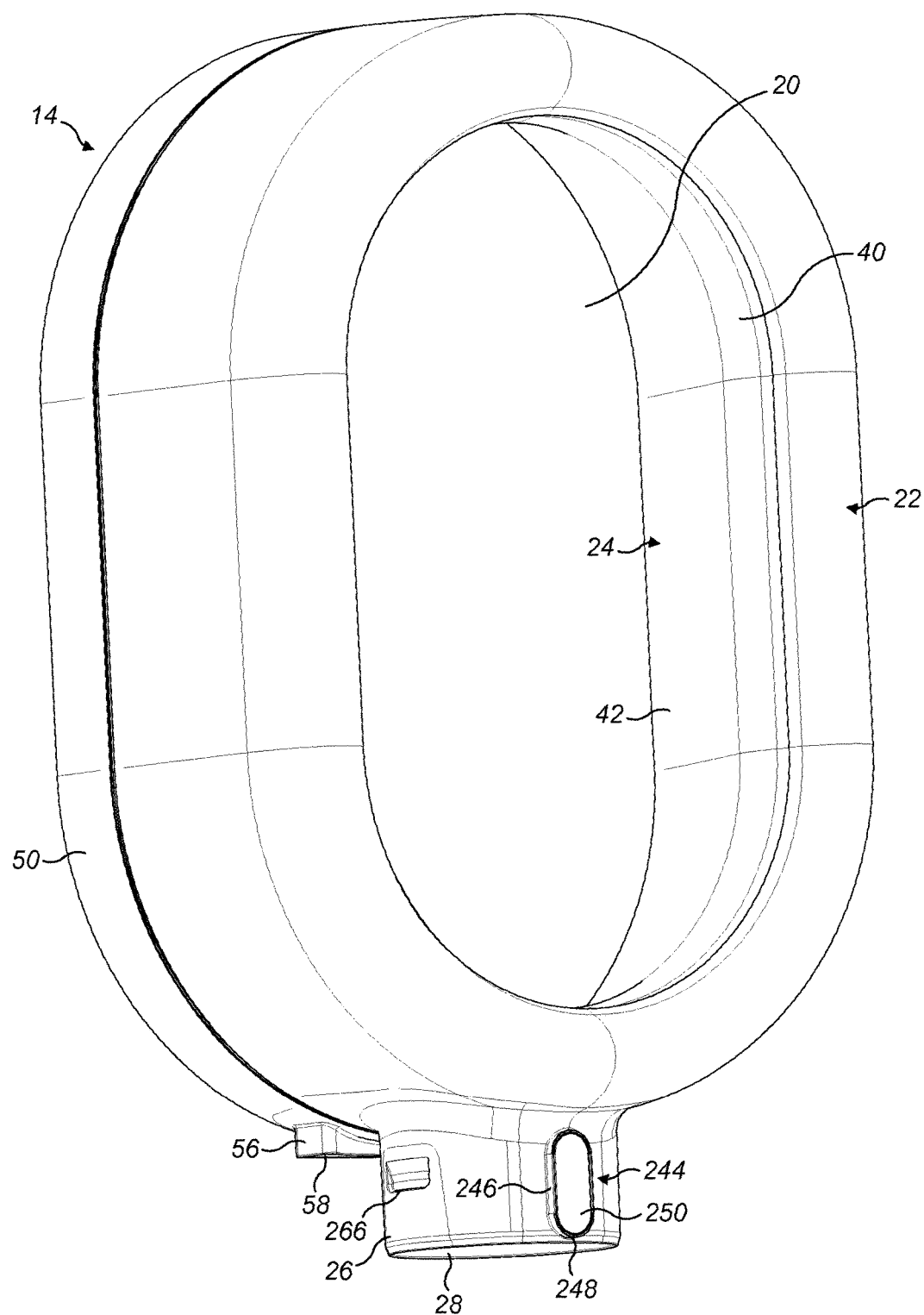
FIG. 6(a) is a rear perspective view, from below, of the nozzle.
Figure 6B:
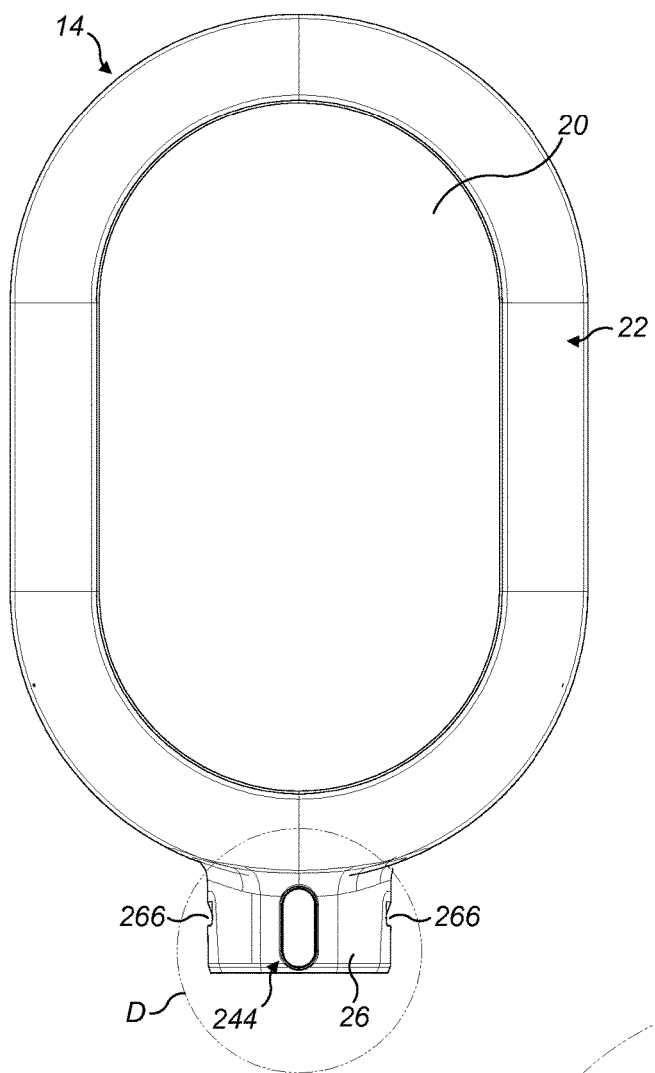
FIG. 6(b) is a rear view of the nozzle.
Figure 6C:
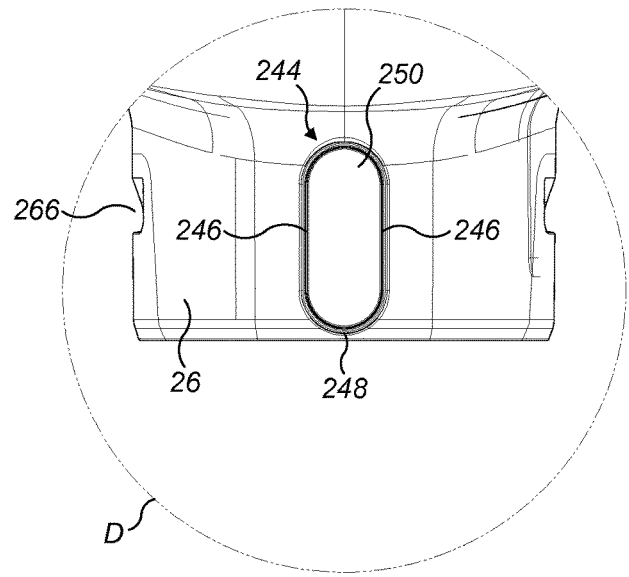
FIG. 6(c) is a close up view of area D of FIG. 6(b)
Figure 7A:
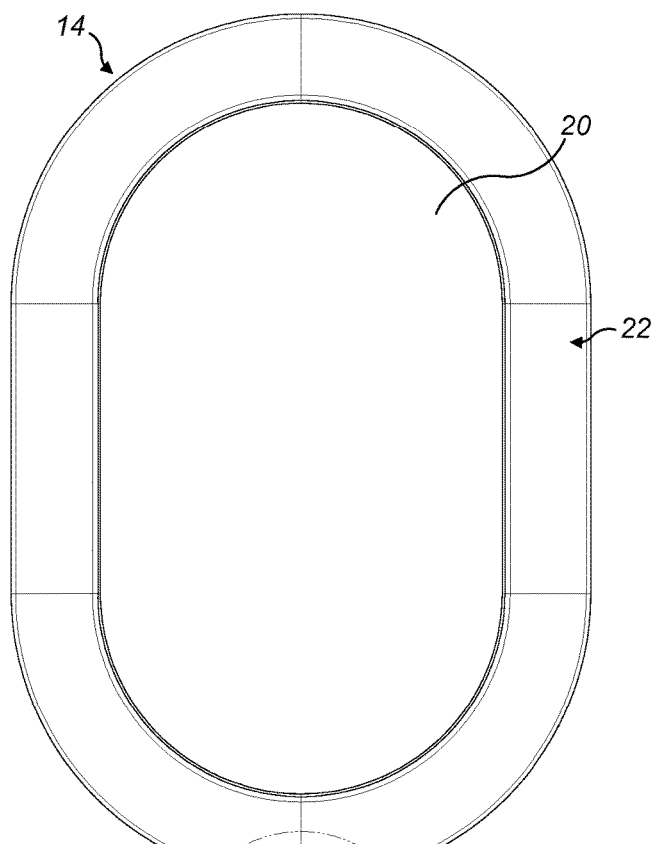
FIG. 7(a) is a rear view of the nozzle with part of a housing of the nozzle removed.
Figure 7B:
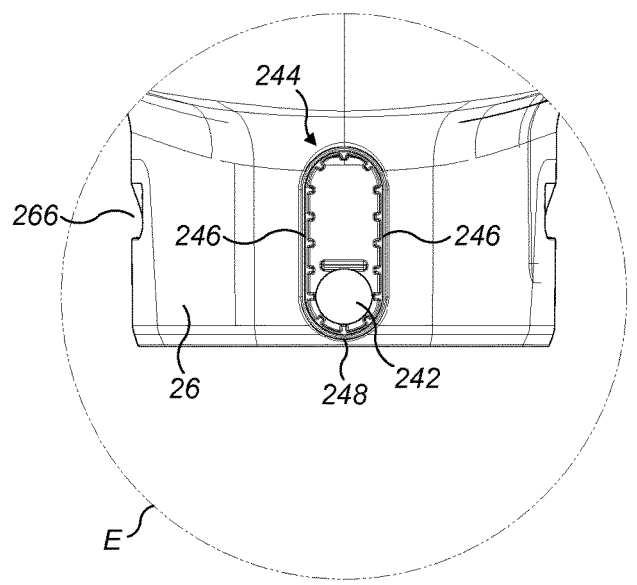
FIG. 7(b) is a close up view of area E of FIG. 7(a)
Figure 8A:
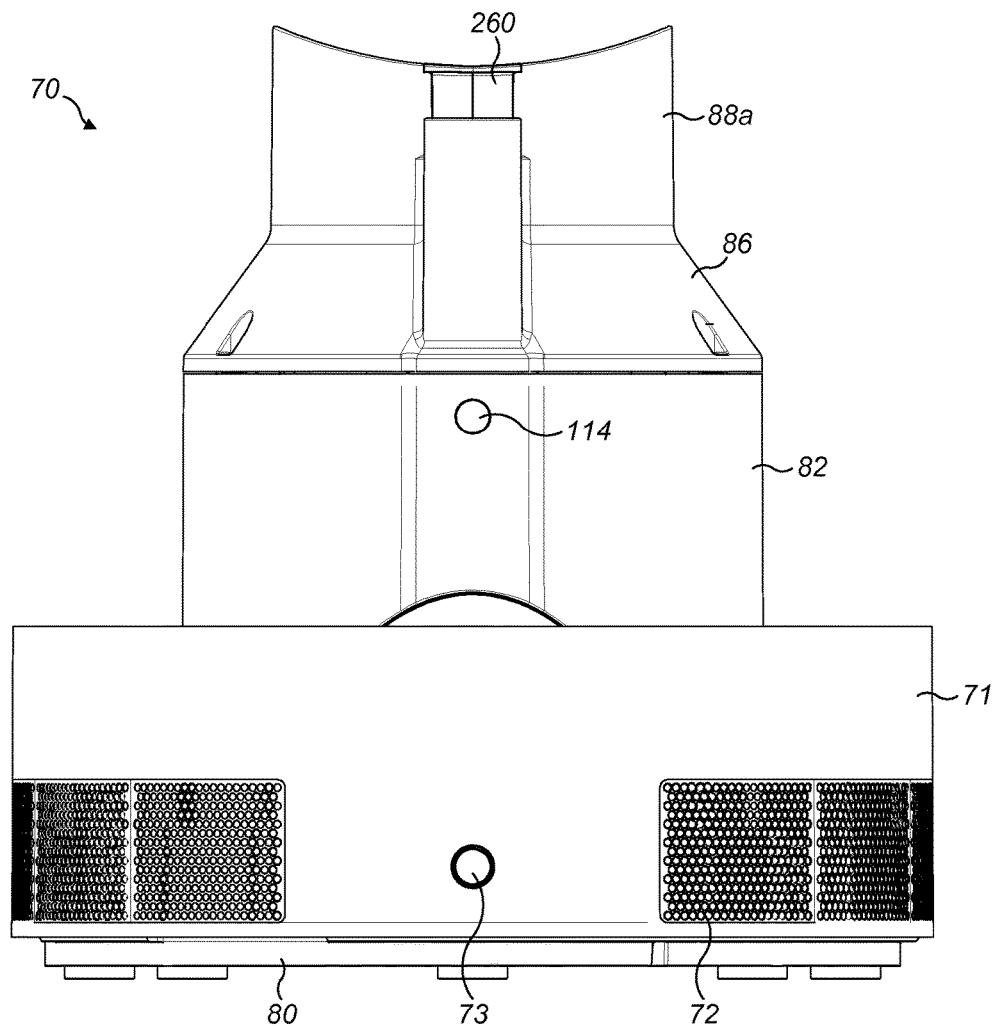
FIG. 8(a) is a front view of a base of the humidifying apparatus.
Figure 8B:
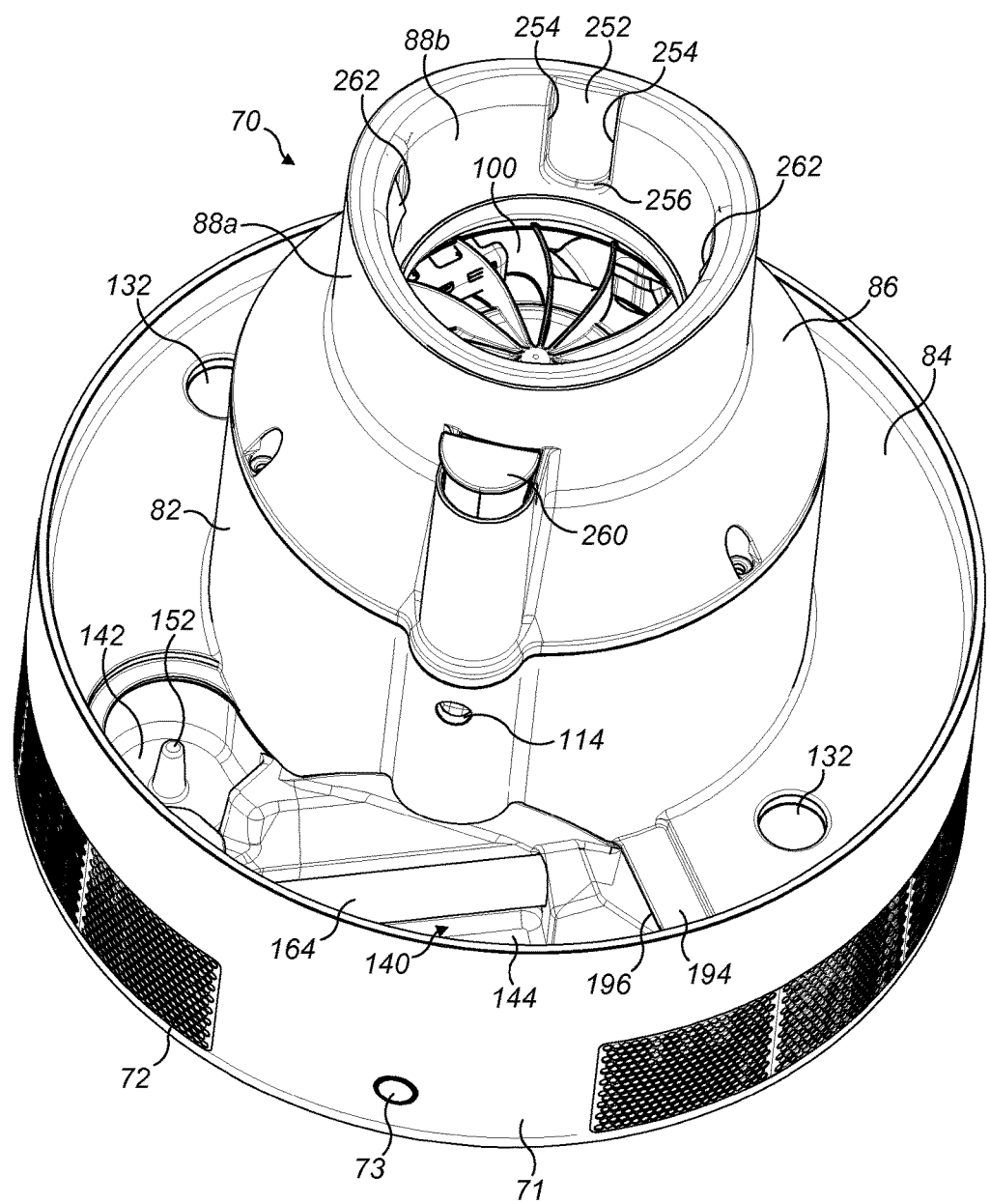
FIG. 8(b) is a front perspective view, from above, of the base.
Figure 8C:
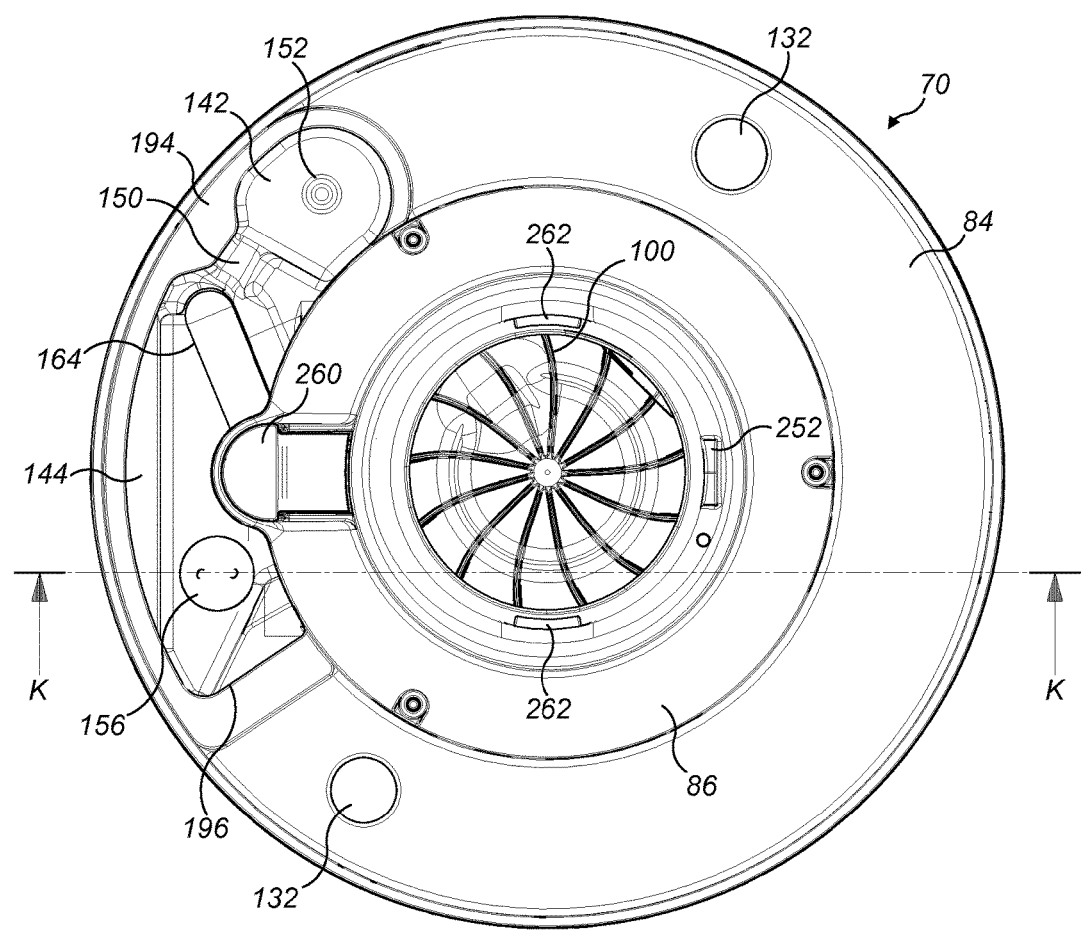
FIG. 8(c) is a top view of the base.
Figure 8D:
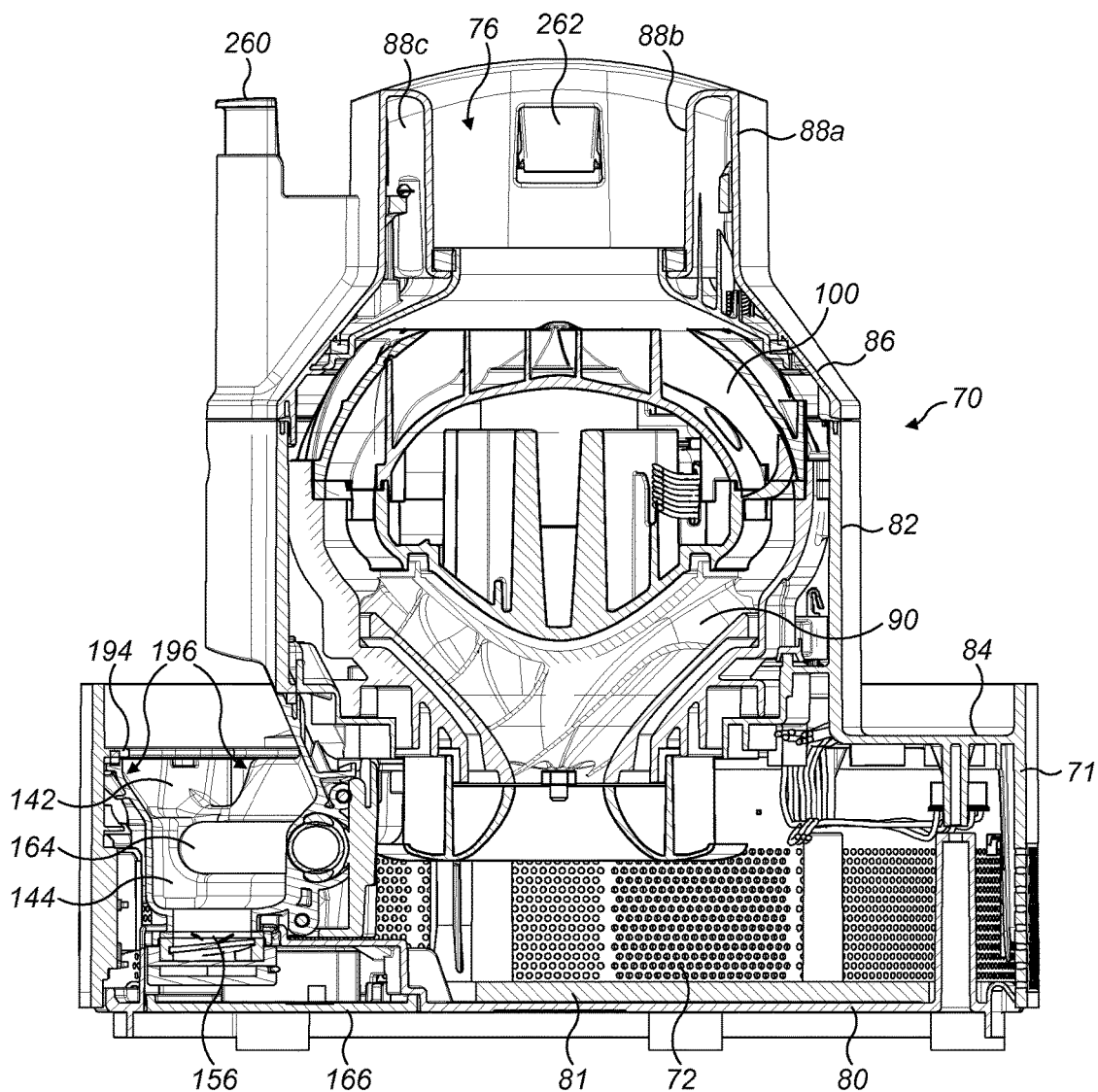
FIG. 8(d) is a section view taken along line K-K in FIG. 8(c)

With reference to FIG. 6(a), the lower end of the front casing section 50 comprises a tubular base 56. The base 56 defines a second air inlet 58 of the nozzle 14. The front casing section 50 defines with the inner casing section 24 a second air outlet 60 of the nozzle 14. In this example, the second air outlet 60 extends partially about the bore 20, along the curved upper section and the straight sections of the nozzle 14. Alternatively, the second air outlet 60 may extend fully about the bore 20. As another alternative, the nozzle 14 may comprise a plurality of second air outlets, with each of the straight sections of the nozzle 14 comprising a respective second air outlet.

In this embodiment, the second air outlet 60 is in the form of a slot having a relatively constant width in the range from 0.5 to 5 mm. In this example the second air outlet 60 has a width of around 1 mm. The second air outlet 60 is located between the end wall 24b of the inner casing section 24 and the inner wall 50b of the front casing section 50. Spacers 62 may be spaced along the second air outlet 60 to urge apart the overlapping portions of the inner casing section 24 and the front casing section 50 to control the width of the second air outlet 60. These spacers may be integral with either of the casing sections 24, 50. The second air outlet 60 is configured to emit the second air flow into the bore 20 of the nozzle 14, preferably towards the axis X of the nozzle and more preferably in a plane which is orthogonal to the axis X of the nozzle 14.

The casing sections 24, 50 together define an annular second interior passage 68 for conveying the second air flow from the second air inlet 58 to the second air outlet 60. The second interior passage 68 is defined by the internal surfaces of the inner casing section 24 and the front casing section 50. A second air flow path through the nozzle 14 may therefore be considered to be formed by the second air inlet 58, the interior passage 68 and the second air outlet 60.

Returning to FIGS. 1 to 3, the body 12 is generally cylindrical in shape. The body 12 comprises a base 70. The base is illustrated in more detail in FIG. 8. The base 70 has an external outer wall 71 which is cylindrical in shape, and which comprises an air inlet 72. In this example, the air inlet 72 comprises a plurality of apertures formed in the outer wall 71 of the base 70. A front portion of the base 70 may comprise a user interface of the humidifying apparatus 10. The user interface is illustrated schematically in FIG. 17, and is described in more detail below, and comprises at least one user actuable switch or button 73 and a drive circuit 74. The drive circuit is indicated generally at 74 in FIGS. 4(a) and 4(d). In FIG. 18, the drive circuit 74 is illustrated as a single component, but the drive circuit 74 may be formed from a number of physically separate, but electrically connected, sub-circuits, each comprising a respective processor for controlling various different components or functions of the humidifying apparatus 10. A detachable mains power cable (not shown) for supplying electrical power to the humidifying apparatus 10 is connected to the drive circuit 74 via a connector 75a located behind an aperture 75b formed in the outer wall 71 of the base 70. To connect the drive circuit 74 to the mains power supply, the user inserts the cable through the aperture 75b to connect the cable to the connector 75a.

With reference also to FIGS. 4(a), 4(d) and 4(e) and FIG. 8, the base 70 comprises a first air passageway 76 for conveying a first air flow to the first air flow path through the nozzle 14, and a second air passageway 78 for conveying a second air flow to the second air flow path through the nozzle 14. The first air passageway 76 passes through the base 70 from the air inlet 72 to the first air inlet 28 of the nozzle 14. The base 70 comprises a bottom wall 80 connected to the lower end of the outer wall 71. A sheet 81 of silencing foam is located on the upper surface of the bottom wall 80. A tubular central wall 82, having a smaller diameter than the outer wall 71, is connected to the outer wall 71 by an arcuate supporting wall 84. The central wall 82 is substantially co-axial with the outer wall 71. The supporting wall 84 is located above, and generally parallel to, the bottom wall 80. The supporting wall 84 extends partially about the central wall 82 to define an opening for exposing a water reservoir 140 of the base 70, as described in more detail below. The central wall 82 extends upwardly away from the supporting wall 84. In this example, the outer wall 71, central wall 82 and supporting wall 84 are formed as a single component of the base 70, but alternatively two or more of these walls may be formed as a respective component of the base 70. An upper wall of the base 70 is connected to the upper end of the central wall 82. The upper wall has a lower frustoconical section 86 and an upper cylindrical section. The upper cylindrical section comprises a double-skinned wall which comprises an outer cylindrical wall 88a connected to the frustoconical section 86 and an inner cylindrical wall 88b into which the base 26 of the nozzle 14 is inserted. The walls 88a, 88b define an annular housing 88c within the upper cylindrical section of the base 70.

The central wall 82 extends about an impeller 90 for generating a first air flow through the first air passageway 76. In this example the impeller 90 is in the form of a mixed flow impeller. In overview, the impeller 90 is connected to a rotary shaft extending outwardly from a motor 92 for driving the impeller 90. In this embodiment, the motor 92 is a DC brushless motor having a speed which is variable by the drive circuit 74 in response to a speed selection by a user. The maximum speed of the motor 92 is preferably in the range from 5,000 to 10,000 rpm. The motor 92 is housed within a motor bucket comprising a domed upper portion 96 connected to a lower portion 98. A set of guide vanes 100 is connected to the upper surface of the upper portion 96 of the motor bucket to guide air towards the first air inlet 28 of the nozzle 14. Further features of the impeller 92 and the motor bucket are described below.

The motor bucket is located within, and mounted on, a generally frustoconical impeller housing 104. The impeller housing 104 is, in turn, mounted on an annular platform 106 extending inwardly from the central wall 82. An annular inlet member 108 is connected to the bottom of the impeller housing 104 for guiding the air flow into the impeller housing 104. An annular sealing member 110 is located between the impeller housing 104 and the platform 106 to prevent air from passing around the outer surface of the impeller housing 104 to the inlet member 108. The platform 106 preferably comprises a guide portion for guiding an electrical cable 107 from the drive circuit 74 to the motor 92.

The first air passageway 76 extends from the air inlet 72 to the inlet member 108. From the inlet member 108, the first air passageway 76 extends, in turn, through the impeller housing 104, the upper end of the central wall 82 and the sections 86, 88 of the upper wall. A frustoconical baffle 109a connected to the internal surfaces of the sections 86, 88 of the upper walls serves to guide the first air flow emitted from the impeller housing 104 into the base 26 of the nozzle 14. An annular seal 109b extending around the upper end of the baffle 109a engages the end of the base 26 of the nozzle 14 to form an air tight seal between the nozzle 14 and the base 70.

The second air passageway 78 is arranged to receive air from the first air passageway 76. The second air passageway 78 is located adjacent to the first air passageway 76. The second air passageway 78 comprises a duct 110 for receiving air from the first air passageway 76. The duct 110 has an annular inlet port 112 located downstream from the guide vanes 100 so as to receive part of the air flow emitted from the guide vanes 100, and which forms the second air flow. The inlet port 112 is located between the baffle 109a and a domed upper section 113 of the impeller housing 104. The duct 110 extends between the impeller housing 104 and the baffle 109a to an outlet port 114 located on the central wall 82 of the base 70.

The humidifying apparatus 10 is configured to increase the humidity of the second air flow before it enters the nozzle 14. With reference now to FIGS. 1 to 4 and FIGS. 9 to 11, the humidifying apparatus 10 comprises a water tank 120 removably mountable on the base 70 of the body 12. The water tank 120 has a cylindrical outer wall 122 which has the same radius as the outer wall 71 of the base 70 of the body 12 so that the body 12 has a cylindrical appearance when the water tank 120 is mounted on the base 70. The water tank 120 has a tubular inner wall 124 which surrounds the walls 82, 86, 88 of the base 70 when the water tank 120 is mounted on the base 70. The outer wall 122 and the inner wall 124 define, with an annular upper wall 126 and an annular lower wall 128 of the water tank 120, an annular volume for storing water. The water tank 120 thus surrounds the impeller 90 and the motor 92, and so at least part of the first air passageway 76, when the water tank 120 is mounted on the base 70.

The outer wall 122 is formed from material which is transparent to visible light to allow a user to observe the volume of water stored within the water tank 120. For the same reason, the upper wall 126 is preferably formed from the same material as the outer wall 122. The outer wall 122 and the upper wall 126 may be joined together using an adhesive, or using a laser welding technique. These walls 122, 126 are preferably formed from a transparent plastics material. The inner wall 124 and the lower wall 128 are preferably integral, and do not need to be formed from the same plastics material as the outer wall 122 and the upper wall 126. In this embodiment the inner wall 124 and the lower wall 128 are formed from material which is opaque to ultraviolet radiation, and preferably also visible light, so that the portion of the base 70 which is surrounded by, or covered by, the inner wall 124 and the lower wall 128 is not visible to the user when the water tank 120 is mounted on the base 70. An adhesive is used to connect the inner wall 124 to the upper wall 126, and to connect the outer wall 122 to the lower wall 128.

The lower wall 128 of the water tank 120 engages, and is supported by, the supporting wall 84 of the base 70 when the water tank 120 is mounted on the base 70. Protrusions 130 may be formed on, or mounted on, the lower wall 128 for location within recesses 132 formed on the supporting wall 84 of the base 70 to ensure accurate angular positioning of the water tank 120 on the base 70. The protrusions 130 may be in the form of magnets which interact with other magnets (not shown) mounted beneath the recesses 132 on the lower surface of the supporting wall 84 to assist with the accurate location of the water tank 120 on the base 70, and to increase the force required to move the water tank 120 relative to the base 70. This can reduce the risk of accidental movement of the water tank 120 relative to the base 70.

Figure 9C:
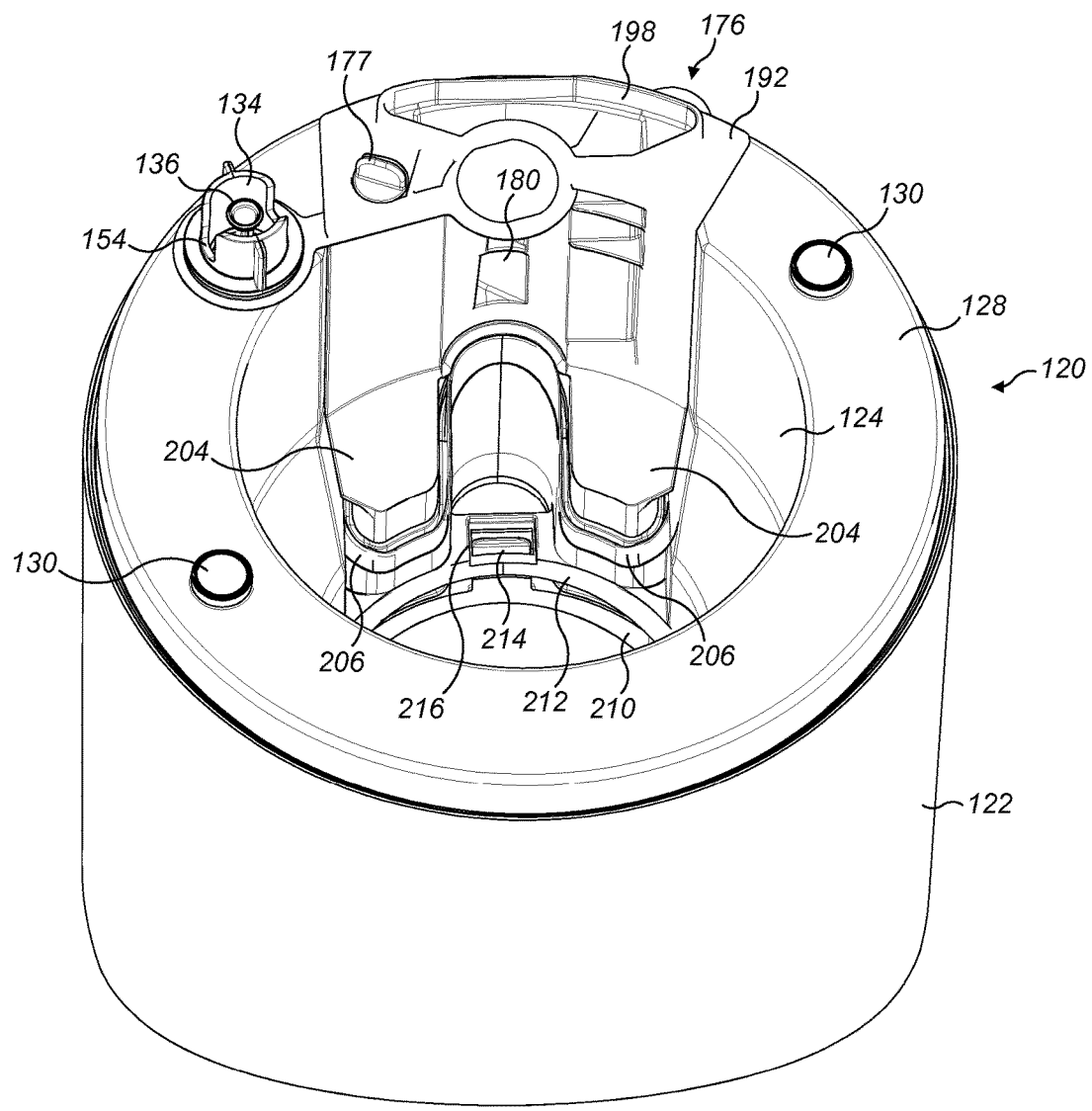
FIG. 9(c) is a rear perspective view, from below, of the water tank.
Figure 10A:
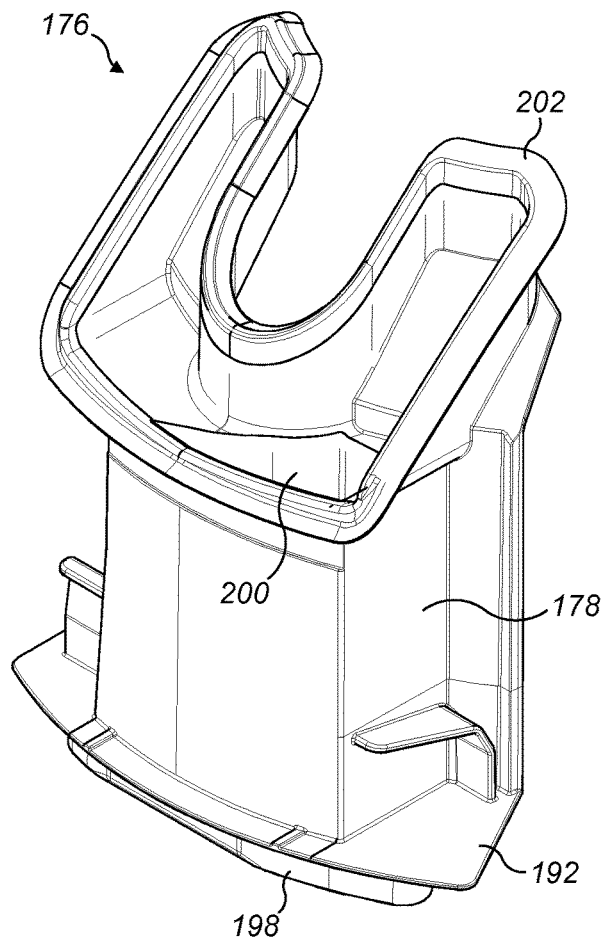
FIG. 10(a) is a front perspective view, from above, of a detachable section of the water tank.
Figure 10B:
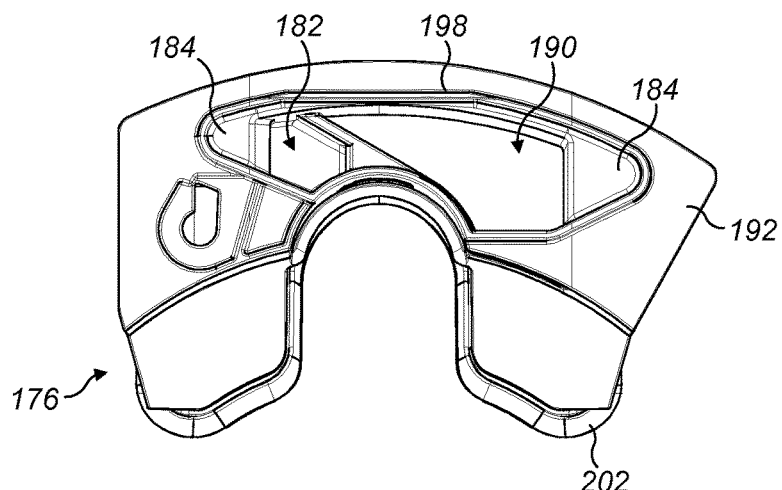
FIG. 10(b) is a bottom view of the detachable section of the water tank.
Figure 10C:
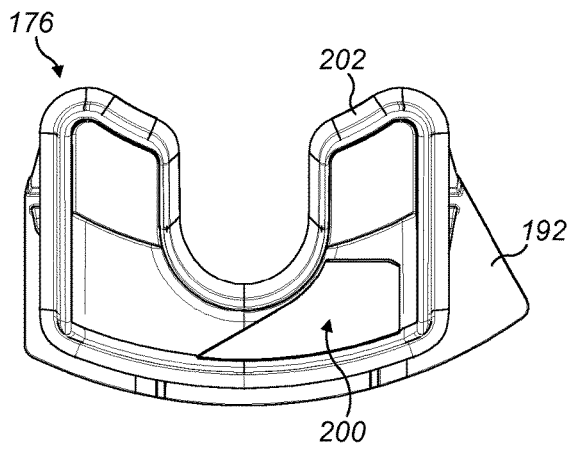
FIG. 10(c) is a top view of the detachable section of the water tank.
Figure 10D:
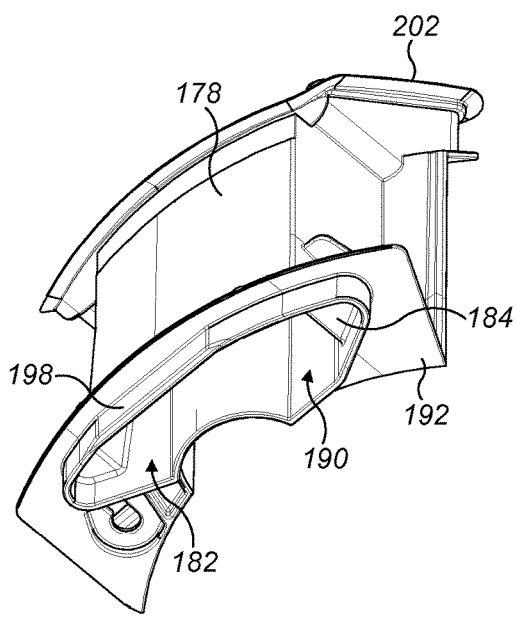
FIG. 10(d) is a front perspective view, from below, of the detachable section of the water tank.
Figure 10E:
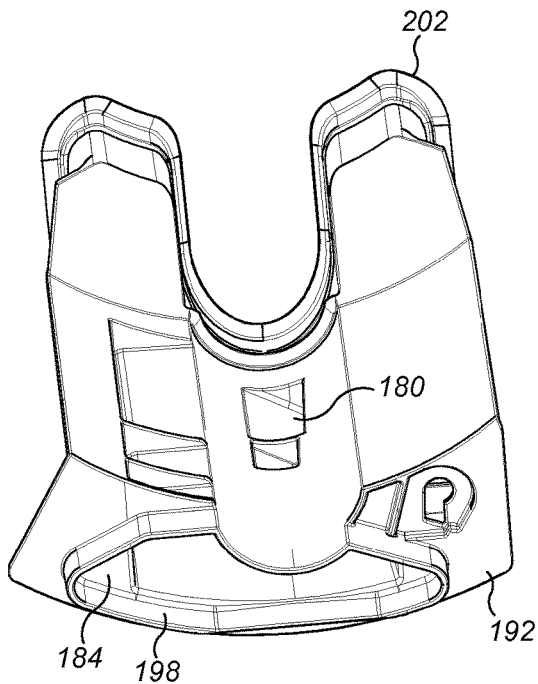
FIG. 10(e) is a rear perspective view, from below, of the detachable section of the water tank.

The water tank 120 preferably has a capacity in the range from 2 to 4 liters. With particular reference to FIGS. 9(b) and 9(c), a spout 134 is removably connected to the lower wall 128 of the water tank 120, for example through co-operating threaded connections. In this example the water tank 120 is filled by removing the water tank 120 from the base 70 and inverting the water tank 120 so that the spout 134 is projecting upwardly. The spout 134 is then unscrewed from the water tank 120 and water is introduced into the water tank 120 through an aperture exposed when the spout 134 is disconnected from the water tank 120. The spout 134 preferably comprises a plurality of radial fins for facilitating the gripping and twisting of the spout 134 relative to the water tank 120. Once the water tank 120 has been filled, the user reconnects the spout 134 to the water tank 120, returns the water tank 120 to its non-inverted orientation and replaces the water tank 120 on the base 70. A spring-loaded valve 136 is located within the spout 134 for preventing leakage of water through a water outlet of the spout 134 when the water tank 120 is re-inverted. The valve 136 is biased towards a position in which a skirt of the valve 136 engages the upper surface of the spout 134 to prevent water entering the spout 134 from the water tank 120.

The upper wall 126 of the water tank 120 comprises one or more supports 138 for supporting the inverted water tank 120 on a work surface, counter top or other support surface. In this example, two parallel supports 138 are formed in the periphery of the upper wall 126 for supporting the inverted water tank 120.

With reference now to FIGS. 4 and 8, the base 70 comprises a water reservoir 140 for receiving water from the water tank 120. The water reservoir 140 is a separate component which is connected to the lower surface of the supporting wall 84 of the base 70, and which is exposed by the opening formed in the supporting wall 84. The water reservoir 140 comprises an inlet chamber 142 for receiving water from the water tank 120, and an outlet chamber 144 for receiving water from the inlet chamber 142, and in which water is atomised to become entrained within the second air flow. The inlet chamber 142 is located on one side of the water reservoir 140, and the outlet chamber 144 is located on the other side of the water reservoir 140. The water reservoir 140 comprises a base and a side wall extending about and upstanding from the periphery of the base. The base is shaped so that the depth of the outlet chamber 144 is greater than the depth of the inlet chamber 142. The sections of the base located within each chamber 142, 144 are preferably substantially parallel, and are preferably parallel to the bottom wall 80 of the base 70 so that these sections of the base are substantially horizontal when the humidifying apparatus 10 is located on a horizontal support surface. A channel 150 formed in the water reservoir 140 allows water to pass from the inlet chamber 142 to the outlet chamber 144.

A pin 152 extends upwardly from the section of the base forming, in part, the inlet chamber 142. When the water tank 120 is mounted on the base 70, the pin 152 protrudes into the spout 134 to push the valve 136 upwardly to open the spout 134, thereby allowing water to pass under gravity into the inlet chamber 142. As the inlet chamber 142 fills with water, water passes through the channel 150 to enter the outlet chamber 144. As water is output from the water tank 120, it is replaced within the water tank 120 by air which enters the water tank 120 through slots 154 located in the side wall of the spout 134. As the chambers 142, 144 fill with water, the level of water within the chambers 142, 144 equalizes. The spout 134 is arranged so that the water reservoir 140 can be filled with water to a maximum level which is substantially co-planar with the upper end of the slots 154 located within the side wall of the spout 134; above that level no air can enter the water tank 120 to replace water output from the water tank 120.

Figure 15A:
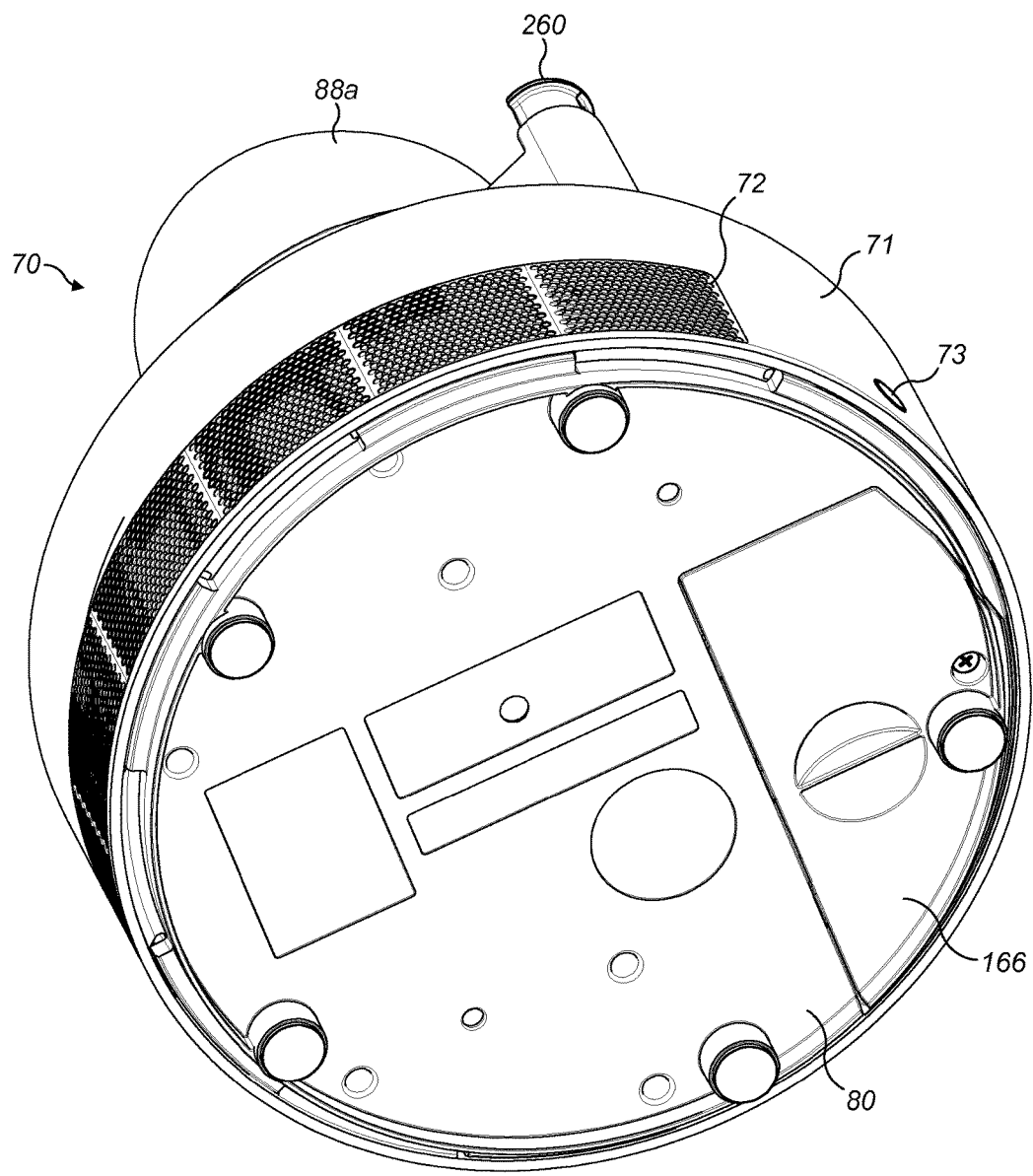
FIG. 15(a) is a front perspective view, from below, of the base.

The section of the base forming, in part, the outlet chamber 144 comprises a circular aperture for exposing a piezoelectric transducer 156. The drive circuit 74 is configured to actuate vibration of the transducer 156 in an atomization mode to atomise water located in the outlet chamber 144. In the atomization mode, the transducer 156 may vibrate ultrasonically at a frequency $f_1$, which may be in the range from 1 to 2 MHz. With reference also to FIG. 15(*b*), the transducer 156 forms part of a piezoelectric transducer assembly 157 which is connected to the lower side of the bottom wall 80 of the base 70 so as to protrude through an aperture formed in the bottom wall 80 of the base 70. Wires 158 connect the transducer 156 to the drive circuit 74.

The water reservoir 140 also includes an ultraviolet radiation (UV) generator for irradiating water within the water reservoir 140. In this embodiment, the UV generator is arranged to irradiate water within the outlet chamber 144 of the water reservoir 140. In this embodiment, the UV generator comprises a UV lamp 160, which forms part of a UV lamp assembly 162 of the base 70. The UV lamp assembly 162 is in the form of a cartridge which is removably insertable into the base 70 to allow the UV lamp assembly 162 to be replaced by a user as required. The water reservoir 140 comprises a UV transparent tube 164. The tube 164 is located within the outlet chamber 144 of the water reservoir 140. The UV lamp assembly 162 is supported by the base 70 so that the UV lamp 160 is located within the tube 164 when it is inserted fully into the base 70. Preferably, an open end of the tube 164 protrudes through an aperture formed in the side wall of the water reservoir 140 to allow the UV lamp 160 to enter the tube 164. An O-ring sealing member may be provided between the tube 164 and the aperture formed in the side wall to inhibit water leakage through the aperture.

With reference to FIGS. 15(*a*) and 15(*b*), the bottom wall 80 of the base 70 comprises an aperture through which the transducer assembly 157 and the UV lamp assembly 162 are inserted into, and removable from, the base 70. The aperture is normally covered by a panel 166 removably connected to the lower side of the bottom wall 80 of the base 70. By removing the panel 166 from the bottom wall 80 of the base 70, a user is able to access both the UV lamp assembly 162 and the piezoelectric transducer assembly 157 for replacement or repair of each assembly as required.

Figure 17:
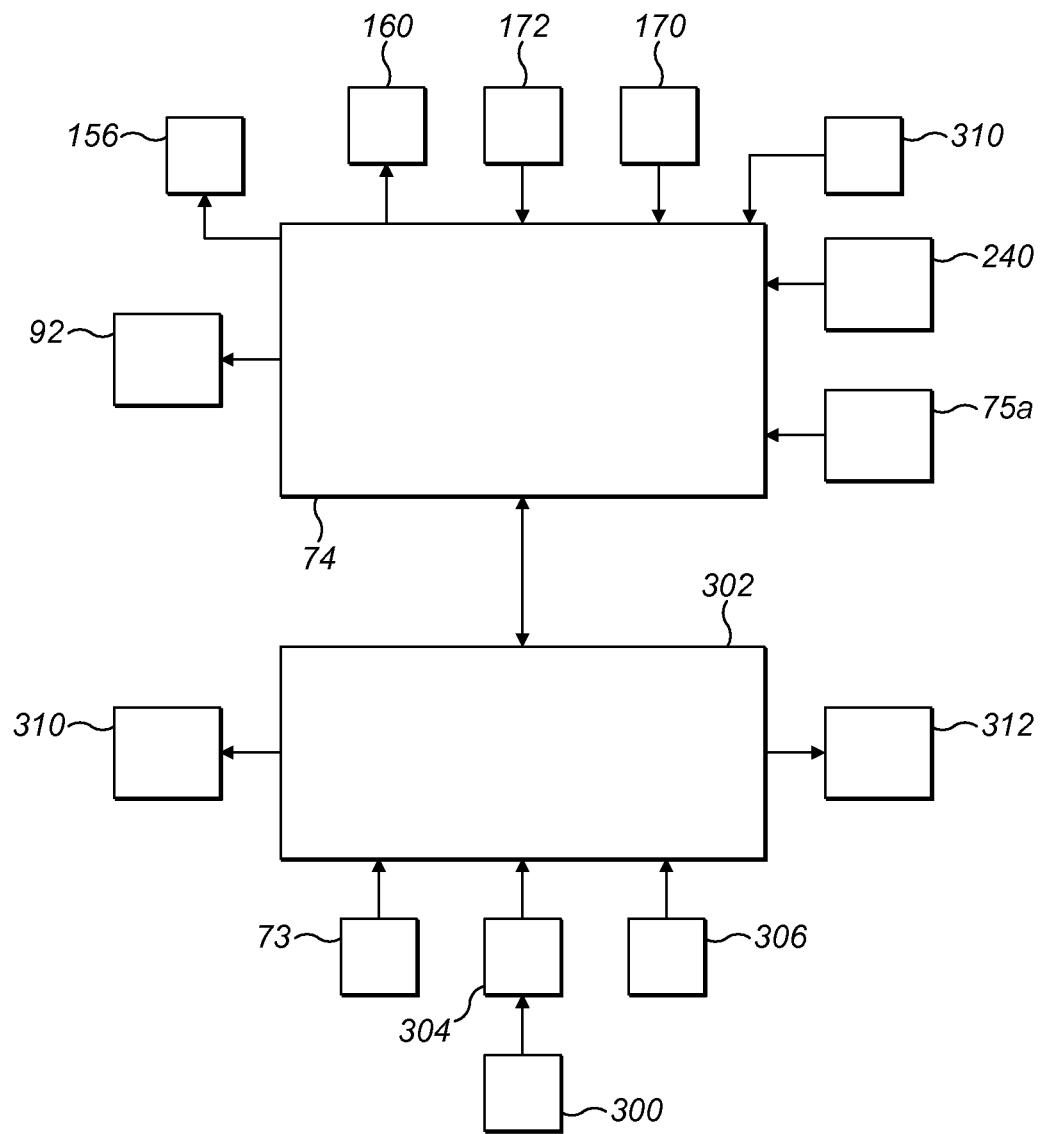
FIG. 17 is a schematic illustration of a control system of the humidifying apparatus.

A float 168 may be provided within the water tank 120, and a level sensor 170, shown schematically in FIG. 17, may be provided in the base 70 for detecting the position of the float 168 and so provide a signal which is indicative of the level of the water in the water tank 120. The base 70 may also include a proximity sensor 172 for detecting that the water tank 120 has been mounted on the base 70. The proximity sensor 172 may be in the form of a Hall effect sensor which interacts with a magnet (not shown) located on the lower wall 128 of the water tank 120 to detect the presence, or absence, of the water tank 120 on the base 70.

The water tank 120 defines an inlet duct 174 for receiving the second air flow from the outlet port 114 of the base 70. In this embodiment, the inlet duct 174 is defined by a detachable section 176 of the water tank 120, which is detachably connected to the inner wall 124 of the water tank 120 by a user-operable catch 177. The detachable section 176 is illustrated in FIG. 10; FIG. 11 illustrates the position of the detachable section 176 relative to the base 70 when the water tank 120 is mounted on the base 70. The detachable section 176 comprises a body 178 which is formed from material which is opaque to ultraviolet radiation, and is preferably moulded from plastics material. The inlet duct 174 passes through the body 178 from an air inlet 180 to an air outlet 182. The air inlet 180 of the inlet duct 174 is positioned in a side wall of the body 178 so that it is positioned opposite to the outlet port 114 located on the central wall 82 of the base 70 when the water tank 120 is mounted on the base 70, as shown in FIG. 4(*b*). The air outlet 182 of the inlet duct 174 is located in a bottom wall 184 of the body 178 so that it is located above the water reservoir 140. The maximum water level of the water reservoir 140 is preferably selected so that the air outlet 182 lies above this maximum water level. As a result, the second air flow enters the water reservoir 140 directly over the surface of the water located in the outlet chamber 144 of the water reservoir 140.

Figure 11A:
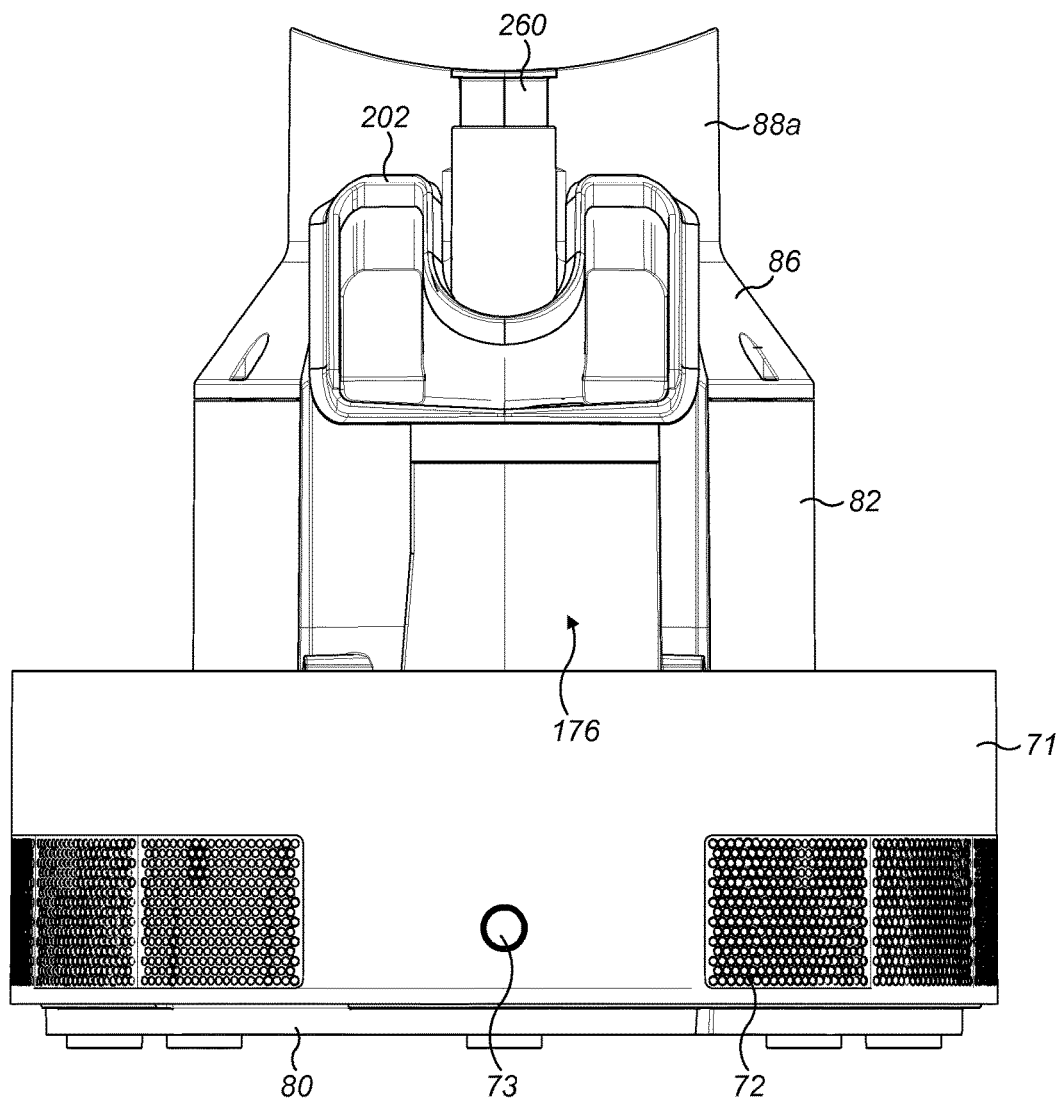
FIG. 11(a) is a front view of the base with the detachable section of the water tank located on the base.
Figure 11B:
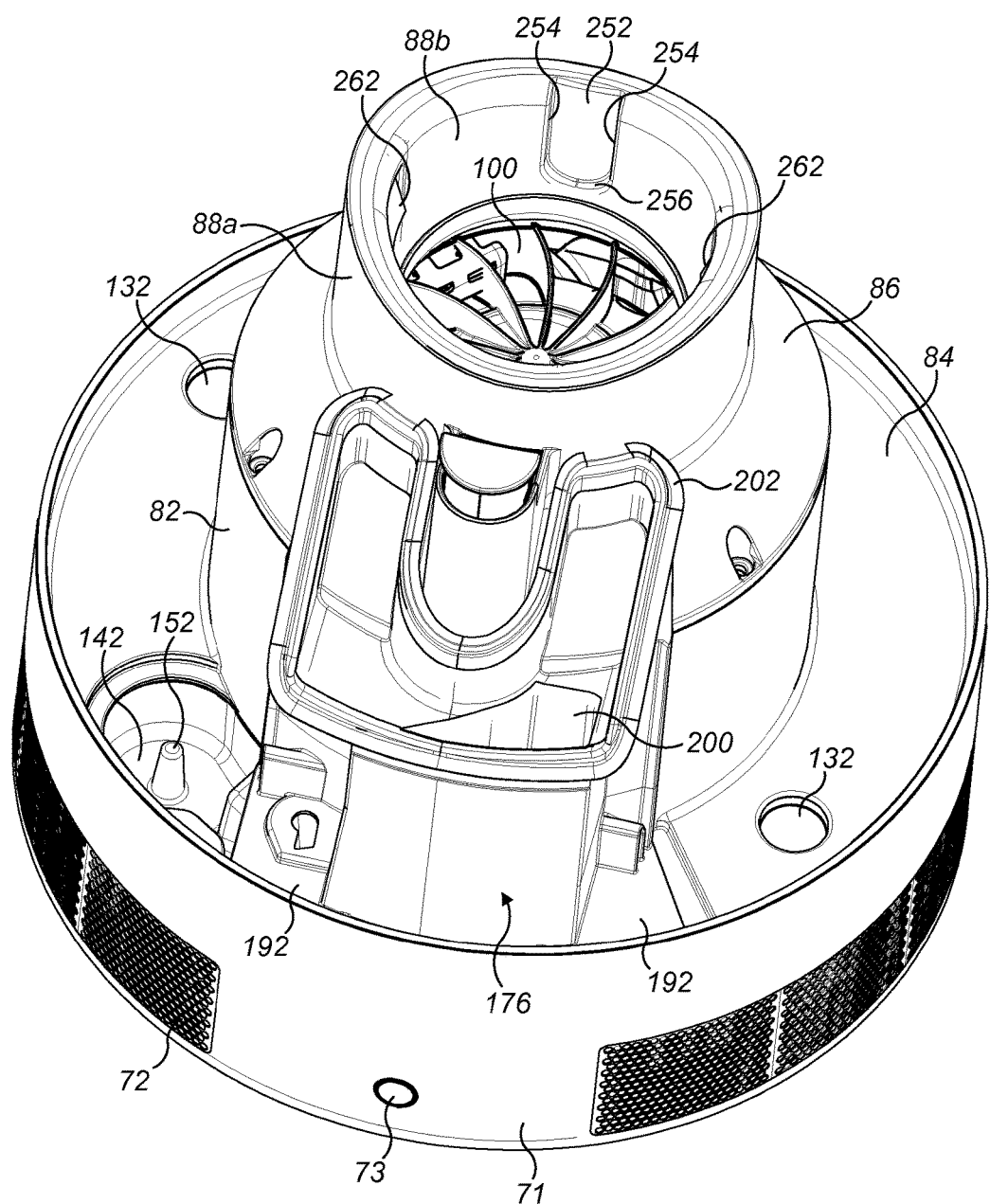
FIG. 11(b) is a front perspective view, from above, of the base with the detachable section of the water tank located on the base.
Figure 11C:
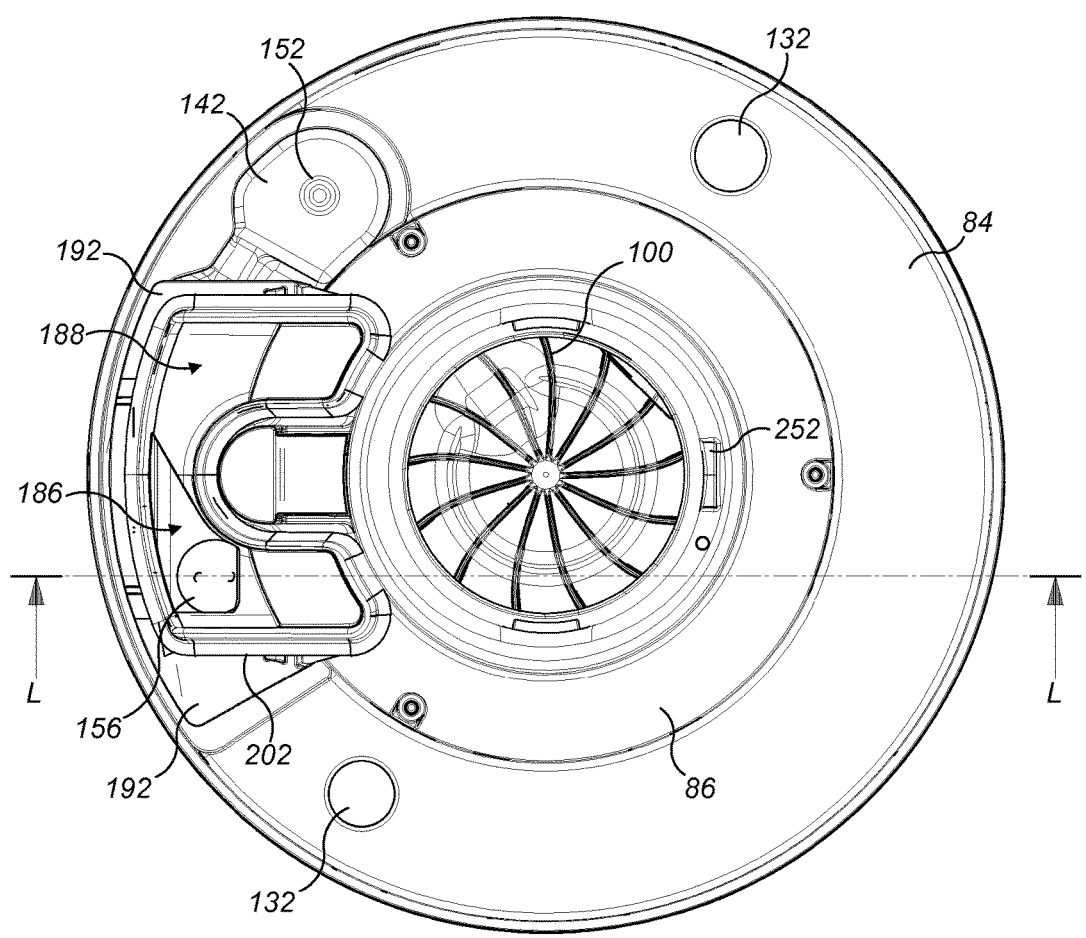
FIG. 11(c) is a top view of the base with the detachable section of the water tank located on the base.
Figure 11D:
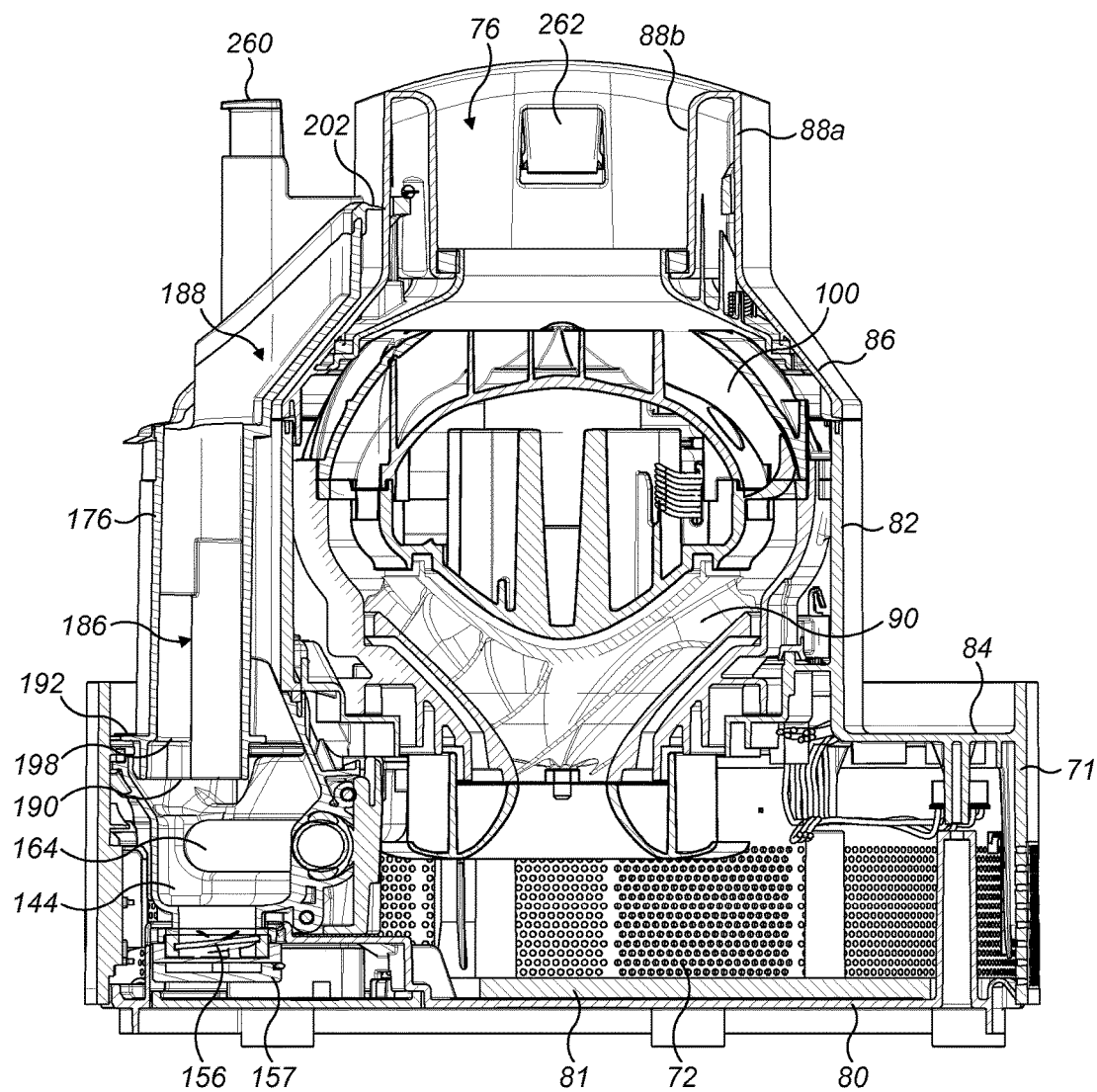
FIG. 11(d) is a section view taken along line L-L in FIG. 11(c)
Figure 12:
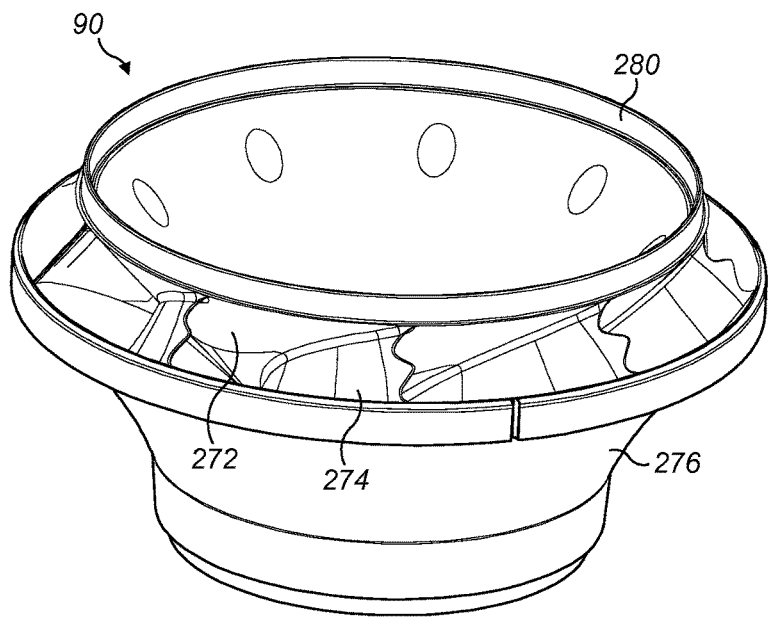
FIG. 12 is a perspective view, from above, of an impeller of the humidifying apparatus.

The water tank 120 also includes an outlet duct for conveying the second air flow from the reservoir 140 to the second air inlet 58 of the nozzle 14. In the embodiment, the outlet duct comprises an inlet section 186 and an outlet section 188. The inlet section 186 is defined by the detachable section 176 of the water tank 120. The detachable section 176 comprises an air inlet 190 of the outlet duct. The air inlet 190 is located in the bottom wall 184 of the body 178 so that it is positioned directly above the transducer 156 when the water tank 120 is mounted on the base 70, as shown in FIGS. 11(c) and 11(d). Consequently, a column of water generated during the actuation of the transducer 156 can enter the inlet section 186 of the outlet duct, and so ensure that mist-like water particles generated in the vicinity of the water column can become entrained within the second air flow. The air inlet 190 of the outlet duct is preferably substantially co-planar with the air outlet 182 of the inlet duct 174, and is preferably located adjacent to the air outlet 182 of the inlet duct 174 so as to minimise the length of the flow path between the air outlet 182 of the inlet duct 174 and the air inlet 190 of the outlet duct.

The body 178 of the detachable section 176 comprises a flange 192 which extends outwardly from the bottom wall 184. The flange 192 extends around a majority of the body 178. The flange 192 is shaped so that when the water tank 120 is mounted on the base 70, the flange 192 is located over, and is preferably mounted upon, a recessed portion 194 of the supporting wall 84 which extends about the water reservoir 140. As shown through a comparison of FIGS. 8(a) to 8(d) to FIGS. 11(a) to 11(d), the flange 192 serves to occlude a peripheral portion 196 of the outlet chamber 144 of the water reservoir 140, and so inhibits the leakage of ultraviolet radiation from this peripheral portion 196 of the outlet chamber 144 during operation of the UV lamp 160.

The detachable section 176 comprises a wall 198 depending from the flange 192 for guiding the second air flow from the air outlet 182 of the inlet duct 174 towards the air inlet 190 of the outlet duct. The wall 198 is annular in shape and positioned so as to delimit, and so to extend about, a flow channel located directly beneath the air outlet 182 of the inlet duct 174 and the air inlet 190 of the outlet duct. The height of the wall 198 is selected so that when the outlet chamber 144 of the water reservoir 140 is filled with water to the maximum level, the end of the wall 198 extends into the water stored in the outlet chamber 144, establishing an interface between the wall 198 and the stored water which forms a seal for inhibiting the leakage of the second air flow from the flow channel defined by the wall 198.

The body 178 of the detachable section 176 comprises a port 200 from which the second air flow enters the outlet section 188 from the inlet section 186. When the detachable section 176 is connected to the inner wall 124 of the water tank 120, an inner part of the outlet section 188 is defined by the detachable section 176, and an outer part of the outlet section 188 is defined by the inner wall 124. A seal 202 disposed on the detachable section 176 forms an air tight seal to prevent leakage of the second air flow from the interface between the inner wall 124 and the detachable section 176. In this embodiment, the outlet section 188 of the outlet duct bifurcates to form a pair of duct branches 204, each comprising a respective air outlet 206 of the outlet duct.

This allows the outlet duct to convey the second air flow about part of the base 70, in this embodiment a button 260 (described in more detail below) actuable by the user to release the nozzle 14 from the base 70.

With reference to FIGS. 4(a) and 9(a), the water tank 120 comprises a seal 210 for engaging the base 56 of the nozzle 14. In FIG. 9(a), the seal 210 is illustrated as being detached from the remainder of the water tank 120 to allow features of the seal 210 to be seen. The seal 210 is supported by a support 212 which is integral with the inner wall 124 of the water tank 120. The seal 210 is detachably connected to the support 212 to allow a user to remove the seal for cleaning and replacement. For example, the seal 210 may comprises a pair of resilient fingers 214 which, when the seal 210 is connected to the support 212, extend through an aperture 216 formed in the support 212. When the seal 210 is to be removed from the support 212, the fingers 214 may be pinched together by the user to allow the fingers 214 to pass through the aperture 216 as the seal 210 is pulled away from the support 212. The fingers 214 are connected to a relatively rigid frame 218 of the seal 210. The frame 218 is shaped so as to surround the end of the base 56 of the nozzle 14.

The frame 218 carries a relatively flexible, resilient part of the seal 210. The resilient part of the seal 210 comprises a first section 220 which is retained by, and surrounded by, the frame 218 for engaging the end of the base 56 of the nozzle 14. The resilient part of the seal 210 also comprises a pair of second sections 222 depending from the first section 220, and which engage the support 212 to urge the frame 218 away from the support 212 and towards the base 56 of the nozzle 14. The seal 210 and the support 212 comprise apertures or passageways 224 which allow the second air flow to pass therethrough and into the base 56 of the nozzle 14. In this embodiment, each of the second sections 222 is tubular in shape, and has an undulating or bellows shape.

As illustrated in FIG. 4, when the water tank 120 is mounted on the base 70 the inner wall 124 surrounds the upper wall of the base 70 to expose the open upper end of the upper cylindrical section of the upper wall. The water tank 120 includes a handle 230 to facilitate removal of the water tank 120 from the base 70. The handle 230 is pivotably connected to the water tank 120 so as to be moveable relative to the water tank 120 between a stowed position, in which the handle 230 is housed within a recessed section 232 of the water tank 120, and a deployed position, in which the handle 230 is raised above the upper wall 126 of the water tank 120 so that it may be gripped by a user.

When the nozzle 14 is mounted on the body 12, the base 26 of the outer casing section 22 of the nozzle 14 is located over the open end of the upper cylindrical section of the upper wall of the base 70, and the base 56 of the front casing section 50 of the nozzle 14 is located over the seal 210 of the water tank 120. The user then pushes the nozzle 14 towards the body 12. When the bases 26, 56 of the nozzle 14 are fully inserted in the body 12, the annular seal 109b engages the end of the base 26 of the nozzle 14 to form an air tight seal between the nozzle 14 and the base 70, whereas the seal 210 engages the end of the base 56 of the nozzle 14 to form an air tight seal between the nozzle 14 and the water tank 120.

With reference now to FIG. 4(c) and FIGS. 6 to 8, the body 12 comprises a sensor 240 for detecting the position of the nozzle 14 relative to the body 12. The sensor 240 is connected to the drive circuit 74, which is configured to inhibit the actuation of the UV lamp 160 unless the signal received from the sensor 240 indicates that the nozzle 14 has been inserted fully on to the body 12. In this example, the nozzle 14 comprises a magnet 242, and the sensor 240 is in the form of a Hall effect sensor which generates a signal which is indicative of the detected strength of the magnetic field generated by the magnet 242. The sensor 240 is located in the housing 88c defined by the cylindrical walls 88a, 88b of the base 70 of the body 12, and the magnet 242 is located on the base 26 of the nozzle 14 so that the magnet 242 is located adjacent to the sensor 240 when the base 26 of the nozzle 14 has been inserted fully into the base 70 of the body 12.

The base 26 of the nozzle 14 includes a housing 244 for retaining the magnet 242. The housing 244 is located on the outer surface of the base 26. The housing 244 has an annular wall which is integral with the base 26, and which defines at least side walls 246, a lower end wall 248 and an upper end wall of the housing 248. The housing 244 may have one of a variety of other shapers, such as rectangular or other polygonal shape, and so the annular wall may be replaced with a series of connected walls which define the side walls 246 and ends wall of the housing 244. The walls of the housing 244 surround the magnet 242. A cover 250 is connected to the walls of the housing 244 by snap fit connectors.

The inner cylindrical wall 88b of the base 70 comprises a groove 252 which is shaped to receive the housing 244 as the nozzle 14 is mounted on the body 12. The sensor 242 is positioned within the housing 88c so as to be located between the groove 252 and outer cylindrical wall 88a. The groove 252 and the housing 244 have substantially the same shape so that the nozzle 14 becomes angularly aligned relative to the body 12 as the base 26 of the nozzle 14 is inserted into the body 12. The groove 252 comprises side walls 254 for engaging the side walls 246 of the housing 244 to inhibit relative rotation between the nozzle 14 and the body 12, and an end wall 256 for engaging the lower end wall 248 of the housing 244 to restrict the extent to which the housing 244 is insertable within the groove 252.

With reference to FIG. 4(f) and FIGS. 6 to 8, a mechanism is provided for releasably retaining the nozzle 14 on the body 12. In overview, the body 12 comprises a button 260, detents 262 for engaging the nozzle 14, and an annular actuator 264. The detents 262 are mounted within the housing 88c of the base 70 so as to be moveable relative to the base 70 between a retaining position for retaining the nozzle 14 on the body 12, and a release position for releasing the nozzle 14 for removal from the body 12. Each detent 262 is pivotably mounted within the housing 88c, and is biased by a spring 265 towards the retaining position in which each detent 262 protrudes through an aperture formed in the wall 88b of the base 70. The detents 262 are diametrically opposed. As the user mounts the nozzle 14 on the body 12, the detents 262 are urged away from their retaining positions by the base 26 of the nozzle 14 to allow the base 26 of the nozzle 14 to enter the base 70 of the body 12. The base 26 of the nozzle 14 comprises a pair of diametrically-opposed recesses 266 which become angularly aligned with the detents 262 as the nozzle 14 is inserted into the body 12. When the nozzle 14 is inserted fully into the body 12, the detents 262 enter the grooves 266, under the biasing force of their springs 265, to retain the nozzle 14 on the body 12 unless the user depresses the button 260.

The actuator 264 is in the form of a non-circular hoop located within the cavity 88c for engaging the detents 262. The button 260 and the actuator 264 are arranged so that the depression of the button 260 by the user causes the actuator 264 to rotate within the cavity 88c. For example, the actuator 264 may comprise a protrusion 264a which is contacted, and pushed to one side, by the button 260 as it is depressed by the user, which causes the actuator 264 to rotate in a clockwise direction within the housing 88c. Due to the asymmetric shape of the actuator 264, the rotation of the actuator 264 causes it to engage the detents 262 to move the detents 262 away from the grooves 266, against the biasing force of the springs 265, to their release positions. This allows the user to remove the nozzle 14 from the body 12. Once the nozzle 14 has been lifted from the body 12, the button 260 may be released by the user. The springs 265 urge the detents 262 back to their retaining position, which in turn causes the actuator 264 to rotate within the housing 88c in an anticlockwise direction and raise the button 260.

Figure 13:
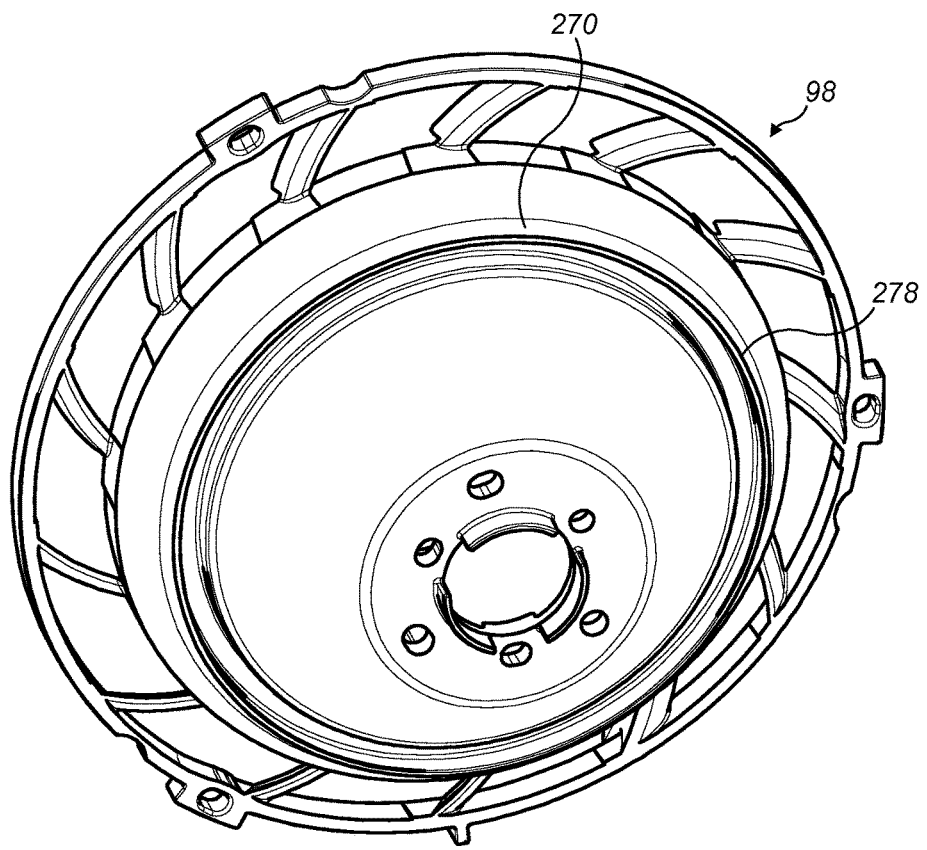
FIG. 13 is a perspective view, from below, of part of the motor housing of the humidifying apparatus.
Figure 14A:
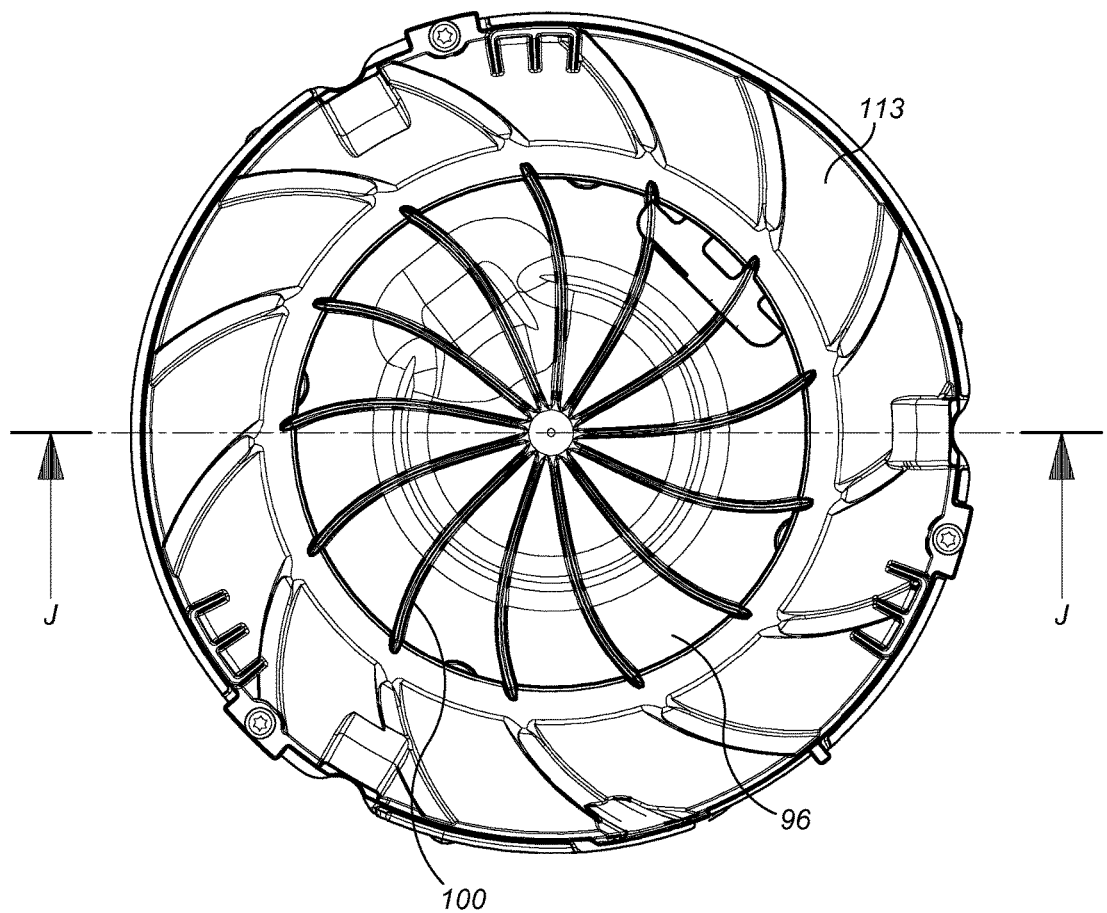
FIG. 14(a) is a top view of the impeller and motor housing of the humidifying apparatus.
Figure 14B:
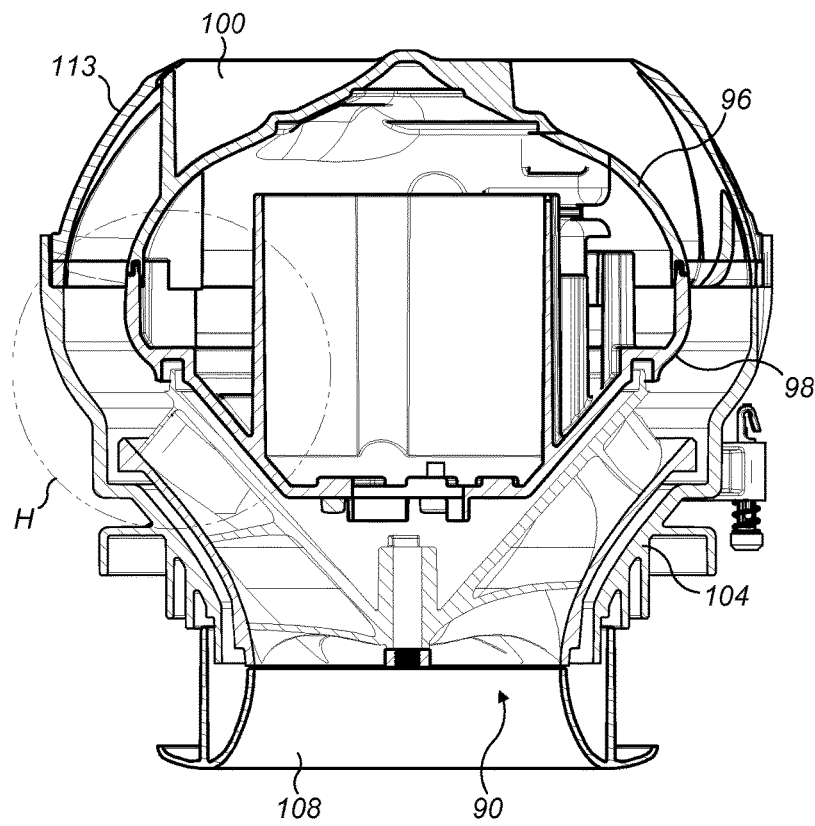
FIG. 14(b) is a sectional view taken along line J-J in FIG. 14(a)
Figure 14C:
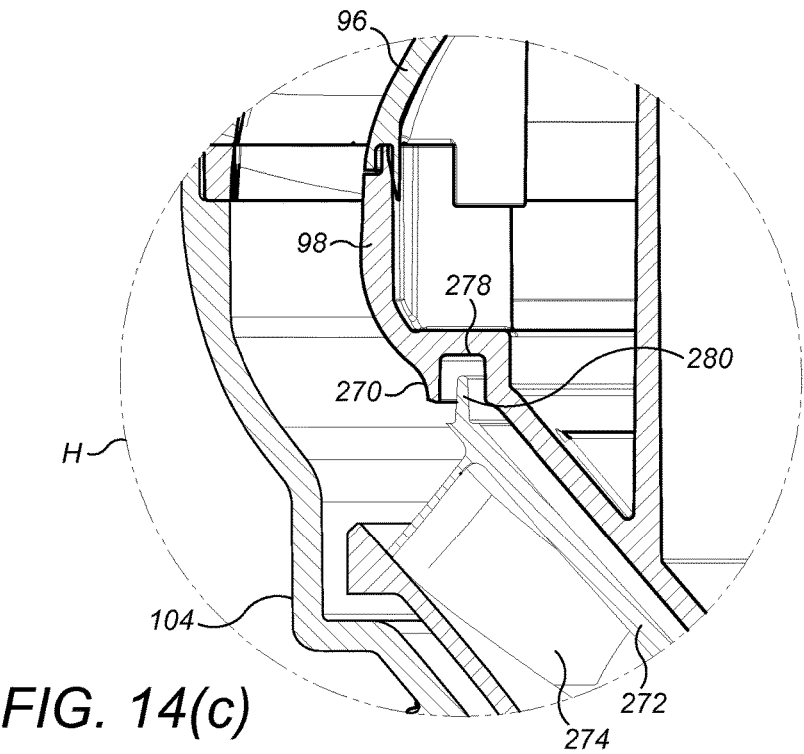
FIG. 14(c) is a close up view of area H identified in FIG. 14(b)

When the nozzle 14 has been removed from the body 12, the user may remove the water tank 120 from the base 70, for example to replenish the water tank 120 or to remove the detachable section 176 and seal 210 for cleaning. While the nozzle 14 is removed from the body 12, there is an opportunity for water to enter the body 12 through the exposed first air passageway 76, especially when the water tank 120 is replaced on the base 70. For example, with reference to FIGS. 4(e), 13 and 14, water droplets may fall on the exposed upper surface of the upper portion 96 of the motor bucket. To prevent these water droplets from running down the motor bucket and entering components of the motor or motor bearings, the lower portion 98 of the motor bucket comprises an annular lip 270 which forms an annular drip edge which extends around the motor bucket. As a result, any water droplets which run down the side of the motor bucket will fall away from the motor 92 and into the impeller 90.

The impeller 90 comprise a substantially conical hub 272 and a series of curved vanes 274 which are connected to, and preferably integral with, the outer surface of the hub 272. In this embodiment, the impeller 90 further comprises a generally frustoconical shroud 276 which is connected to the outer edges of the curved vanes 274. If any water droplets fall from the lip 270, those water droplets will fall into the impeller 90, between the hub 272 and the shroud 276. The droplets will subsequently fall from the impeller 90, through the inlet member 108 and on to the sheet 81 of silencing foam. To minimise any disruption to the air flow generated by the rotation of the impeller 90, the lip 270 does not protrude downwardly from the motor bucket beyond the hub 272 of the impeller 90.

The lip 270 is defined by an outer peripheral wall of an annular groove 278 formed in the lower portion of the motor bucket. The impeller 90 comprises an annular vane 280 connected to the base of the hub 272 so as to extend into the groove 278. In this embodiment, each of the groove 278 and the vane 280 is annular in shape. During rotation of the impeller 90, the vane 280 generates an air boundary adjacent to the lip 270 which further inhibits the passage of water droplets along the lower portion 98 of the motor bucket beyond the lip 270.

Figure 15B:
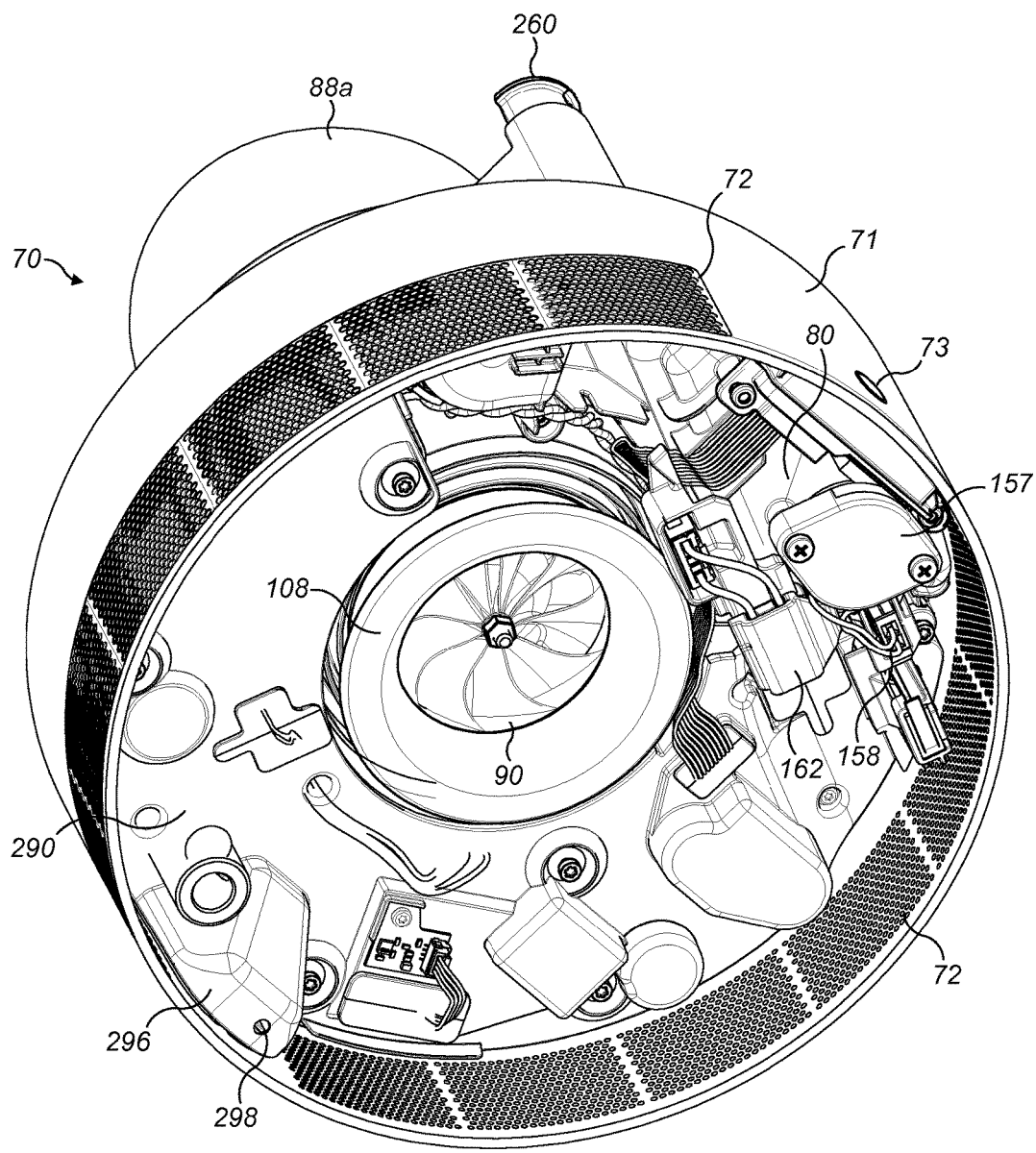
FIG. 15(b) is a similar view to FIG. 15(a), but with a bottom wall of the base removed.
Figure 15C:
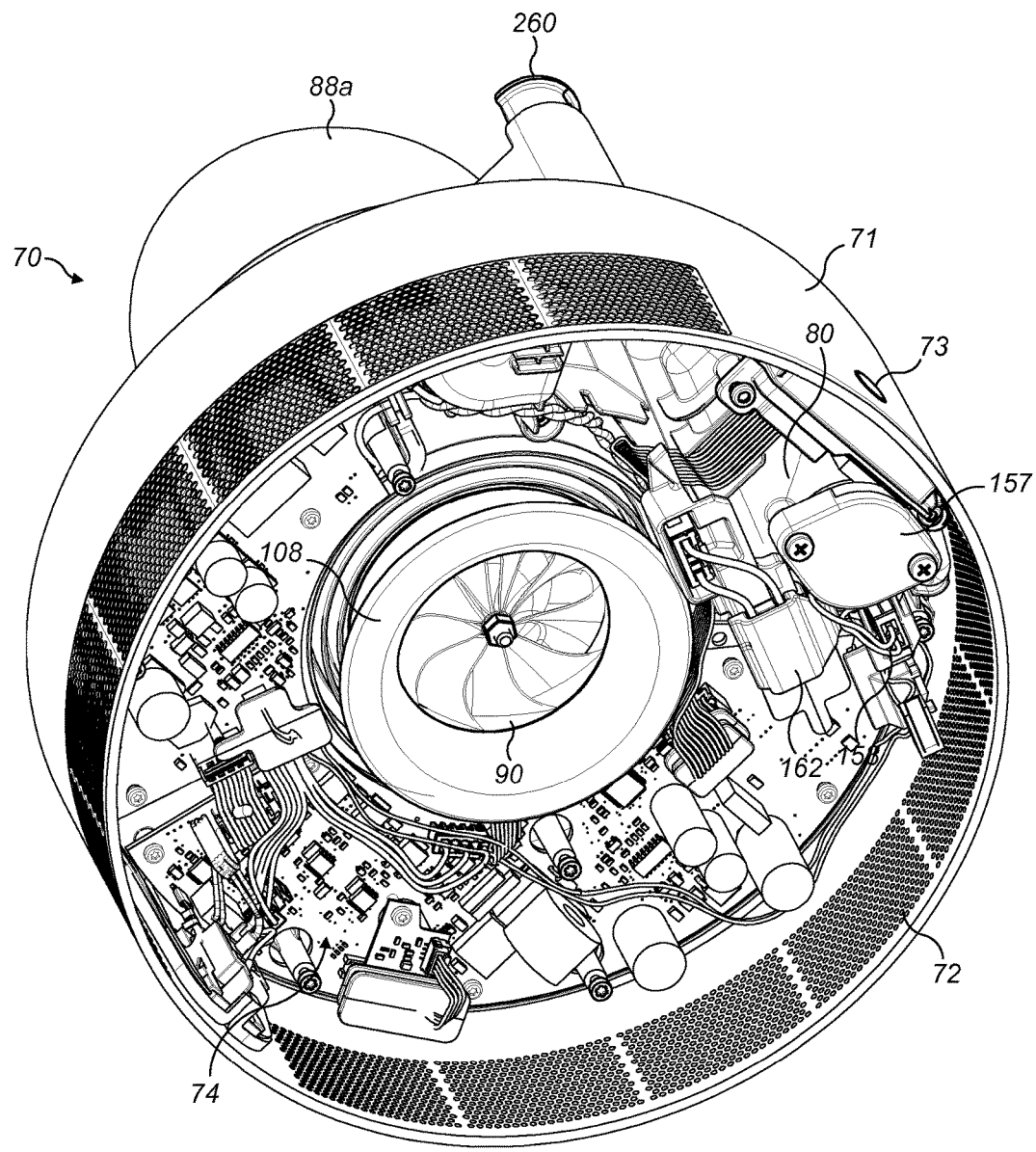
FIG. 15(c) is a similar view to FIG. 15(b) but with a panel for shielding the drive circuit from water ingress removed.
Figure 16A:
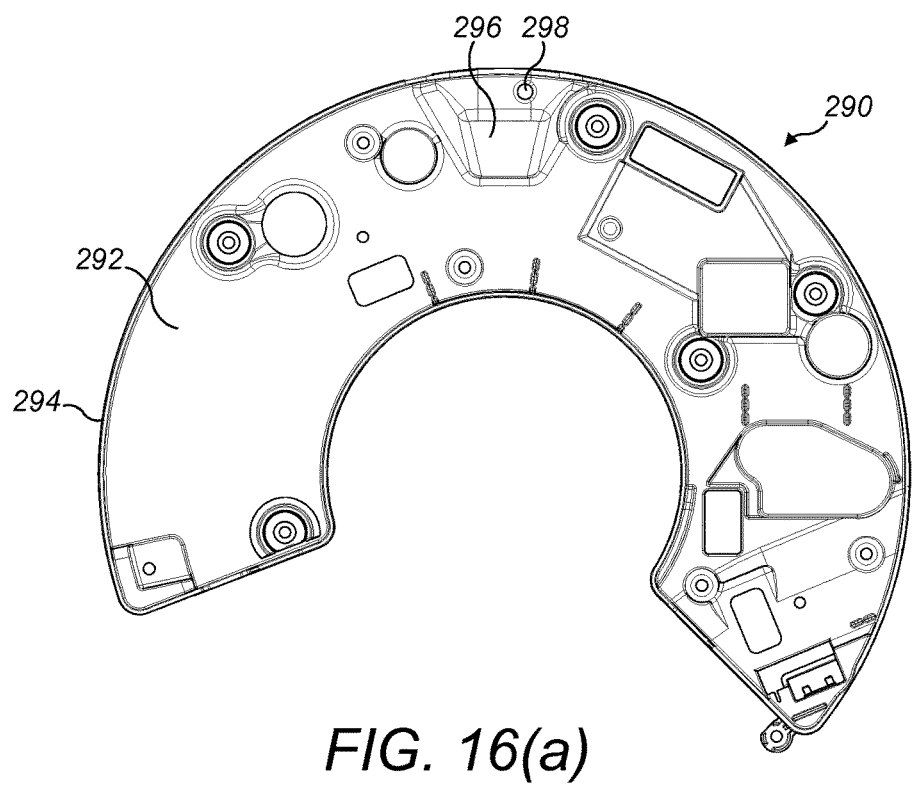
FIG. 16(a) is a top view of the panel.
Figure 16B:
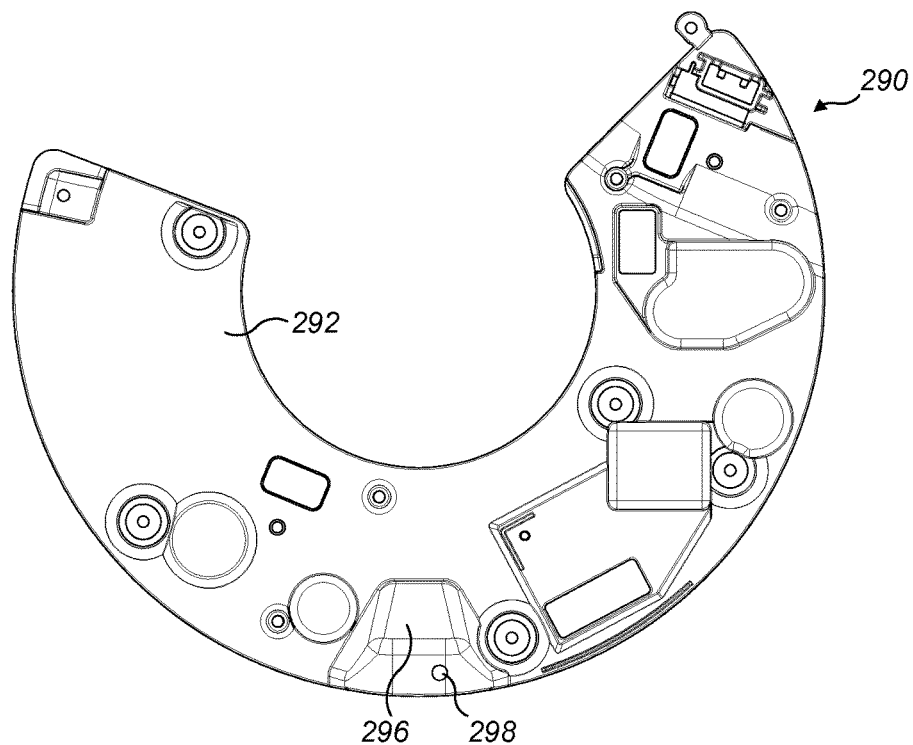
FIG. 16(b) is a bottom view of the panel.
Figure 16C:
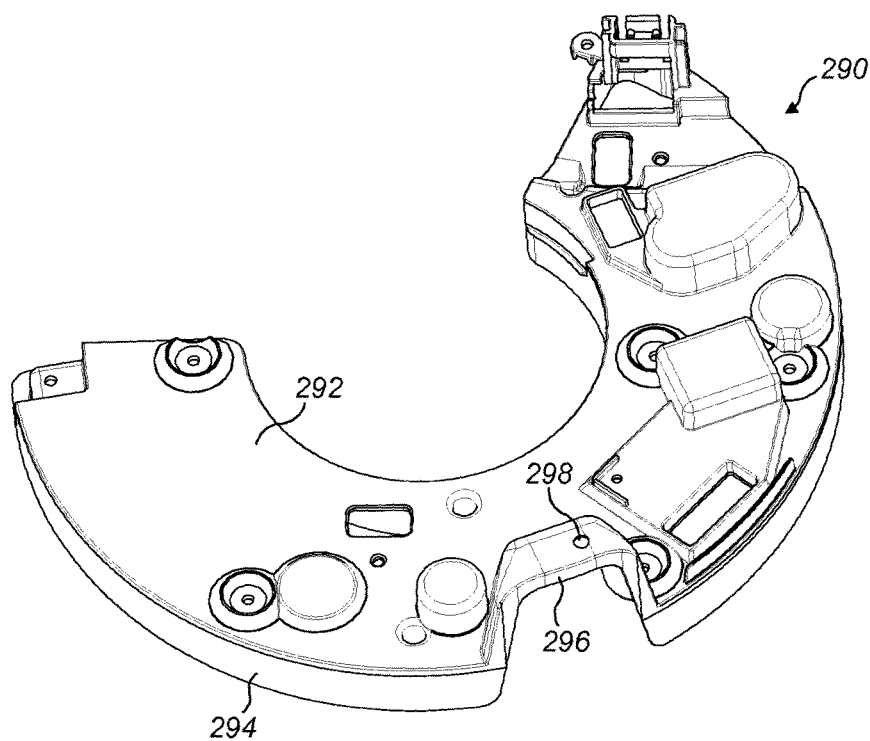
FIG. 16(c) is a rear perspective view, from below, of the panel.
Figure 16D:
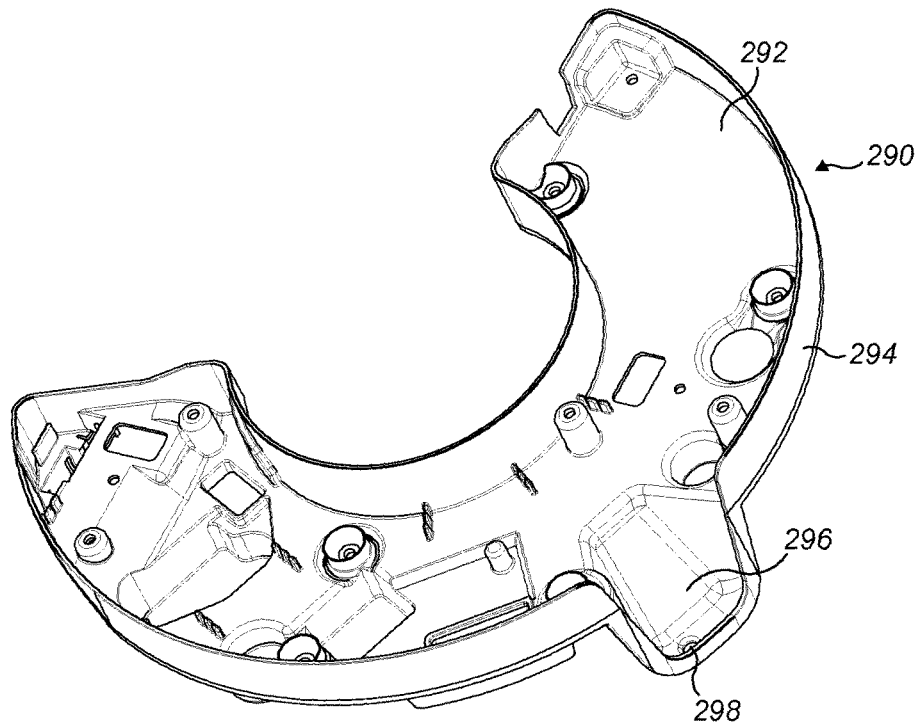
FIG. 16(d) is a rear perspective view, from above, of the panel.

Returning to FIG. 4(d), and with reference also to FIGS. 15 and 16, the drive circuit 74 is located within the base 70. The drive circuit 74 is connected by means of screws to the lower surface of the annular supporting wall 84 of the base 70. As illustrated in FIG. 15(c), the drive circuit 74 is thus sited in close proximity to the air inlet 72 of the apparatus 10. To prevent the drive circuit 74 from becoming exposed to any moisture or other matter which enters the base 70 through the air inlet 72, the base 70 comprises a panel 290 which is connected to the supporting wall 84 so as to shield the drive circuit 74 from the air flow passing from the air inlet 72 to the inlet member 108.

The panel 290 is illustrated in isolation in FIG. 16, whereas FIG. 15(b) illustrates the panel 290 in situ within the base 70. The panel 290 has generally the same shape as the drive circuit 74, and comprises a C-shaped body 292 and a raised wall 294 extending upwardly from the periphery of the body 292. The body 292 has a number of raised sections of different shape to accommodate various different components of the drive circuit 74.

The panel 290 comprises a trough 296 which is located beneath the connector 75a to which the mains power cable is attached by the user. As there is a risk that water may enter the base 70 through the aperture 75b when the mains power cable is disconnected from the base 70, the trough 296 comprises a drain hole 298 for draining any such water from the trough 296.

As described above, a button 73 for controlling the operation of the humidifying apparatus may be located on the outer wall 71 of the base 70 of the body 12. The button 73 may be used to activate and deactivate the motor 92 to switch on and switch off the humidifying apparatus. Additionally, the humidifying apparatus 10 comprises a remote control 300 for transmitting control signals to a user interface circuit 302 of the humidifying apparatus 10. FIG. 17 illustrates schematically a control system for the humidifying apparatus 10, which includes the remote control 300, the user interface circuit 302 and other electrical components of the humidifying apparatus 10. In overview, the remote control 300 comprises a plurality of buttons which are depressible by the user, and a control unit for generating and transmitting infrared light signals in response to depression of one of the buttons. The infrared light signals are emitted from a window located at one end of the remote control 300. The control unit is powered by a battery located within a battery housing of the remote control 300.

A first button is used to activate and deactivate the motor 92, and a second button is used to set the speed of the motor 92, and thus the rotational speed of the impeller 90. The control system may have a discrete number of user selectable speed settings, each corresponding to a respective different rotational speed of the motor 92. A third button is used to set a desired level for the relative humidity of the environment in which the humidifying apparatus 10 is located, such as a room, office or other domestic environment. For example, the desired relative humidity level may be selected within a range from 30 to 80% at 20° C. through repeated actuation of the third button. A fourth button may be used to selectively deactivate the transducer 156 to prevent the second air flow from becoming humidified.

The user interface circuit 302 comprises a switch which is actuated through user operation of the button 73, a sensor or receiver 304 for receiving signals transmitted by the remote control 300, and a display 306 for displaying a current operational setting of the humidifying apparatus 10. For example, the display 306 may normally indicate the currently selected relative humidity level. As the user changes the rotational speed of the motor 92, the display 306 may indicate briefly the currently selected speed setting. The display 306 may be located immediately behind a transparent or translucent part of the outer wall 71 of the base 70, and the sensor 304 may be located behind the button 73.

The user interface circuit 302 is connected to the drive circuit 74. The drive circuit 74 comprises a microprocessor and a motor driver for driving the motor 92. A mains power cable (not shown) for supplying electrical power to the humidifying apparatus 10 extends through the aperture 75b formed in the base 70. The cable is connected to a plug. The drive circuit 74 comprises a power supply unit connected to the connector 75a. The user interface may also comprise one or more LEDs for providing a visual alert depending on a status of the humidifying apparatus 10. For example, a first LED 308 may be illuminated to indicate that the water tank 120 has become depleted, as indicated by a signal received by the drive circuit 74 from the level sensor 170.

A humidity sensor 310 is also provided for detecting the relative humidity of air in the external environment, and for supplying a signal indicative of the detected relative humidity to the drive circuit 74. In this example the humidity sensor 310 may be located immediately behind the air inlet 72 to detect the relative humidity of the air flow drawn into the humidifying apparatus 10. The user interface may comprise a second LED 312 which is illuminated by the drive circuit 74 when an output from the humidity sensor 310 indicates that the relative humidity of the air flow entering the humidifying apparatus 10, HD, is at or above the desired relative humidity level, HS, set by the user.

To operate the humidifying apparatus 10, the user actuates the first button of the remote control, in response to which the remote control 300 generates a signal containing data indicative of the actuation of this first button. This signal is received by the receiver 304 of the user interface circuit 302. The operation of the button is communicated by the user interface circuit 302 to the drive circuit 74, in response to which the drive circuit 74 actuates the UV lamp 160 to irradiate water stored in the outlet chamber 144 of the water reservoir 140. In this example, the drive circuit 74 simultaneously activates the motor 92 to rotate the impeller 90. The rotation of the impeller 90 causes air to be drawn into the body 12 through the air inlet 72. An air flow passes through the impeller housing 104 and the guide vanes 100. Downstream from the guide vanes 100, a portion of the air emitted from the guide vanes 100 enters the duct 110, whereas the remainder of the air emitted from the guide vanes 100 is conveyed along the first air passageway 76 to the first air inlet 28 of the nozzle 14. The impeller 90 and the motor 92 may thus be considered to generate a first air flow which is conveyed to the nozzle 14 by the first air passageway 76 and which enters the nozzle 14 through the first air inlet 28.

The first air flow enters the first interior passage 46 at the lower end thereof. The first air flow is divided into two air streams which pass in opposite directions around the bore 20 of the nozzle 14. As the air streams pass through the first interior passage 46, air enters the mouth 48 of the nozzle 14. The air flow rate into the mouth 48 is preferably substantially even about the bore 20 of the nozzle 14. The mouth 48 guides the air flow towards the first air outlet 30 of the nozzle 14, from where it is emitted from the humidifying apparatus 10.

The air flow emitted from the first air outlet 30 causes a secondary air flow to be generated by the entrainment of air from the external environment, specifically from the region around the first air outlet 30 and from around the rear of the nozzle 14. Some of this secondary air flow passes through the bore 20 of the nozzle 14, whereas the remainder of the secondary air flow becomes entrained, in front of the nozzle 14, within the air flow emitted from the first air outlet 30.

As mentioned above, with rotation of the impeller 90 air enters the second air passageway 78 to form a second air flow. The second air flow passes through the duct 110 and the inlet duct 174 of the detachable section 176 of the water tank 120 to be emitted over the water stored in the outlet chamber 144 of the water reservoir 140. When the drive circuit 74 actuates the vibration of the transducer 156 to atomize water stored in the outlet chamber 144 of the water reservoir 140, airborne water droplets above the water located within the outlet chamber 144 of the water reservoir 140. The transducer 156 may be actuated in response to a user input received from the remote control 300, and/or a fixed time period following the actuation of the motor 92 to create the air flows through the humidifying apparatus 10.

With rotation of the impeller 90, airborne water droplets become entrained within the second air flow. The—now moist—second air flow passes upwardly through the outlet duct to the second air inlet 58 of the nozzle 14, and enters the second interior passage 68 within the front section 18 of the nozzle 14.

At the base of the second interior passage 68, the second air flow is divided into two air streams which pass in opposite directions around the bore 20 of the nozzle 14. As the air streams pass through the second interior passage 68, each air stream is emitted from the second air outlet 60. The emitted second air flow is conveyed away from the humidifying apparatus 10 within the air flow generated through the emission of the first air flow from the nozzle 14, thereby enabling a humid air current to be experienced rapidly at a distance of several metres from the humidifying apparatus 10.

The moist air flow is emitted from the nozzle 14 until the relative humidity HD of the air flow entering the humidifying apparatus 10, as detected by the humidity sensor 310, is 1% at 20° C. higher than the relative humidity level HS, selected by the user using the third button of the remote control 270. The emission of the moistened air flow from the nozzle 14 may then be terminated by the drive circuit 74, preferably by changing the mode of vibration of the transducer 156. For example, the frequency of the vibration of the transducer 156 may be reduced to a frequency f3, where f1>f3≥0, below which atomization of the stored water is not performed. Alternatively the amplitude of the vibrations of the transducer 156 may be reduced. Optionally, the motor 92 may also be stopped so that no air flow is emitted from the nozzle 14. However, when the humidity sensor 310 is located in close proximity to the motor 92 it is preferred that the motor 92 is operated continually to avoid undesirable humidity fluctuation in the local environment of the humidity sensor 310.

As a result of the termination of the emission of a moist air flow from the humidifying apparatus 10, the relative humidity HD detected by the humidity sensor 310 will begin to fall. Once the relative humidity of the air of the environment local to the humidity sensor 270 has fallen to 1% at 20° C. below the relative humidity level HS selected by the user, the drive circuit 74 re-activates the vibration of the transducer 156 in the atomization mode. If the motor 92 has been stopped, the drive circuit 74 simultaneously re-activates the motor 92. As before, the moist air flow is emitted from the nozzle 14 until the relative humidity HD detected by the humidity sensor 310 is 1% at 20° C. higher than the relative humidity level HS selected by the user.

This actuation sequence of the transducer 156 (and optionally the motor 92) for maintaining the detected humidity level around the level selected by the user continues until the first button is actuated again, or until a signal is received from the level sensor 170 indicating that the level of water within the water tank 120 has fallen below the minimum level. If the first button is actuated, or upon receipt of this signal from the level sensor 170, the drive circuit 74 deactivates the motor 92, the transducer 156 and the UV lamp 160 to switch off the humidifying apparatus 10. The drive circuit 74 also deactivates these components of the humidifying apparatus 10 in response to a signal received from the proximity sensor 172 indicating that the water tank 120 has been removed from the base 70, and in response to a signal received from the sensor 240 indicating that the nozzle 14 has been removed from the base 70.

The invention claimed is:

1. A humidifying apparatus comprising:
a base comprising a chamber;
a water tank removably mounted on the base for supplying water to the chamber;
an impeller and a motor for driving the impeller to generate an air flow;
an inlet duct for conveying the air flow to the chamber;
a humidifier for humidifying the air flow with water from the chamber;
an ultraviolet radiation generator for irradiating water stored in the chamber; and
an outlet duct for conveying the humidified air flow from the chamber;
wherein a detachable section of the apparatus is opaque to ultraviolet radiation and is positioned over the chamber when the water tank is mounted on the base, the detachable section comprising an air inlet of the outlet duct and a flange for occluding a peripheral portion of the chamber.

2. The humidifying apparatus of claim 1, wherein the detachable section of the apparatus is detachably connected to the water tank.

3. The humidifying apparatus of claim 1, wherein the detachable section comprises an air outlet of the inlet duct.

4. The humidifying apparatus of claim 3, wherein the air outlet of the inlet duct is co-planar with the air inlet of the outlet duct.

5. The humidifying apparatus of claim 3, wherein the air outlet of the inlet duct is located adjacent to the air inlet of the outlet duct.

6. The humidifying apparatus of claim 5, wherein the detachable section comprises a wall depending from at least part of the flange for guiding the air flow from the air outlet of the inlet duct towards the air inlet of the outlet duct.

7. The humidifying apparatus of claim 6, wherein the wall is annular in shape and positioned so as to extend about a flow channel located directly beneath the air outlet of the inlet duct and the air inlet of the outlet duct.

8. The humidifying apparatus of claim 6, wherein when the chamber is filled with water to a maximum level, the wall extends into the water stored in the chamber.

9. The humidifying apparatus of claim 3, wherein the detachable section comprises an air inlet of the inlet duct, and wherein the base comprises an air passageway for conveying the air flow from the impeller to the air inlet of the inlet duct.

10. The humidifying apparatus of claim 1, wherein the humidifier comprises a transducer for atomizing water stored in the chamber, and wherein the air inlet of the outlet duct is located directly above the transducer.

11. The humidifying apparatus of claim 1, wherein the water tank is annular in shape, and comprises an annular inner wall which is opaque to ultraviolet radiation and an annular outer wall which is transparent to visible light, and wherein the detachable section of the apparatus is detachably connected to the annular inner wall of the water tank.

12. The humidifying apparatus of claim 1, wherein the outlet duct comprises an inlet section and an outlet section, and wherein the detachable section of the apparatus defines the inlet section of the outlet duct, and the detachable section of the apparatus and the annular inner wall of the water tank together define the outlet section of the outlet duct.

13. The humidifying apparatus of claim 1, comprising an air outlet detachably mounted on the base, and a releasing device for releasing the air outlet for removal from the base, the releasing device comprising a user operable button mounted on the base, and wherein the outlet duct is bifurcated into a pair of duct branches, the button being positioned between the duct branches.

14. The humidifying apparatus of claim 13, wherein the water tank comprises a seal for engaging the air outlet and a support for supporting the seal, and wherein the detachable section of the apparatus is detachably connected to the support.

15. The humidifying apparatus of claim 14, wherein the seal is biased towards the air outlet.

16. The humidifying apparatus of claim 15, wherein the seal comprises a relatively rigid frame and a relatively flexible, resilient part for engaging the air outlet and for urging the frame towards the air outlet.

17. The humidifying apparatus of claim 16, wherein the frame is connected to the seal so as to allow movement of the frame relative to the support, the resilient part of the seal being arranged to engage the support so as to urge the frame away from the support.

18. The humidifying apparatus of claim 16, wherein each of the support and the seal comprises at least one aperture for conveying the humidified air flow from the outlet duct to the air outlet.

* * * * *